(12) United States Patent
Harnett et al.

(10) Patent No.: US 11,885,870 B2
(45) Date of Patent: Jan. 30, 2024

(54) METHOD TO IMPROVE GROUND MOVING TARGET DETECTION THROUGH PARTIALLY ADAPTIVE POST PULSE COMPRESSION MULTI-WAVEFORM SPACE-TIME ADAPTIVE PROCESSING

(71) Applicants: University of Kansas, Lawrence, KS (US); The United States of America as represented by the Secretary of the Air Force, Washington, DC (US)

(72) Inventors: Lumumba Harnett, Lawrence, KS (US); Justin G. Metcalf, Norman, OK (US); Shannon D. Blunt, Shawnee, KS (US)

(73) Assignees: University of Kansas, Lawrence, KS (US); The United States of America as Represented by the Secretary of the Air Force, Washington, DC (US)

( * ) Notice: Subject to any disclaimer, the term of this patent is extended or adjusted under 35 U.S.C. 154(b) by 507 days.

(21) Appl. No.: 17/260,078

(22) PCT Filed: Jul. 30, 2019

(86) PCT No.: PCT/IB2019/056509
§ 371 (c)(1),
(2) Date: Jan. 13, 2021

(87) PCT Pub. No.: WO2020/026151
PCT Pub. Date: Feb. 6, 2020

(65) Prior Publication Data
US 2021/0286067 A1    Sep. 16, 2021

Related U.S. Application Data

(60) Provisional application No. 62/712,082, filed on Jul. 30, 2018.

(51) Int. Cl.
*G01S 13/524* (2006.01)
*G01S 7/288* (2006.01)
(Continued)

(52) U.S. Cl.
CPC .......... *G01S 13/5242* (2013.01); *G01S 7/288* (2013.01); *G01S 7/2923* (2013.01); *G01S 7/414* (2013.01); *G01S 7/415* (2013.01); *G01S 7/418* (2013.01)

(58) Field of Classification Search
CPC .... G01S 13/5242; G01S 7/288; G01S 7/2923; G01S 7/414; G01S 7/415; G01S 7/418
See application file for complete search history.

(56) References Cited

U.S. PATENT DOCUMENTS 6,252,540 B1 *  6/2001  Hale ..................... G01S 13/524
                                                            342/162
9,759,810 B1     9/2017  Sankar
(Continued)

OTHER PUBLICATIONS

Patent Cooperation Treaty, International Search Report and Written Opinion issued for PCT Application No. PCT/IB2019/056509, dated Jul. 20, 2020, 9 pages.

*Primary Examiner* — Peter M Bythrow
*Assistant Examiner* — Nazra Nur Waheed
(74) *Attorney, Agent, or Firm* — Norton Rose Fulbright US LLP

(57) ABSTRACT

The present application discloses a new form of μ-STAP, referred to herein as post μ-STAP or Pμ-STAP, which overcomes the drawbacks associated with existing μ-STAP techniques. The Pμ-STAP techniques described herein facilitate the generation of additional training data and homogenization after pulse compression. For example, Pμ-STAP techniques may apply a plurality of homogenization filters to a pulse compressed datacube generated from an input radar waveform, which produces a plurality of new pulse com- (Continued)

pressed datacubes with improved characteristics. Unlike existing µ-STAP techniques described above, which require pre-pulse compressed data to operate, the Pµ-STAP techniques disclosed in the present application are designed to utilize pulse compressed data, and therefore may be readily applied to legacy radar systems.

26 Claims, 40 Drawing Sheets

(51) Int. Cl.
*G01S 7/292* (2006.01)
*G01S 7/41* (2006.01)

(56) References Cited

U.S. PATENT DOCUMENTS

| | | |
|---|---|---|
| 2007/0268182 A1 | 11/2007 | Bourdelais et al. |
| 2008/0106460 A1 | 5/2008 | Kurtz et al. |
| 2017/0102458 A1* | 4/2017 | Schuman ................ G01S 7/414 |
| 2018/0074185 A1* | 3/2018 | Capraro ............. G01S 13/5244 |

* cited by examiner

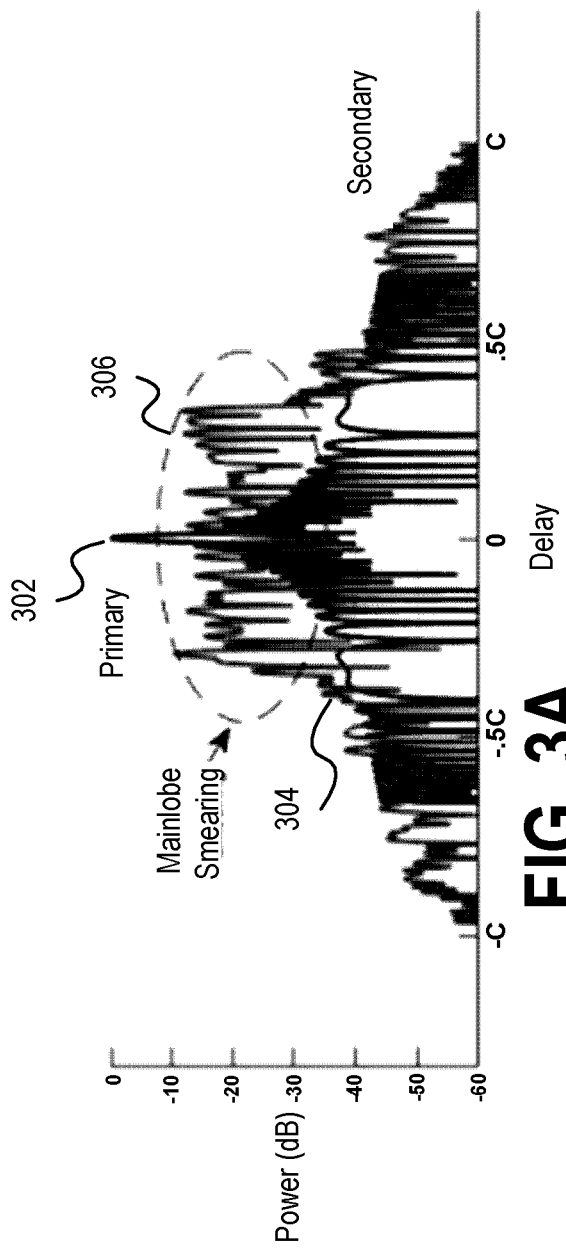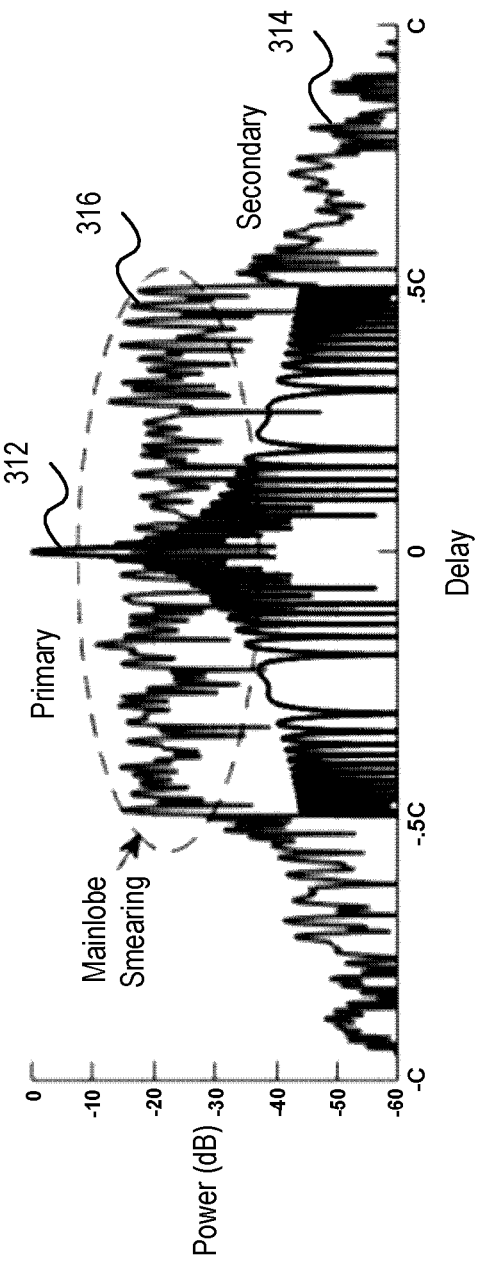

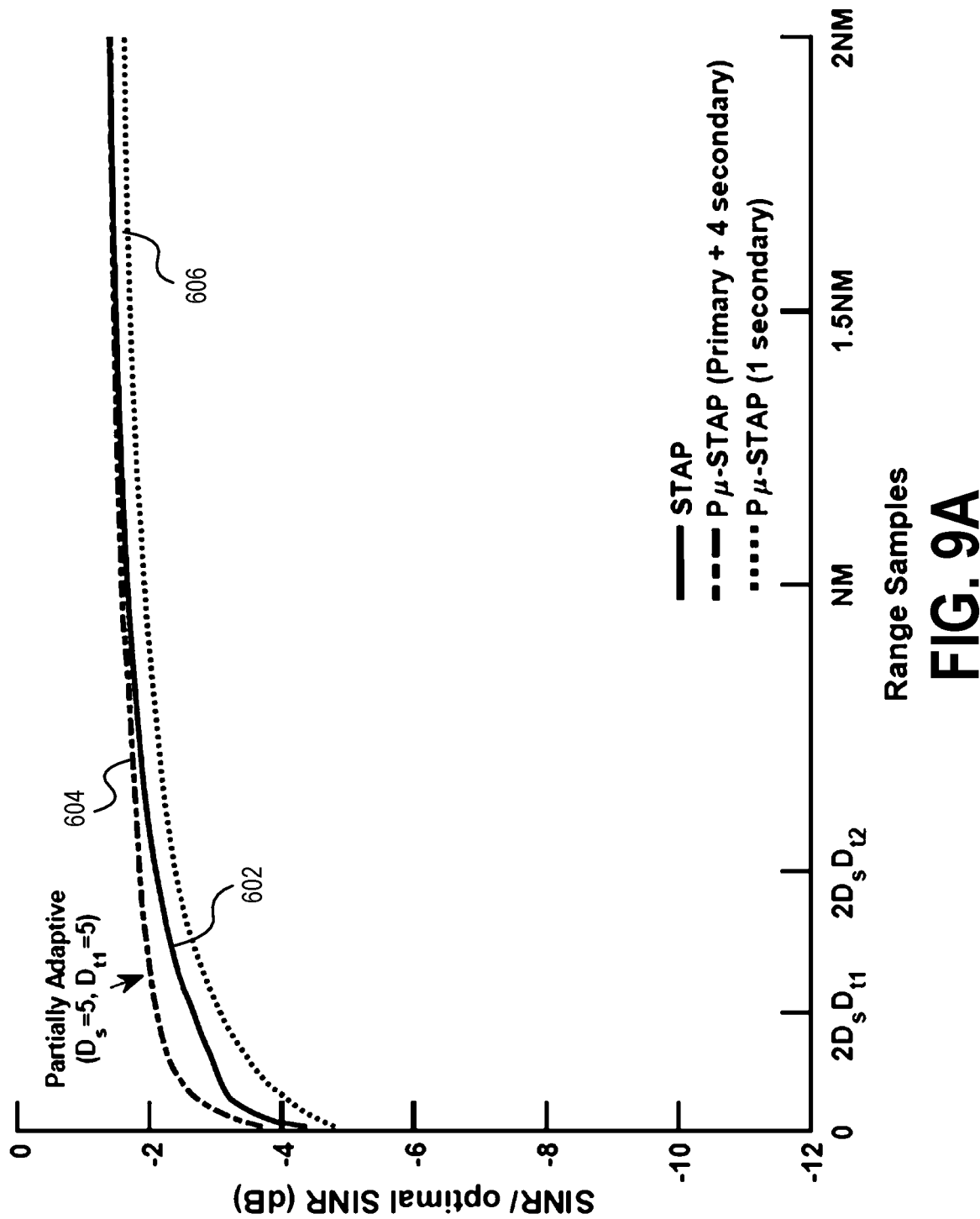

METHOD TO IMPROVE GROUND MOVING TARGET DETECTION THROUGH PARTIALLY ADAPTIVE POST PULSE COMPRESSION MULTI-WAVEFORM SPACE-TIME ADAPTIVE PROCESSING

PRIORITY

This application is a national phase application under 35 U.S.C. § 371 of International Application No. PCT/IB2019/056509 filed Jul. 30, 2019, which claims priority to U.S. Provisional Patent Application No. 62/712,082 filed Jul. 30, 2018. The entire contents of each of the above-referenced disclosures is specifically incorporated by reference herein without disclaimer.

GOVERNMENT INTEREST

This invention was made with government support under FA8650-14-D-1722 awarded by the United States Air Force. The government has certain rights in the invention.

TECHNICAL FIELD

The present disclosure relates to techniques for radar-based detection of ground moving targets and more specifically to improved radar-based detection of ground moving targets using partially adaptive post pulse compression multi-waveform space-time adaptive processing techniques.

BACKGROUND

Airborne ground moving target indication (GMTI) radar must combat angle-Doppler coupled clutter caused by platform motion. In an effort to address this challenge, space-time adaptive processing (STAP) techniques have been developed. Existing STAP techniques generate a joint angle-Doppler filter to suppress the aforementioned coupled clutter and interference for subsequent detection of moving targets. For each range/Doppler cell-under-test (CUT) a unique filter is formed via estimation of the associated clutter/interference covariance matrix under the assumption that the training data used to form the matrix is independent and identically distributed (IID). The IID assumption implies that the clutter is stationary and homogeneous, and under this condition the STAP filter realized by the sample covariance matrix (SCM) estimate approaches the optimal filter, in a maximum signal-to-interference-plus-noise ratio (SINR) sense, as the number of training data samples increases.

However, in real-world operating environments the implication of the IID assumption (e.g., that clutter is stationary and homogeneous) does not hold due to the presence of non-homogeneous clutter. When this occurs, ground moving target detection systems utilizing traditional STAP techniques suffer severe degradation in SINR due to a variety of reasons including: insufficient sample support (e.g., insufficient IID training data); contamination of the training data by targets of interest, which may lead to self-cancellation issues; and CUT clutter discretes that are not represented in the SCM. With the additional inclusion of practical effects such as internal clutter motion, aircraft crabbing, and channel mismatch, accurate estimation of the STAP SCM remains a difficult problem.

Over the years numerous robust solutions have been proposed for this problem with varying trade-offs, assumptions, and degrees of success. A prominent trend among these is the down-selection/modification of the training data itself as a means to achieve improved ground moving target detection. In a bit of a departure from these methods, a form of STAP, referred to as multi-waveform (MuW) space-time adaptive processing ($\mu$-STAP) has been introduced. The $\mu$-STAP formulation involves the generation of additional training data via the application of multiple pulse compression filters that possess relatively low cross-correlation with the actual emitted waveform. Because this new training data involves different mixtures (in range) of the same data, it does not produce new independent snapshots. However, due to the range-domain "smearing" effect that occurs when applying these other filters, the additional training data $\mu$-STAP techniques have been shown to be beneficial for non-homogeneous clutter.

$\mu$-STAP techniques may be implemented in a variety of ways. For example, $\mu$-STAP may be implemented in a multiple-input multiple-output (MIMO) mode in which lower power secondary waveforms are emitted in directions other than the primary mainbeam direction. As another example, $\mu$-STAP may be implemented in a single-input multiple-output (SIMO) mode in which one waveform is emitted yet multiple different pulse compression filters are applied on received input radar waveforms (e.g., reflections of output radar waveforms transmitted by the radar detection system). Compared to the SIMO mode, the MIMO mode of $\mu$-STAP provides somewhat better sidelobe clutter rejection due to waveform separability. However, MIMO mode $\mu$-STAP also requires a more complex hardware implementation. In contrast, the SIMO mode emission requires no hardware modifications relative to standard GMTI. SIMO $\mu$-STAP operates on a single pre-pulse compressed data stream to generate multiple post pulse compressed data streams. These data streams contain data relating to velocity, spatial location, and distance of a moving target, and may be formulated as a datacube via a multi-dimensional array (e.g., one dimension for each of velocity, spatial location, and distance). For most legacy systems, pre-pulse compressed data is not available since pulse compression is performed before analog-to-digital (A/D) sampling. In addition, hardware modifications of these systems to accommodate the $\mu$-STAP framework would be a costly process. Thus, despite providing improved performance in the presence of non-homogeneous clutter, a significant drawback of existing $\mu$-STAP techniques is their inability to be utilized by legacy radar systems, which perform pulse compression prior to A/D conversion and are therefore unable to utilize $\mu$-STAP techniques, which require non-pulse compressed data to operate.

SUMMARY

The present application discloses a new form of $\mu$-STAP, referred to herein as post $\mu$-STAP or P$\mu$-STAP, which overcomes the drawbacks associated with existing $\mu$-STAP techniques. For example, as described in more detail below, P$\mu$-STAP techniques in accordance with the present disclosure facilitate the generation of additional training data and homogenization after pulse compression. Unlike the traditional $\mu$-STAP techniques described above, which require pre-pulse compressed data to operate, the P$\mu$-STAP techniques disclosed in the present application are designed to utilize pulse compressed data as input.

For example, when an input radar waveform is received by a radar detection system, the input radar waveform may be pulse compressed and subjected to analog to digital conversion to form an input datacube. The input datacube may be processed using a plurality of homogenization filters to produce a plurality of homogenized datacubes, which may be used for covariance estimation and other radar processing techniques. The ability to utilize pulse compressed data as input allows Pµ-STAP techniques to be more easily applied to legacy radar systems. Additionally, the ability to utilize pulse compressed data, which may have enhanced characteristics (e.g., SNR, etc.), may improve the performance (e.g., increased capabilities to remove clutter, identify targets of interest, etc.) of radar systems implementing Pµ-STAP techniques in accordance with the present disclosure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 3A is a plot of an observed primary and secondary filter response in accordance with the present disclosure;

FIG. 3B is another plot of an observed primary and secondary filter response in accordance with the present disclosure;

FIG. 9A is a plot illustrating mean convergence for BSPoD;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
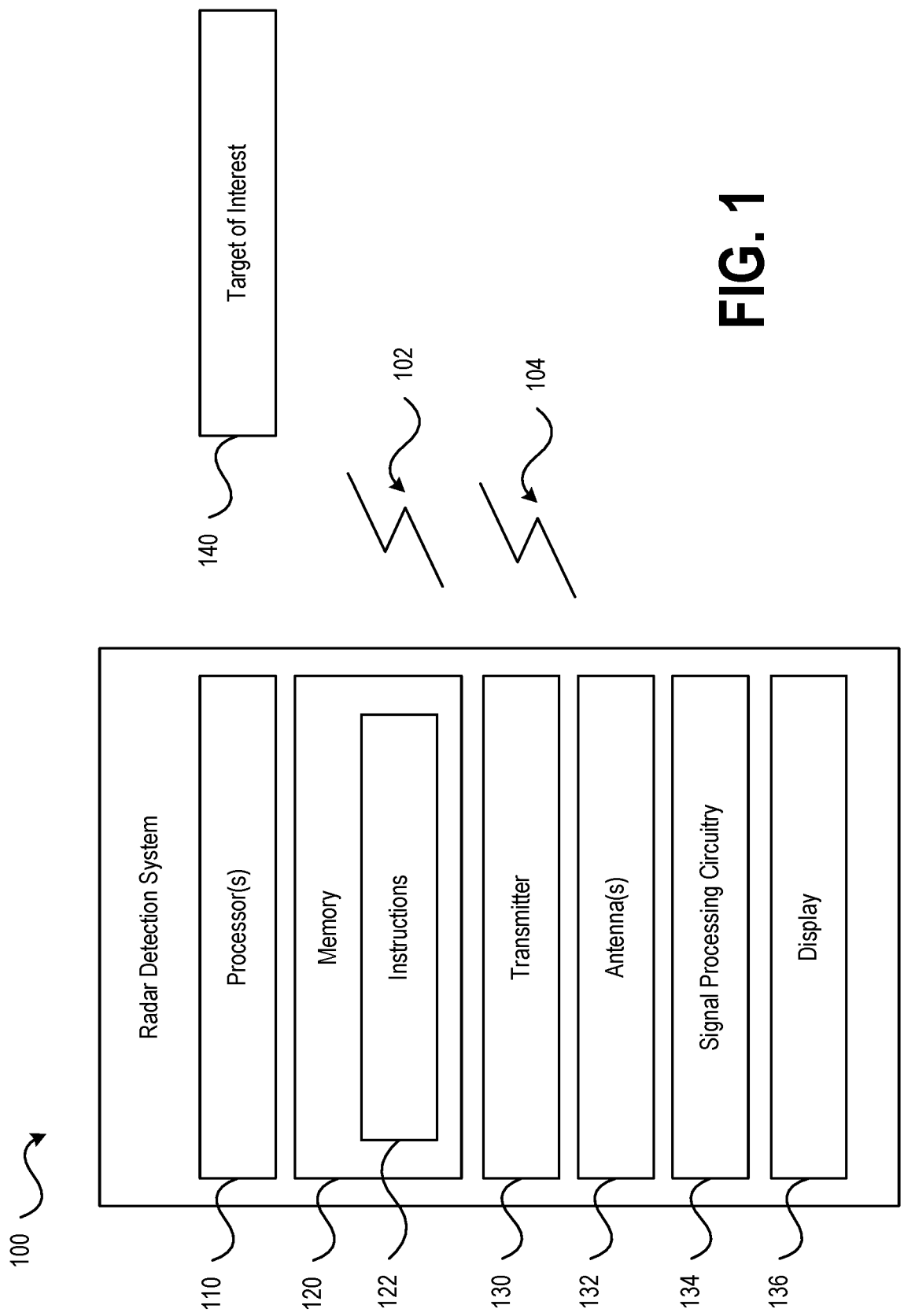
FIG. 1 is a radar detection system in accordance with the present disclosure.

Referring to FIG. 1, a block diagram illustrating aspects of a radar detection system configured to utilize Pµ-STAP techniques in accordance with the present disclosure is shown as a radar detection system 100. The Pµ-STAP techniques utilized by the radar detection system 100 provide improved detection of ground moving targets. Additionally, unlike traditional µ-STAP techniques, the Pµ-STAP utilized by the radar detection system 100 operates on post pulse compressed data, which allows the Pµ-STAP techniques disclosed herein to be applied to legacy systems, as described in more detail below.

As shown in FIG. 1, the radar detection system 100 may include one or more processors 110, a memory 120, a transmitter 130, one or more antennas 132, signal processing circuitry 134, and a display device 136. The one or more processors 110 may include one or more central processing units (CPUs), digital signal processors (DSPs), STAP processors (e.g., circuitry or other logic configured to implement space-time adaptive processing), application specific integrated circuits (ASICs), field programmable gate arrays (FPGAs), or other circuitry configured to process data in accordance with aspects of the present disclosure. The transmitter 130 may be configured to generate a radar waveform for transmission. The one or more antennas 132 may be configured to receive reflections of transmitted radar waveforms. The signal processing circuitry 134 may include various signal processing components, such as amplifiers, analog-to-digital converters, phase locked loops, mixers, a detector, a diplexer, gain control circuitry, low noise amplifiers (LNAs), other types of signal processing circuitry, or a combination thereof. It is noted that the exemplary types of signal processing circuitry described above have been provided for purposes of illustration, rather than by way of limitation and that the specific components of a radar detection system configured in accordance with the present disclosure may include less signal processing components, more signal processing components, or different signal processing components depending on the particular configuration or design of the radar detection system. The display device 136 may be configured to display radar data associated with detection of ground moving targets.

As shown in FIG. 1, the memory 120 may store instructions 122 that, when executed by the one or more processors 110, cause the one or more processors 110 to perform operations to detect ground moving targets in accordance with the concepts disclosed herein. For example, the instructions 122 may correspond to software that, when executed by the one or more processors 110, causes the one or more processors 110 to perform ground moving target detection utilizing Pµ-STAP techniques in accordance with the present disclosure. The ability to implement the Pµ-STAP techniques disclosed herein via software enables legacy radar detection systems (e.g., radar detection systems that are not capable of utilizing existing µ-STAP techniques) to be upgraded (e.g., via a software upgrade) such that those legacy radar detection systems can take advantage of the benefits provided by Pµ-STAP, which improves the operations of the radar detection system itself. Additionally, although capable of implementation via software, it should be understood that the Pµ-STAP techniques disclosed herein may be readily implemented in hardware if desired. Accordingly, the present disclosure is not to be limited to software implementations.

During operation, the transmitter 130 may generate a radar waveform for transmission as an output radar waveform 102. The output radar waveform 102 may be transmitted by the radar detection system 100, and objects within the path of the output radar waveform may reflect the output radar waveform 102. Some of these reflections may be received as input radar waveforms 104 at the antenna(s) 132. The input radar waveforms 104 may be provided as input to the signal processing circuitry 134 to facilitate processing of the input radar waveforms 104 in accordance with aspects of the present disclosure, as described in more detail below. The processing of the input radar waveforms may be utilized to perform ground moving target detection and the results of the ground moving target detection may be displayed at the display device 136. It is noted that although the radar detection system 100 is described as being configured to present results of ground moving target detection at display device 136, this has been described for purposes of illustration, rather than by way of limitation. For example, embodiments of the present disclosure may record location information or other data derived from the ground moving target detection in a database, which may be stored at memory 120 (or another memory device accessible to the radar detection system 100) instead of, or in addition to, displaying the results at the display device 136.

Figure 2:
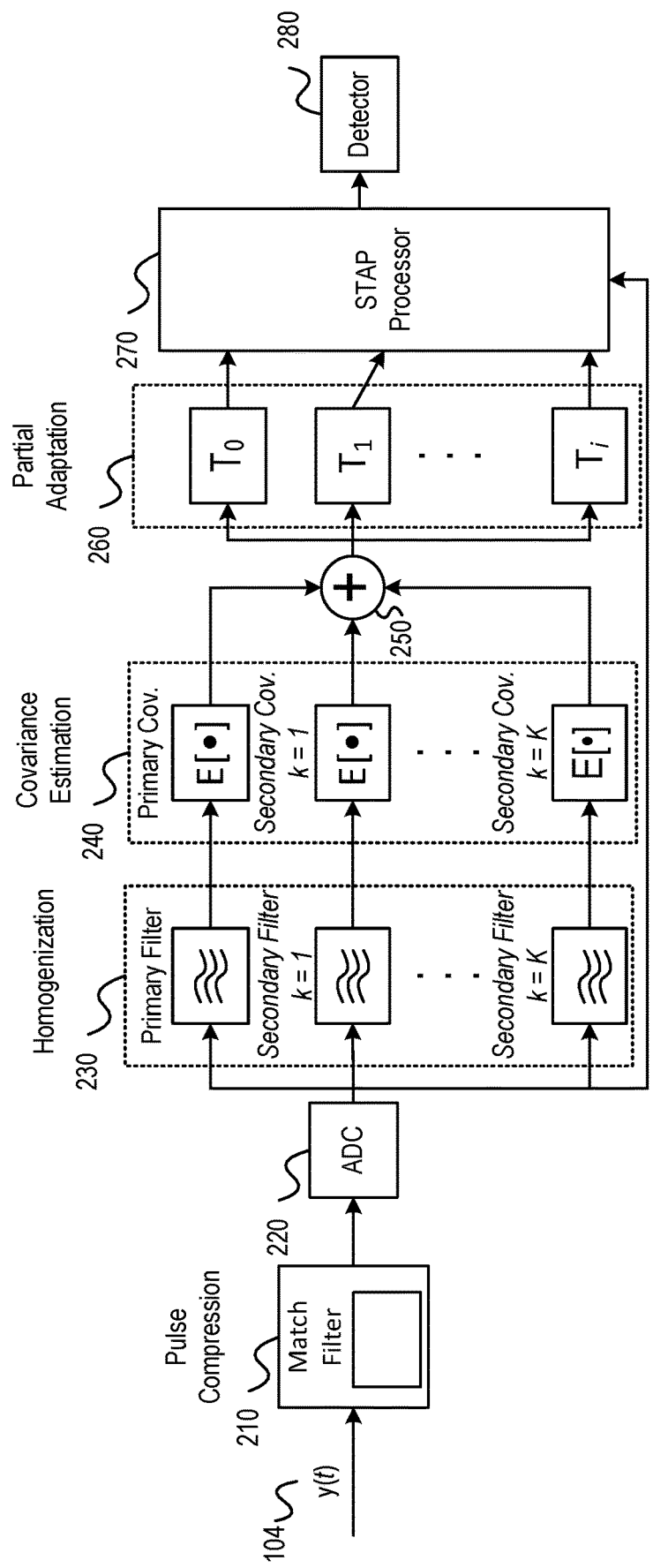
FIG. 2 is a block diagram illustrating an exemplary flow for processing an input radar waveform in accordance with the present disclosure.

Referring to FIG. 2, a block diagram illustrating exemplary aspects for processing input radar waveforms using Pµ-STAP techniques in accordance with the present disclosure is shown. As shown in FIG. 2, received input radar waveforms 104 may be pulse compressed, at block 210. In an aspect, pulse compression may utilize a match filter to increase the SNR of the input radar waveforms. Pulse compressed data may be generated as a result of performing pulse compression, at block 210, and the post compressed data may be provided to block 220, which may be configured to perform analog to digital conversion of the pulse compressed data. The output of block 220 may be a datacube that provides information associated with a target of interest, such as the target of interest 140 of FIG. 1. For example, the datacube output by block 220 may include velocity information, spatial location information, and distance information associated with a target of interest. As explained above, existing µ-STAP techniques require pre-pulse compressed data and would therefore be unable to operate on the datacube output from block 220 (e.g., because the datacube includes pulse compressed data.

As shown in FIG. 2, the output of block 220 (e.g., the datacube) may be provided to a plurality of homogenization filters, at block 230. As illustrated in FIG. 2, the plurality of homogenization filters may include a primary homogenization filter and K secondary homogenization filters. Additional exemplary aspects of the homogenization filters are described in more detail below. The plurality of homogenization filters may be configured to generate a plurality of datacubes from on a single input datacube (e.g., the datacube output by block 220) by homogenizing non-homogeneities within the data of the input datacube. For example, the homogenization filters may be configured to spread out non-homogeneities within the data of the input datacube. As a result of applying the homogenization filters to the input datacube, non-homogeneities may be homogenized over the data within each of the datacubes output by the plurality of homogenization filters. This homogenization may provide new training data in which range-domain "smearing" effects are present, which has been shown to be beneficial for performing moving target detection in the presence of non-homogeneous clutter, as described in herein. Additionally, by generating the plurality of homogenized datacubes, the resolution of the radar detection system (e.g., the radar detection system 100 of FIG. 1) may be improved. For example, the plurality of homogenized datacubes may improve the capabilities of the radar detection system to discriminate moving targets based on the velocity, spatial location, and distance information of the homogenized datacubes. Other benefits and advantages that may be realized through utilization of the Pμ-STAP techniques disclosed herein, which utilize homogenization filters to generate a plurality of datacubes from a single datacube formed from pulse compressed data are described herein. Additionally, it is noted that existing μ-STAP techniques do not utilize homogenization filters.

At block 240, covariance estimation may be performed on each of the homogenized datacubes generated at block 230. As illustrated in FIG. 2, covariance estimation may be performed separately for each of the homogenized datacubes. As a result of performing covariance estimation, at block 240, a covariance matrix for each of the homogenized datacubes may be produced. The covariance matrices generated at block 240 may facilitate identification of ground moving targets. For example, the covariance matrices may facilitate removal of portions of the input radar waveform 104 associated with the ground, thereby resulting in information associated with moving targets of interest.

The covariance matrices generated at block 240 may be combined at block 250 to produce a full covariance matrix. At block 260, partial adaptation processing may be performed based the full covariance matrix. It is noted that utilization of partial adaptation processing may be advantageous for various reasons. For example, when the radar detection system includes N number of antenna array elements, and there are M number of pulses in the coherent processing interval (CPI), and assuming homogeneous clutter, it can be generally expected that at least 2NM independent space-time snapshots are required to estimate the SCM within 3 dB of the optimum (in terms of average SINR). This number may be increased if the training data is non-homogeneous. For typical array sizes and CPI lengths, it is generally not feasible to expect the availability of 2NM or more IID training data samples. Likewise, the associated SCM of dimensionality NM×NM may incur too high a computational cost to invert, particularly if multiple SCMs are necessary and the result is required in real-time or near real-time. Thus, partial adaptation processing performed at block 260 may be utilized to address these issues and reduce computational complexities associated with performing ground moving target detection.

The results of the partial adaptation processing, as well as the datacube produced at block 220, may be provided as inputs to STAP processor 270. The STAP processor 270 may be configured to perform space-time adaptive processing of the inputs received from block 260 and block 220, which produces an output in which clutter has been canceled. For example, the input datacube 220 may initially include information (e.g., velocity, spatial location, and distance) associated with clutter, and the output of STAP processor 270 may be a datacube in which information associated with the clutter has been removed, and the output(s) of the STAP processor 270 may be provided to detector 280. The detector 280 may be configured to detect moving targets of interest based on the output(s) received from the STAP processor 270. For example, the detector may be configured to test each range cell and Doppler bin of the output of the STAP processor 270 for the present of a target of interest. As described above, in an aspect, information associated with detected moving targets of interest may be displayed at a display device, such as the display device 136 of FIG. 1. The description above provides a high level overview of an exemplary Pμ-STAP processing flow in accordance with the present disclosure. In the description that follows, additional exemplary aspects of the Pμ-STAP techniques disclosed herein are described in more detail.

Referring back to FIG. 1, the radar detection system 100 may be configured to implement Pμ-STAP techniques, such as the exemplary processes described above with reference to FIG. 2, which utilize a single post pulse compressed datacube to generate multiple post pulse compressed datacubes that may be used to perform ground moving target detection. One advantage of Pμ-STAP techniques is the ability to utilize pulse compressed data, which may have a SNR-maximized response with distinct main and sidelobe responses. In contrast, radar detection systems that implement existing μ-STAP techniques operate on pre-pulse compressed data, which may have degraded SNR responses. Additionally, as described above, Pμ-STAP processing uses homogenization filters to smear these responses thereby increasing the accuracy of covariance matrix estimations for non-homogeneous clutter conditions. In the description below, various concepts associated with SIMO μ-STAP techniques and Pμ-STAP techniques are described in order to facilitate a better understanding the differences between existing μ-STAP techniques and the Pμ-STAP techniques disclosed herein.

For SIMO μ-STAP, an airborne pulse-Doppler radar transmits a CPI of M pulses modulated with a single waveform in a given spatial direction Book via an N element uniform linear array (ULA) antenna. The received response from the illuminated scattering and noise for the mth pulse and nth antenna element may be expressed by:

$$y(m, n, t) = \sum_{\omega}\sum_{\theta}[s(t) * x(t, \omega, \theta, \theta_{look})]e^{j(m\omega+n\theta)}, \quad (1)$$

where * denotes convolution, s(t) is the transmitted waveform, v(t) is additive noise, and x(t, ω, θ, $\theta_{look}$) is the induced scattering impinging on the array as a function of Doppler ω, spatial angle θ, and the direction of illumination $\theta_{look}$. It is noted that in Equation (1), y(m, n, t) represents a pre-pulse compressed input radar waveform.

The SIMO version of μ-STAP utilizes a primary pulse compression filter, denoted $h_{prime}(t)$, which may be a matched filter (or possible mismatched filter) for transmitted waveform s(t) and additionally defines a set of "unmatched" secondary pulse compression filters $h_{sec, k}(t)$ for k=1, 2, . . . , K that possess a relatively low cross-correlation with the transmitted waveform. The matched filter $h_{prime}(t)$ provides a range-focused estimate of the radar scattering, and low cross-correlation responses produced by the secondary filters realizes a smearing of the scattering in range that helps to homogenize the non-homogeneities of clutter discretes and targets contaminating the training data. The K+1 pulse compression responses produced by the K secondary filters and the primary filter $h_{prime}(t)$ can collectively be expressed as:

$$z_{prime}(m,n,t)=h_{prime}(t)*y(m,n,t)$$

$$z_{sec,1}(m,n,t)=h_{sec,1}(t)*y(m,n,t)$$

$$z_{sec,2}(m,n,t)=h_{sec,2}(t)*y(m,n,t)$$

...

$$z_{sec,K}(m,n,t)=h_{sec,K}(t)*y(m,n,t), \quad (2)$$

for the n=0, 1, ..., N−1 antenna elements and the m=0, 1, ..., M−1 pulses in the CPI. Discretising these filter outputs and collecting the MN samples for each $l^{th}$ range index into a vector produces K+1 space-time snapshots denoted as $z_{prime}(l)$ and $z_{sec,k}(l)$ for k=1, 2, ..., K.

Generally speaking, for a given spatial illumination direction $z_{prime}(l)$ and Doppler frequency $\omega_D$, a space-time adaptive filter $\omega(l_{CUT}, \theta_{look}, \omega_D)$ is generated and applied to each candidate CUT as $$\alpha(l_{CUT},\omega_D)=w^H(l_{CUT},\theta_{look},\omega_D)z_{prime}(l_{CUT}). \quad (3)$$

The filter response $\alpha(l_{CUT}, \omega_D)$ can then be evaluated by a detector to determine if a moving target is present at the specified range and Doppler. The STAP filter that optimizes SINR is determined according to:

$$w(l_{CUT},\theta_{look},\omega_D)=R^{-1}(l_{CUT})c_{st}(\theta_{look},\omega_D) \quad (4)$$

where $R(l_{CUT})$ is a covariance matrix of the clutter and interference in the CUT and the space-time steering vector, which may be expressed as:

$$c_{st}(\theta_{look},\omega_D)=c_t(\omega_D)\otimes c_s(\theta_{look}), \quad (5)$$

is formed by the Kronecker product of the individual temporal and spatial steering vectors.

The clutter and interference covariance matrix is usually estimated using the sample data surrounding the CUT under the assumption that this data is statistically homogeneous with the CUT snapshot. Notwithstanding the variety of ways in which training data can be modified/down-selected, the standard sample covariance matrix (SCM) estimate is obtained as:

$$\hat{R}_{prime}(\ell_{CUT}) = \frac{1}{n(L_{prime})} \sum_{\substack{\ell \in L_{prime} \\ \ell \neq \ell_{CUT} \pm G}} z_{prime}(\ell)z_{prime}^H(\ell), \quad (6)$$

using the set of $L_{prime}$ snapshots with cardinality $n(L_{prime})$. The exclusion of range indices comprising the CUT and surrounding guard cells from the training data is generally used to avoid including possible moving targets in/near the CUT.

The problem with the SCM estimate provided by Equation (6) is that it may not be an accurate reflection of the true covariance matrix for the reasons discussed above (e.g., Equation (6) "assumes" the sample data surrounding the CUT is homogeneous with the CUT snapshot, etc.). To supplement the many robust SCM estimators that have been developed, SIMO μ-STAP formulations may make use of additional training obtained from the K secondary filters in Equation (2). For example, a "no primary" μ-STAP form of SCM can be realized as:

$$\hat{R}_{\mu,NP}(\ell_{CUT}) = \frac{1}{n(L_{prime})K} \sum_{k=1}^{K} \sum_{\ell \in L_{prime}} z_{sec,k}(\ell)z_{sec,k}^H(\ell). \quad (7)$$

In Equation (7), the CUT and guard cells are not excluded since doing so would be unnecessary due to the range-smearing effect of the secondary filters. The SCM derived from Equation (7) can also be combined with the traditional SCM from (6) to form a μ-STAP SCM, which may be expressed as:

$$\hat{R}_\mu(l_{CUT})=\hat{R}_{prime}(l_{CUT})+\hat{R}_{\mu,NP}(l_{CUT}). \quad (8)$$

It is noted that diagonal loading may be used with the standard SCM (e.g., the SCM formulation provided in Equation (6)) by adding $\sigma_v^2 I_{MN}$, for the noise power ($\sigma_v^2$) and $I_{MN}$, which is an MN×MN identity matrix. Diagonal loading can also be used with the μ-STAP SCMs (e.g., the SCM formulations of Equations (7) and (8)) and has been shown to improve robustness to nonhomogeneous clutter.

As shown above, SIMO μ-STAP utilizes a single pre-pulse compressed datacube to generate multiple post pulse compressed datacubes. However, as explained above, most legacy radar systems cannot provide pre-pulse compressed data since pulse compression is performed before A/D sampling. In addition, hardware modifications of these legacy radar systems to accommodate the MIMO μ-STAP framework would be a costly process. The Pμ-STAP techniques described above with reference to FIG. 2 solve these problems. For example, as shown in FIG. 2, Pμ-STAP techniques in accordance with the present disclosure utilize a single post pulse compressed datacube (e.g., a datacube formed after A/D sampling) to generate multiple post pulse compressed datacubes. Thus, legacy radar systems may be readily adapted, via a software upgrade, for example, to implement Pμ-STAP techniques in accordance with the present disclosure. This provides a significantly more cost effective approach than the costly hardware modifications required by existing μ-STAP approaches. Additionally, the Pp-STAP techniques disclosed herein may result in more accurate covariance estimations (e.g., because the pulse compressed data inputs will have a SNR-maximized response with distinct main and sidelobes responses) for non-homogeneous clutter scenarios.

In the description that follows, differences between the Pμ-STAP of the present disclosure and the above-described SIMO μ-STAP techniques are described. As described above with reference to FIG. 2, Pμ-STAP techniques in accordance with the present disclosure may utilize a plurality of homogenization filters. These homogenization filters may be created by using the primary pulse compression response from Equation (2) to create a new set of post pulse compressed data, which may be expressed by:

$$\rho_{prime}(m,n,l)=g_{prime}(l)*z_{prime}(m,n,l)$$

$$\rho_{sec,1}(m,n,l)=g_{sec,1}(l)*z_{prime}(m,n,l)$$

$$\rho_{sec,2}(m,n,l)=g_{sec,2}(l)*z_{prime}(m,n,l)$$

...

$$\rho_{sec,K}(m,n,l)=g_{sec,K}(l)*z_{prime}(m,n,l), \quad (9)$$

where $g_{prime}(l)$ is the primary homogenization filter and $g_{sec,k}(l)$ for k=1, 2, ..., K are the secondary homogenization filters. It is noted that the primary homogenization filters, the secondary homogenization filters, or both the primary and secondary homogenization filters may be digital filters created following analog to digital conversion. The primary homogenization filter may be a time-delayed impulse designed to have no effect on the initial pulse compression response besides aligning appropriately with secondary responses. The secondary homogenization filters may be uniform amplitude, random phase filters. For a filter discrete length C, the primary and secondary homogenization filters, respectively, may be expressed as:

$$g_{prime}(\ell) = \delta\left(\ell - \frac{C}{2}\right) \tag{10}$$

$$g_{sec,k}(\ell) = \frac{1}{\sqrt{C}} \exp(j2\pi\theta_k(\ell))$$

where $\delta(\bullet)$ is the impulse function and each phase value is independently drawn from a uniform distribution on $[-\pi, +\pi]$. One benefit of Pμ-STAP is its independence between secondary filter generation and primary waveform. For example, the above-described μ-STAP techniques require that the secondary pulse compression filters be generated a priori based on the primary filter structure. These secondary pulse compression filters must be optimized such that the cross-correlation has a sufficient decorrelation to the transmit waveform to induce homogenization. Additionally, the secondary pulse compression filters utilized by existing μ-STAP techniques will typically work for the primary waveform and only the primary waveform. In contrast, the primary and secondary homogenization filters utilized by Pμ-STAP techniques in accordance with the present disclosure do not need a priori information of the transmitted radar waveform. Traditional pulse compression techniques, such as μ-STAP, are performed using the transmitted waveform. Since Pμ-STAP techniques in accordance with the present disclosure technique may be performed post compression, Pμ-STAP does not need to incorporate the transmit waveform in the homogenization filter. Furthermore, Pμ-STAP techniques in accordance with the present disclosure may facilitate selective control with respect to the amount of decorrelation by adjusting the homogenization filter length, as illustrated in FIG. 3 which is described in more detail below. Pμ-STAP techniques in accordance with the present disclosure may also be utilize different types of filters, such as stochastic filters and uniform amplitude filters. During testing, uniform amplitude filters were found to provide better performance in the exemplary environments considered. The ability to utilize different types of filters and different filter lengths, coupled with the ability to implement Pμ-STAP techniques as software, enables robust solutions to be provided for any deployment of a radar detection system. For example, when a Pμ-STAP-based solution is deployed to a particular radar detection system, the software may be configured with filter lengths and filter types selected for the specific environment of the particular radar detection system.

For example, consider a linear FM (LFM) waveform pulse compressed with a normalized match filter, where r denotes the pulse duration and B represents the swept bandwidth. In FIGS. 3A and 3B, the pulsed compress response of LFM waveform with a time-bandwidth product of Bτ=50 is homogenized with homogenization filters of lengths C=Bτ (FIG. 3A) and C=2Bτ (FIG. 3B). The homogenization filter may be implemented after correlation. For linear convolution, the pulse compression response duration is 2Bτ−1. After implementing a homogenization filter, the correlation response extends to (2Bτ−1)+C−1. For C=Bτ, the power of the mainlobe 302 decreases and smearing 306 spans until half of the sidelobes 304, as shown in FIG. 3A. At C=2Bτ, the homogenization smearing 316 of the mainlobe 312 spans all of the sidelobes 314 and the power has decreased even more. The concepts illustrated in FIGS. 3A and 3B demonstrate how Pμ-STAP techniques in accordance with the present disclosure may be utilized to control the amount of decorrelation by adjusting the proportionality to the homogenization filter length. For example, FIGS. 3A and 3B demonstrate that as the homogenization filter length increases, the mainlobe smearing increases, and power decreases. The relationship between the homogenization filter length, the mainlobe smearing, and power also holds for filter lengths C<Bτ.

In the Pμ-STAP processing flow illustrated and described above with reference to FIG. 2, adaptive filtering and covariance estimation processes are utilized (e.g., at blocks 240 and 250). The adaptive filter and covariance matrix processing utilized in Pμ-STAP may be generated based on Equations (4)-(8), as shown in Equations (11)-(13) below:

$$\hat{R}_{P\mu,prime}(\ell_{CUT}) = \frac{1}{n(L_{prime})} \sum_{\substack{\ell \in L_{prime} \\ \ell \neq \ell_{CUT} \pm G}} \rho_{prime}(\ell)\rho_{prime}^{H}(\ell) \tag{11}$$

$$\hat{R}_{\mu,P\mu,NP}(\ell_{CUT}) = \frac{1}{n(L_{prime})K} \sum_{k=1}^{K} \sum_{\ell \in L_{prime}} \rho_{sec,k}(\ell)\rho_{sec,k}^{H}(\ell) \tag{12}$$

$$\hat{R}_{P\mu}(\ell_{CUT}) = \hat{R}_{P\mu,prime}(\ell) + \hat{R}_{P\mu,NP}(\ell_{CUT}) \tag{13}$$

It noted that the use of K additional channels of training data obtained from the K secondary homogenization filters does not actually provide more independent sample support. Instead, the smearing in range by multiple filters creates the appearance that further sample support is being obtained as a by-product of accessing a greater range extent than would otherwise be achieved by the single focused pulse compression filter (range sidelobes notwithstanding). This distinction is further illustrated below during discussion of simulation results, which describes Pμ-STAP cases involving K+1 filters for K=4 according to Equation (13) and the use of only 1 secondary filter without primary data via Equation (11).

Various approaches, referred herein to as reduced-dimension multi-waveform approaches, have been developed to enable STAP-type processes to be more easily realized in practical applications. For example, to avoid inversion of an MN×MN SCM, which may need to be performed separately for each range cell, partially adaptive approaches have been developed that require less training data and incur a lower computational cost. Below, a μ-STAP scheme is evaluated in the context of reduced-dimension implementations to assess the impact of their combination. Specifically, the discussion below examines element-space post-Doppler (ESPoD), beam-space pre-Doppler (BSPrD), and beam-space post-Doppler (BSPoD) formulations. The following summarizes these implementations and discusses how μ-STAP is incorporated into each.

Element-space multi-window post-Doppler (ESPoD) applies different Doppler filters to the pulsed echoes received at each antenna element. In other words, for ESPoD the Doppler processing component is non-adaptive and localized to a set of $D_t$ Doppler bins. Spatial processing is then fully adaptive across the N antenna elements. Therefore, each antenna element has an identical M×$D_t$ filter bank $F_m$ for the mth Doppler bin that can be used to construct an MN×$D_t$ N space-time transform:

$$T_m = F_m \otimes I_N \tag{14}$$

There are different ways one can select the Doppler filters in Equation (14). Below, the adjacent-bin approach is considered, though pulse repetition interval (PRI) staggered approaches are likewise applicable in the µ-STAP context. Adjacent-bin post-Doppler employs Doppler filters indexed by $-P, \ldots, m, \ldots, m+P$ where:

$$P=(D_t-1)/2 \qquad (15)$$

Let $U=[u_0 \ u_1 \ \ldots \ u_{M-1}]$ be an M×M discrete Fourier transform (DFT) matrix and b be a M×1 Doppler taper. The tapered mth Doppler filter is thus:

$$f_m = a \odot u_m^* \qquad (16)$$

for ⊙ denoting the Hadamard product and (•)* complex conjugation, so that the mth Doppler filter bank is:

$$F_m = [f_{m-P} \ldots f_m \ldots f_{m+P}] \qquad (17)$$

Note that $D_t$ must be odd and the Doppler filter bank should wrap around the edges of the Doppler space.

For a µ-STAP formulation, the transform in Equation (14) may be applied to the discretized versions of the primary and secondary data of Equations (2) or (9) as:

$$\tilde{z}_{prime,m}(l) = T_m^H z_{prime}(l)$$

$$\tilde{z}_{sec,1,m}(l) = T_m^H z_{sec,1}(l)$$

$$\tilde{z}_{sec,2,m}(l) = T_m^H z_{sec,2}(l)$$

$$\ldots$$

$$\tilde{z}_{sec,K,m}(l) = T_m^H z_{sec,K}(l), \qquad (18)$$

which transforms the MN×1 primary and secondary snapshots into $D_tN\times 1$ snapshots. The space-time steering vector from Equation (5) may likewise be transformed as:

$$\tilde{c}_{st,m}(\theta_{look},\omega_D) = T_m^H c_{st}(\theta_{look},\omega_D) \qquad (19)$$

Substituting Equation (18) into Equations (6)-(8) yields the ESPoD reduced dimension covariance matrix estimates:

$$\tilde{R}_{prime,m}(l_{CUT}) = T_m^H \hat{R}_{prime}(l_{CUT}) T_m, \qquad (20)$$

$$\tilde{R}_{\mu,NP,m}(l_{CUT}) = T_m^H \hat{R}_{\mu,NP}(l_{CUT}) T_m, \qquad (21)$$

$$\tilde{R}_{\mu,m}(l_{CUT}) = T_m^H \hat{R}_{\mu}(l_{CUT}) T_m, \qquad (22)$$

respectively. It is noted that partially adaptation techniques may be applied to many µ-STAP formulations, and in each instance, a single covariance estimate is generated. The mth transformed filter is obtained in the same manner as Equation (4), yielding:

$$\tilde{w}_m(l_{CUT},\theta_{look},\omega_D) = \tilde{R}_m^{-1}(l_{CUT})\tilde{c}_{st,m}(\theta_{look},\omega_D) = (T_m^H \hat{R} (l_{CUT})T_m)^{-1} T_m^H c_{st}(\theta_{look},\omega_D), \qquad (23)$$

for $R_m$ the associated SCM estimate from Equations (20)-(22). The transformed adaptive filter can also be expressed in terms of the full MN-dimensional representation using the composite filter:

$$w_m(l_{CUT},\theta_{look},\omega_D) = T_m \tilde{w}_m(l_{CUT},\theta_{look},\omega_D) = T_m(T_m^H \hat{R}(l_{CUT})T_m)^{-1} T_m^H c_{st}(\theta_{look},\omega_D), \qquad (24)$$

Additional details regarding the composite filter are described below with respect to SINR analysis.

Beam-space pre-Doppler (BSPrD) techniques are related to displaced phase center antenna (DPCA) processing. In contrast to element-space post-Doppler methods, now spatial beamforming is performed before adaptive processing. The adaptive processing may be performed over the full CPI, though the number of pulses M is often fairly large. It may be more efficient to reduce the MN-dimensional problem by beamforming over a subset of $D_t$ pulses. As such, the CPI of M pulses is subdivided into a set of $\tilde{M}$ sub-CPIs consisting of $D_t$ pulses each where:

$$\tilde{M} = M - D_t + 1, \qquad (25)$$

Each sub-CPI employs an identical bank of $D_s$ beamformers for the nth antenna element, thereby realizing the $MN \times D_t D_s$ space-time transform:

$$T_{\tilde{m}n} = J_{\tilde{m}} \otimes G_n, \qquad (26)$$

where $J_{\tilde{m}}$ is the $M \times D_t$ selection matrix for the $\tilde{m}$ th sub-CPI defined as:

$$J_{\tilde{m}} = \begin{bmatrix} 0_{\tilde{m} \times D_t} \\ I_{D_t} \\ 0_{(M-D_t-\tilde{m}) \times D_t} \end{bmatrix}, \qquad (27)$$

and $G_n$ is the nth beamformer matrix. The latter can be structured via displaced-beam or adjacent-beam, which are spatial analogs to the PRI-staggered and adjacent-bin Doppler filter banks.

In like manner as before, an adjacent-beam µ-STAP formulation is described; however, it is noted that µ-STAP may be used with either displaced-beam or adjacent-beam techniques. Define the nth beamformer as:

$$g_n = b \odot u_n^* \qquad (28)$$

where b is an N×1 taper and un is the nth column of an N×N DFT matrix (based on the assumption of an ideal uniform linear array). The adjacent-beam formulation combines temporal samples from D spatial beams indexed as $n-Q, \ldots, n, \ldots, n+Q$ centered around the nth column of the DFT matrix, with $Q = (D_s-1)/2$. The $N \times D_s$ reduced dimension beamforming matrix for the nth antenna element is thus:

$$G_n = [g_{n-Q} \ldots g_n \ldots g_{n+Q}], \qquad (29)$$

Applying Equation (26) to the discretized training data from Equation (2) (µ-STAP) or Equation (9) (Pµ-STAP) in the same manner as Equation (18) now realizes transformed primary and secondary snapshots of dimension $D_t D_s \times 1$. Likewise, $D_t D_s \times D_t D_s$ reduced-dimension SCM estimates $\tilde{R}_{\tilde{m},n}$, and an associated transformed space-time steering vector $\tilde{c}_{st,\tilde{m},n}(\theta_{look},\omega_D)$ can be obtained by applying the adjacent-beam transform of Equation (26) as in Equations (20)-(22) and Equation (19), respectively. In such instances, the nth adaptive beamformer for the $\tilde{m}$th sub-CPI is, as in Equation (24):

$$\tilde{w}_{\tilde{m},n}(l_{CUT},\theta_{look},\omega_D) = \tilde{R}_{\tilde{m},n}^{-1}(l_{CUT})\tilde{c}_{st,\tilde{m},n}(\theta_{look},\omega_D) = (T_{\tilde{m}n}^H \hat{R}(l_{CUT})T_{\tilde{m}n})^{-1} T_{\tilde{m}n}^H c_{st}(\theta_{look},\omega_D), \qquad (31)$$

for each particular combination of transformed primary/secondary data, with a corresponding full-dimension composite filter:

$$w_{\tilde{m},n}(l_{CUT},\theta_{look},\omega_D) = T_{\tilde{m}n}\tilde{w}_{\tilde{m},n}(l_{CUT},\theta_{look},\omega_D) = T_{\tilde{m}n}(T_{\tilde{m}n}^H \hat{R}(l_{CUT})T_{\tilde{m}n})^{-1} T_{\tilde{m}n}^H c_{st}(\theta_{look},\omega_D), \qquad (32)$$

An additional reduced-dimension multi-waveform approach is known as beam-space post-Doppler (BSPoD). BSPoD implementations pre-process over space and time by using both the Doppler filter bank $F_m$ from Equation (17) and the beamformer matrix $G_n$ from Equation (29). The combined adjacent-bin/adjacent-beam formulation utilized for BSPoD realizes the $MN \times D_t D_s$ space-time transform:

$$T_{m,n} = F_m \otimes G_n, \qquad (33)$$

which can also be applied as in Equations (18)-(24) to transform the primary/secondary data, the space-time steering vector, the various SCM estimates, the reduced-dimension adaptive filter, and the full-dimension composite filter.

The above-described space-time transforms and subsequent STAP implementations have been described above to provide a better understanding of the description below, in which these techniques are considered in the context of the Pμ-STAP techniques disclosed herein, which itself involves a transformation of the training data in the range domain, albeit for the purpose of enhanced robustness to non-homogeneous data rather than simply to reduce dimensionality. It is noted that the receive chain processing of FIG. 2 may be utilized to implement the reduced dimension Pμ-STAP techniques described below.

As an illustrative example of applying the above-described techniques to Pμ-STAP, consider an airborne multi-channel GMTI radar that is side-looking. The antenna (e.g., the antennas 132 of FIG. 1) may be an N=11 element uniform linear array with half-wavelength spacing that emits a CPI of M=21 identical pulsed waveforms. The platform is assumed to have no crab-angle and traverses one half-interelement spacing during the CPI (so β=1). The clutter is generated by dividing the range ring in azimuth into 241 equal-sized clutter patches. The scattering from each patch is IID and drawn from a complex Gaussian distribution and scaled such that the total clutter-to-noise ratio (CNR) is 54 dB. The thermal noise is complex white Gaussian.

SINR analysis was performed using a normalized SNR metric cast in the partially adaptive framework. Using the optimum covariance $R_{opt}$ based on clairvoyant knowledge and any composite filter, the SINR is for these reduced-dimension implementations is:

$$\text{SINR}(\omega_D) = \max_m \left\{ \frac{|w_m^H c_{st}|^2}{w_m^H R_{opt} w_m} \right\}, \quad (34)$$

where the dependencies on $1_{CUT}$, $\theta_{look}$, and $\omega_D$ have been suppressed for brevity. By setting $\hat{R}(1_{CUT})=R_{opt}$ in $w_m$, Equation (28) becomes the fully adaptive clairvoyant SINR, which may be defined as:

$$\text{SINR}_{opt}(\omega_D) = c_{st}^H R_{opt}^{-1} c_{st}, \quad (35)$$

Normalizing the SINR by SNR yields the SINR loss metric:

$$L_{SINR}(\omega_D) = \frac{\text{SINR}(\omega_D)}{SNR}, \quad (36)$$

This indicates the amount of loss as a function of Doppler that is imposed collectively by clutter cancellation using the given estimated covariance matrix and the dimensionality reducing transformation.

Figure 4:
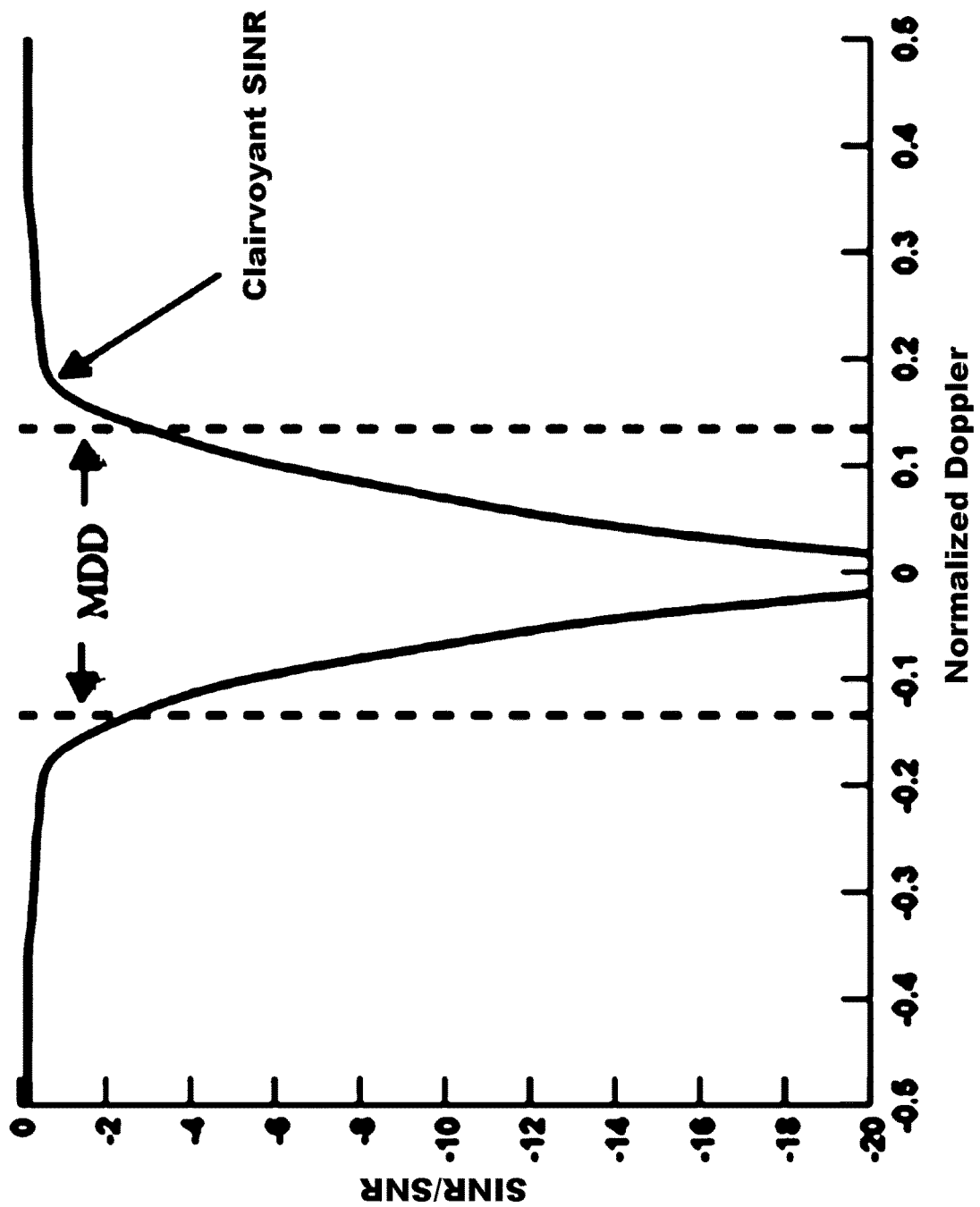
FIG. 4 is a plot illustrating a normalized clairvoyant MDD.

Now, let $f_{min}=\omega_{min}/2\pi$ be the clairvoyant minimum detectable Doppler (MDD), which may be defined as:

$$f_{min}(L_{SINR}) = \frac{1}{2}(f_U(L_{SINR}) - f_L(L_{SINR})), \quad (37)$$

where $f_L(L_{SINR})$ and $f_U(L_{SINR})$ demarcate the lower and upper edges of the clutter notch. The minimum detectable velocity can then be obtained by multiplying $f_{min}$ by a half-wavelength. During evaluation of the above technique, the clutter cancellation of the optimal processing was considered to cause no more than a −3 dB SINR loss in signal power. For the parameters used in these simulations and based on clairvoyant knowledge of the clutter, the normalized clairvoyant MDD is $f_{min}(L_{SINR}) \cong 0.13$, which as observed in FIG. 4 could be positive or negative. Equation (38), below, represents an improvement factor metric that utilizes the ratio of Equations (34) and (35) to compare the mean performance evaluated across Doppler as function of range sample intervals as it converges toward RMB rule of 2NM. However, as FIG. 3 shows, the deep clutter notch will skew an averaging across Doppler.

Figure 5:
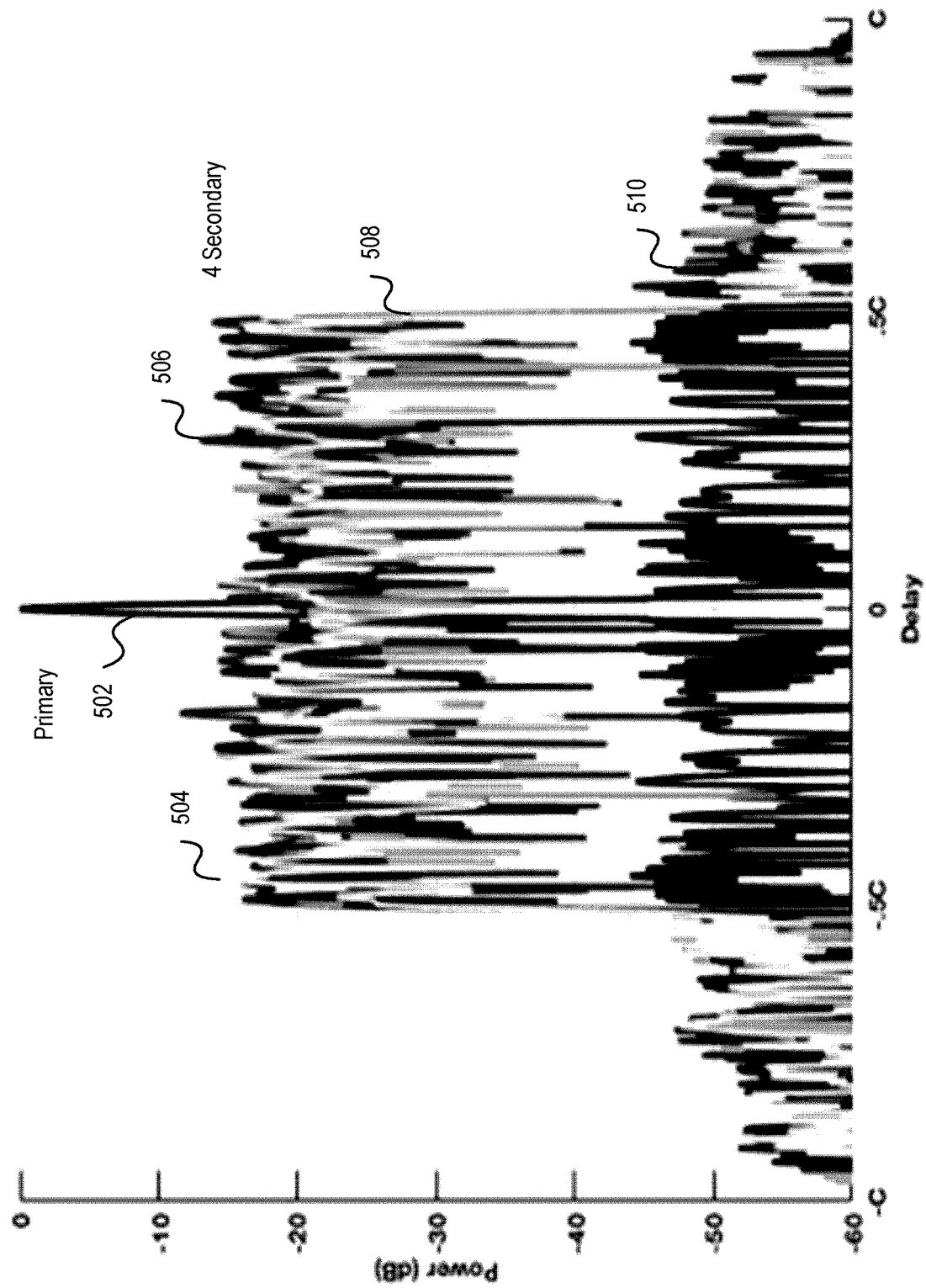
FIG. 5 is a plot illustrating primary and secondary match filter responses to an optimized PCFM waveform.

To ensure a meaningful comparison, the clutter notch may be excluded such that:

$$\text{mean}_{\omega_D}\left\{ \frac{\text{SINR}(\omega_D)}{\text{SINR}_{opt}(\omega_D)} \right\} \quad (38)$$

computed over $\omega_D < -\omega_{min}$ and $\omega_D > \omega_{min}$ (i.e. outside the clutter notch region). This value is determined as a function of the number of range sample intervals included in SCM estimation for different implementation schemes and clutter scenarios. For beam-space dimensionality reductions, N=11 receive elements are reduced to $D_s=5$ beams. The post-Doppler algorithms reduce M=21 to $D_{t2}=11$ and $D_{t1}=5$ pulses in each sub-CPI to compare the two sample support regimes. Adjacent-bin and adjacent-beam algorithms are uniformly tapered. Also note that PRI-staggered and displaced-beam techniques were extensively examined and found to provide similar benefits as those presented below. The number of range samples used in the SCM was varied from 1 to 2NM=682. For Pμ-STAP, range samples for SCM were increased from (K+1) to (K+1)2NM due to the extra training data from the K secondary homogenization filters. Diagonal loading was employed for all SCM estimates using the true noise power. The primary (transmit) waveform was an optimized polyphase-coded FM (PCFM) waveform [PCFM1, PCFM2] with time-bandwidth product BT=100. Four secondary homogenization filters (K=4) were utilized according to Equation (9) to provide less than 17 dB cross-correlation after the initial pulse compression stage. FIG. 5 illustrates the observed primary and secondary filter responses. In FIG. 5, the primary response is shown at 502 and the 4 secondary responses are illustrated at 504, 506, 508, and 510. As can be seen in FIG. 5, mainlobe smearing was present in the secondary responses 504, 506, 508, and 510.

Below, the performance of partially adaptive Pμ-STAP is presented in three clutter environments: 1) non-homogeneous; 2) non-homogeneous clutter with a large clutter discrete in the CUT; and 3) non-homogeneous clutter with 10 large targets in the training data. For all cases, a point target was placed in the CUT. The SINR loss for each clutter scenario and reduction combination was averaged over 50 independent Monte Carlo trials. Table 1 and FIG. Below, a comparison is presented between SISO STAP and two Pμ-STAP formulations: primary and 4 secondary filters, and 1 secondary filter (SISO Pμ-STAP) for fully adaptive and partially adaptive formulations. Table I shows the different receive processing configurations applied to each environment for each reduction technique. It is noted that the different reference numbers corresponding to the different line styles shown in Table I are shown in each of FIGS. 6A-16C.

TABLE 1

Receive Processing Configurations

| Receive Processing | Line style/Ref. number |
|---|---|
| primary, full (M = 21) | solid 622 |
| primary, partial(D$_{t2}$ = 11) | solid 612 |
| primary, partial (D$_{t1}$ = 5) | solid 602 |
| primary, secondary (K = 4), full (M = 21) | dashed 624 |
| primary, secondary (K = 4), partial (D$_{t2}$ = 11) | dashed 614 |
| primary, secondary (K = 4), partial (D$_{t1}$ = 5) | dashed 604 |
| secondary (K = 1), full (M = 21) | dotted 626 |
| secondary (K = 1), partial (D$_{t2}$ = 11) | dotted 616 |
| secondary (K = 1), partial (D$_{t1}$ = 5) | dotted 606 |

Figure 6A:
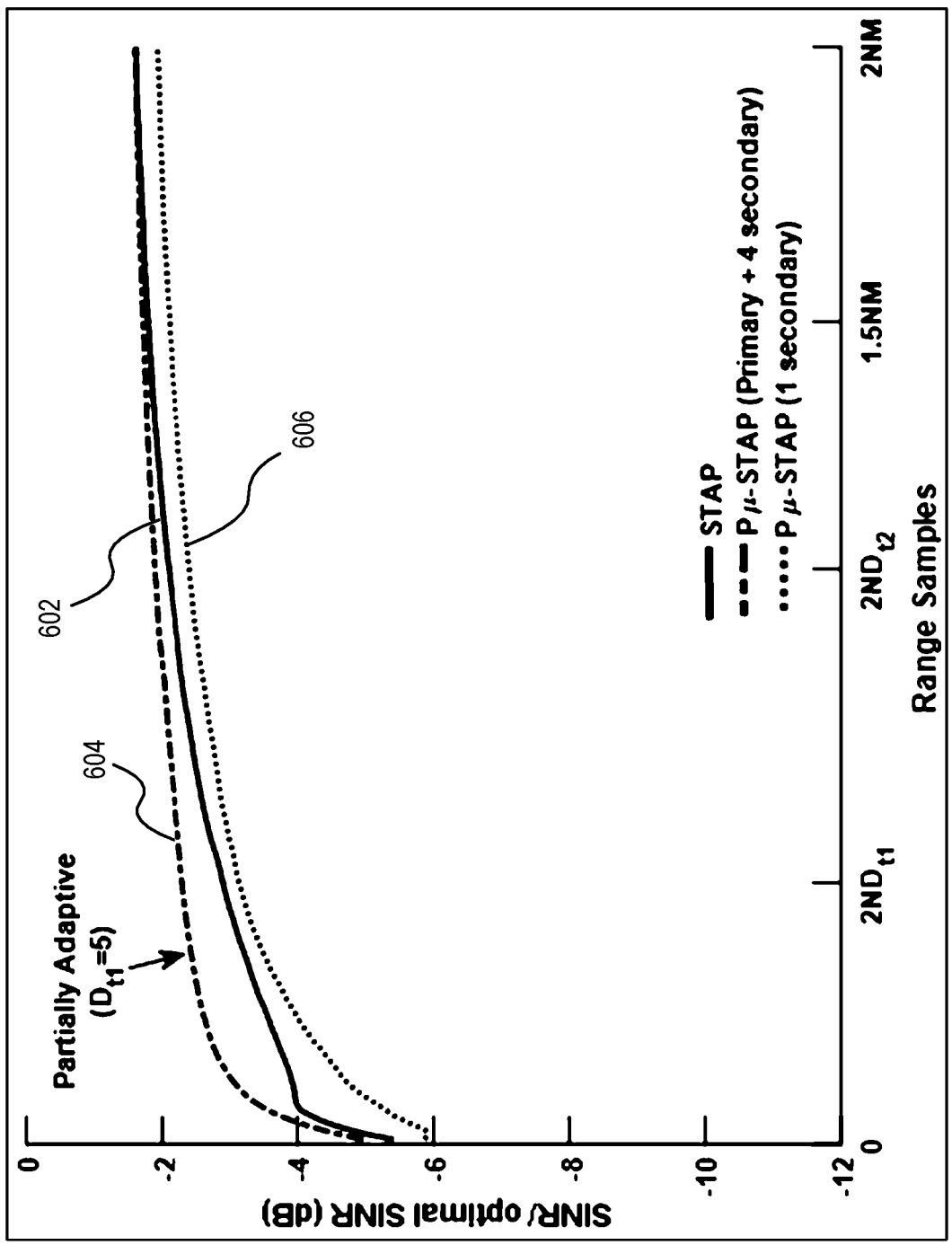
FIG. 6A is plot of mean SINR loss over Doppler (excluding the clutter notch) as a function of training sample support for an adjacent bin implementation of ESPoD.
Figure 6B:
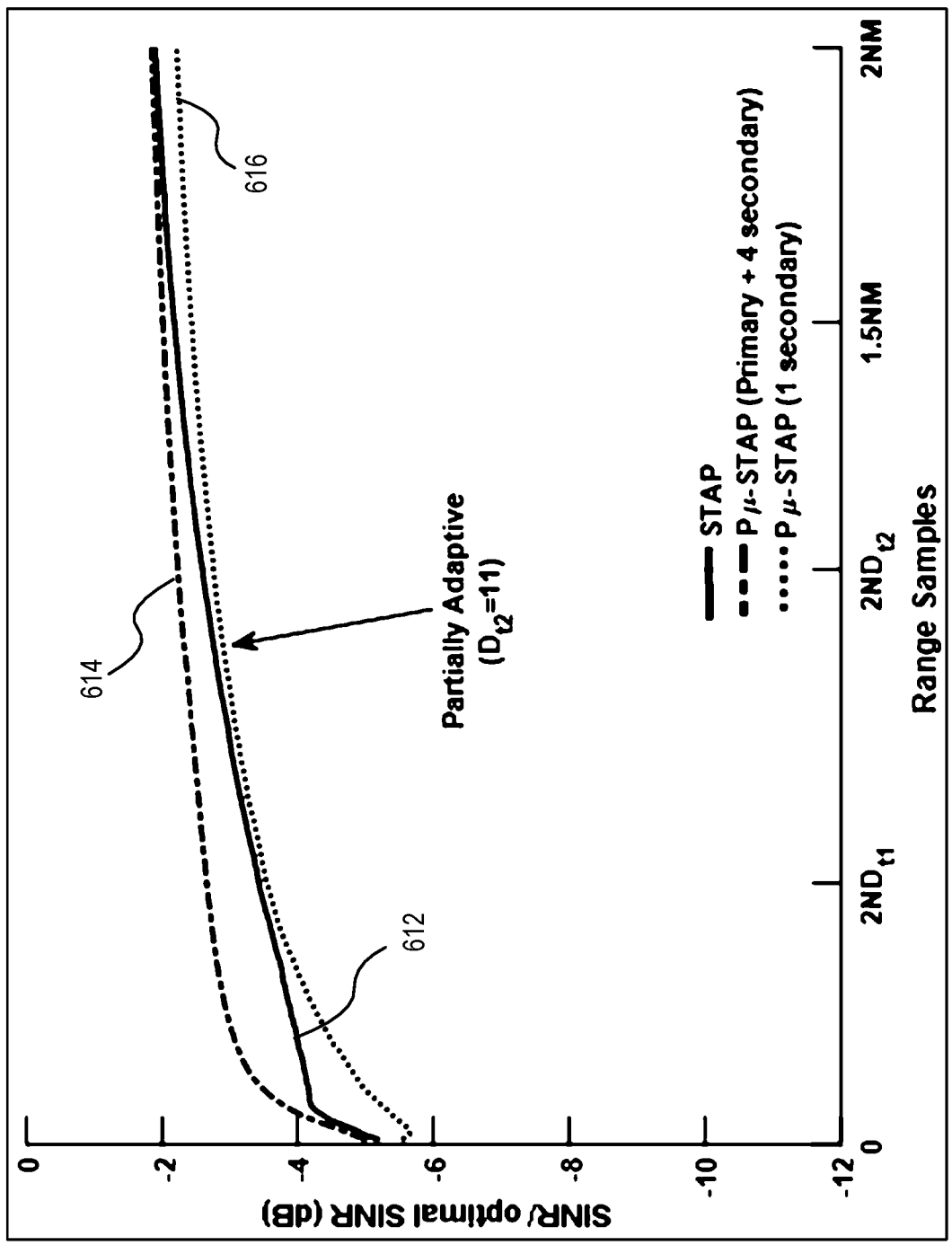
FIG. 6B is plot of mean SINR loss over Doppler (excluding the clutter notch) as a function of training sample support for an adjacent bin implementation of ESPoD.
Figure 6C:
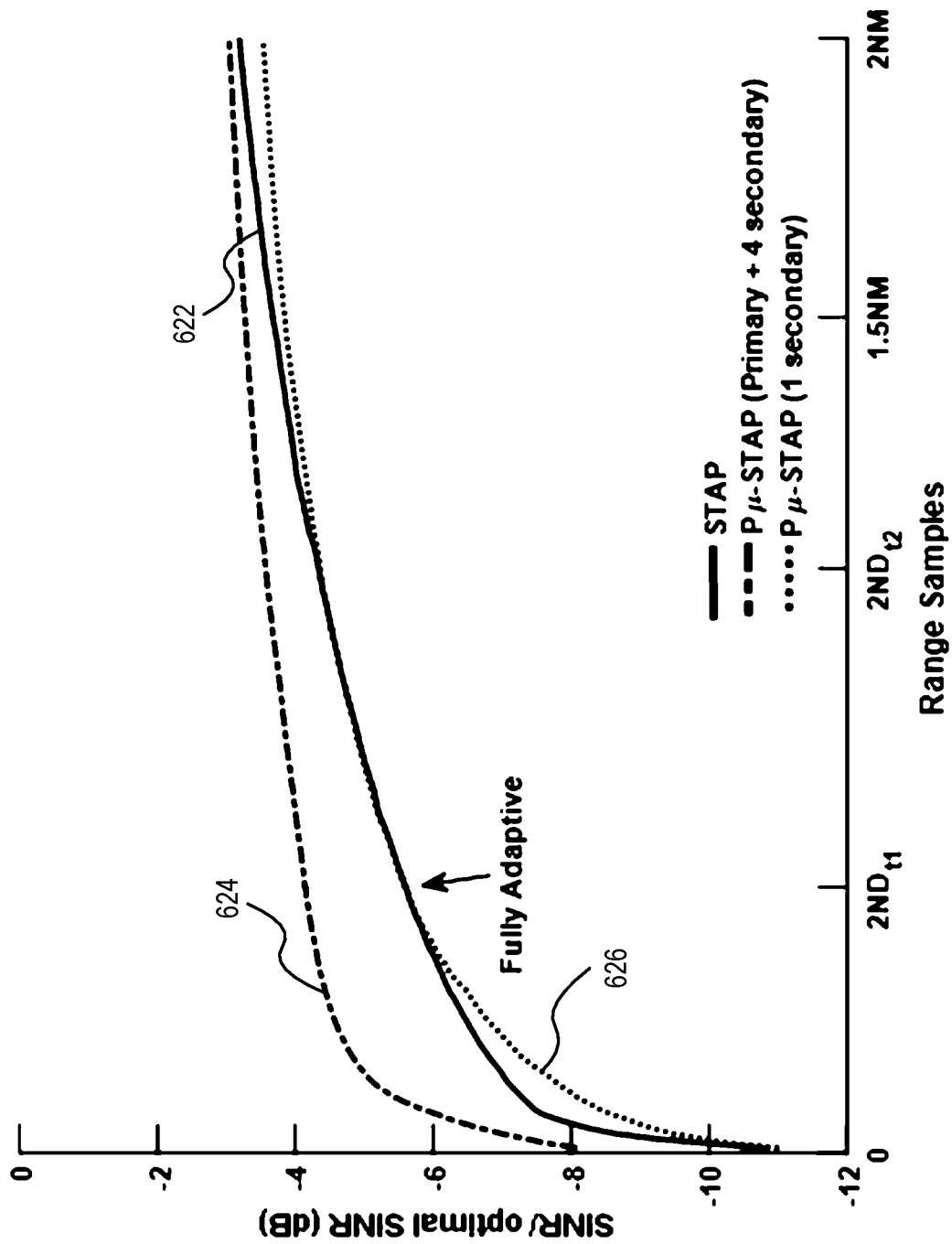
FIG. 6C is plot of mean SINR loss over Doppler (excluding the clutter notch) as a function of training sample support for an adjacent bin implementation of ESPoD.

The non-homogeneous clutter was modeled by randomly modulating the power of complex Gaussian homogeneous clutter patches for each range and angle clutter patch using a Weibull distribution with a shape parameter of 1.7. The added magnitude modulation was distributed randomly from [0, 30] dB. In addition to the spectrally white scattering from each clutter patch, internal clutter motion (ICM) was introduced to the clutter. The ICM was uniformly distributed across ±2% of the normalized Doppler response. For the adjacent-bin implementation of ESPoD, FIGS. 6A-6C shows the mean SINR loss over Doppler (excluding the clutter notch) as a function of training sample support. FIGS. 6A-6C illustrate that as the number of sub-CPIs are reduced, Pμ-STAP provides dwindling improvement. However, the greatest SINR advantage of Pμ-STAP as compared to standard STAP was realized in the small sample support regime, which is the most realistic regime for an operational system.

TABLE 2

Mean Convergence Comparison for Non-Homogeneous Clutter using Element-Space Post-Doppler (dB)

| Receive Processing | 2ND$_{t1}$ | 2ND$_{t2}$ |
|---|---|---|
| primary only, full (M = 21) | −5.60 | −4.34 |
| primary only, partial (D$_{t1}$ = 5) | −2.90 | −2.10 |
| primary only, partial (D$_{t2}$ = 11) | −3.43 | −2.60 |
| secondary only, full (M = 21) | −5.59 | −4.36 |
| secondary only, partial (D$_{t1}$ = 5) | −3.14 | −2.40 |
| secondary only, partial (D$_{t2}$ = 11) | −3.55 | −2.76 |
| primary + 4 sec., full (M = 21) | −4.15 | −3.58 |
| primary + 4 sec., partial (D$_{t1}$ = 5) | −2.30 | −1.89 |
| primary + 4 sec., partial (D$_{t2}$ = 11) | −2.66 | −2.23 |

Figure 7A:
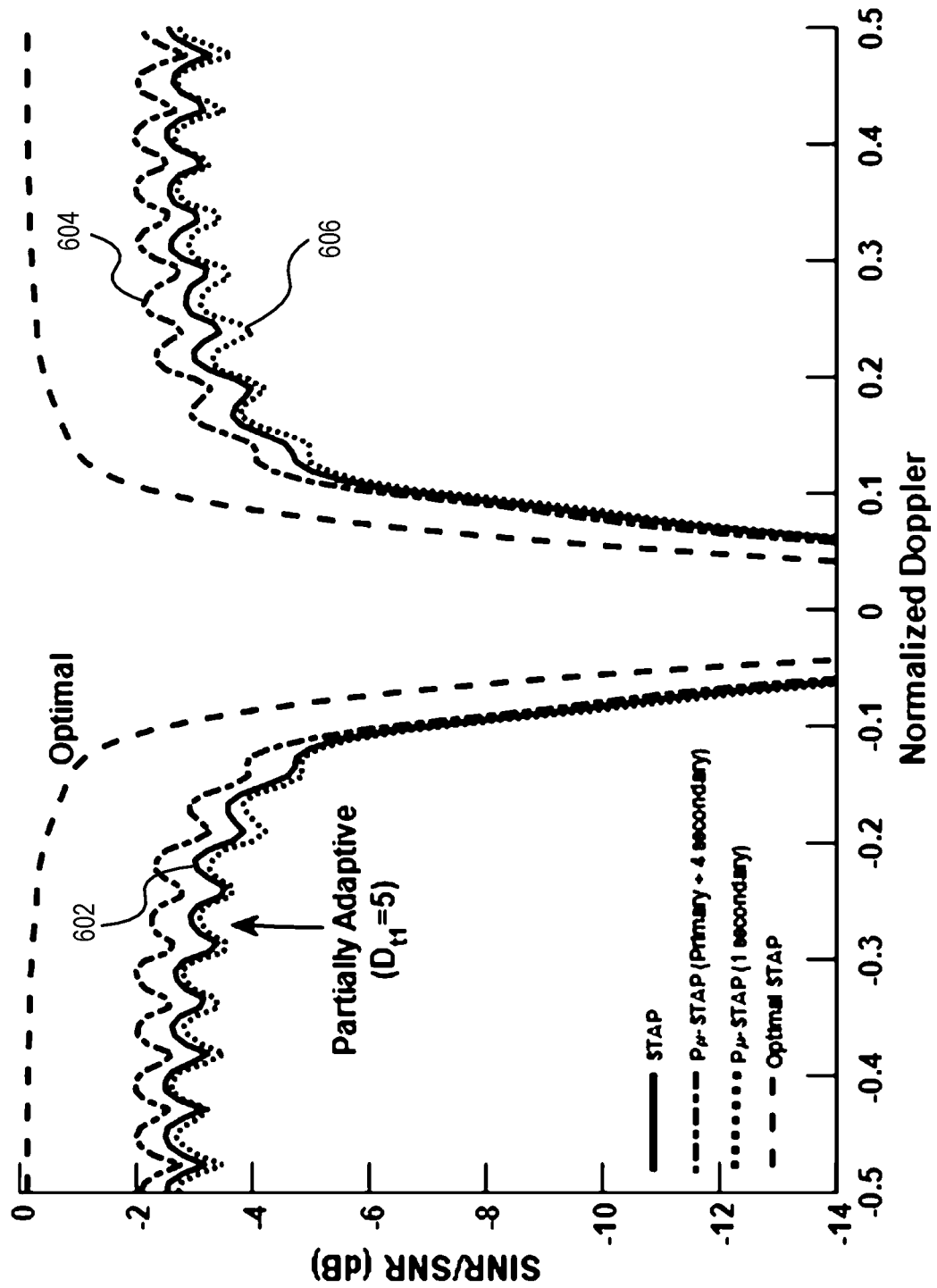
FIG. 7A is a plot illustrating the SINR-normalized SNR versus normalized Doppler.
Figure 7B:
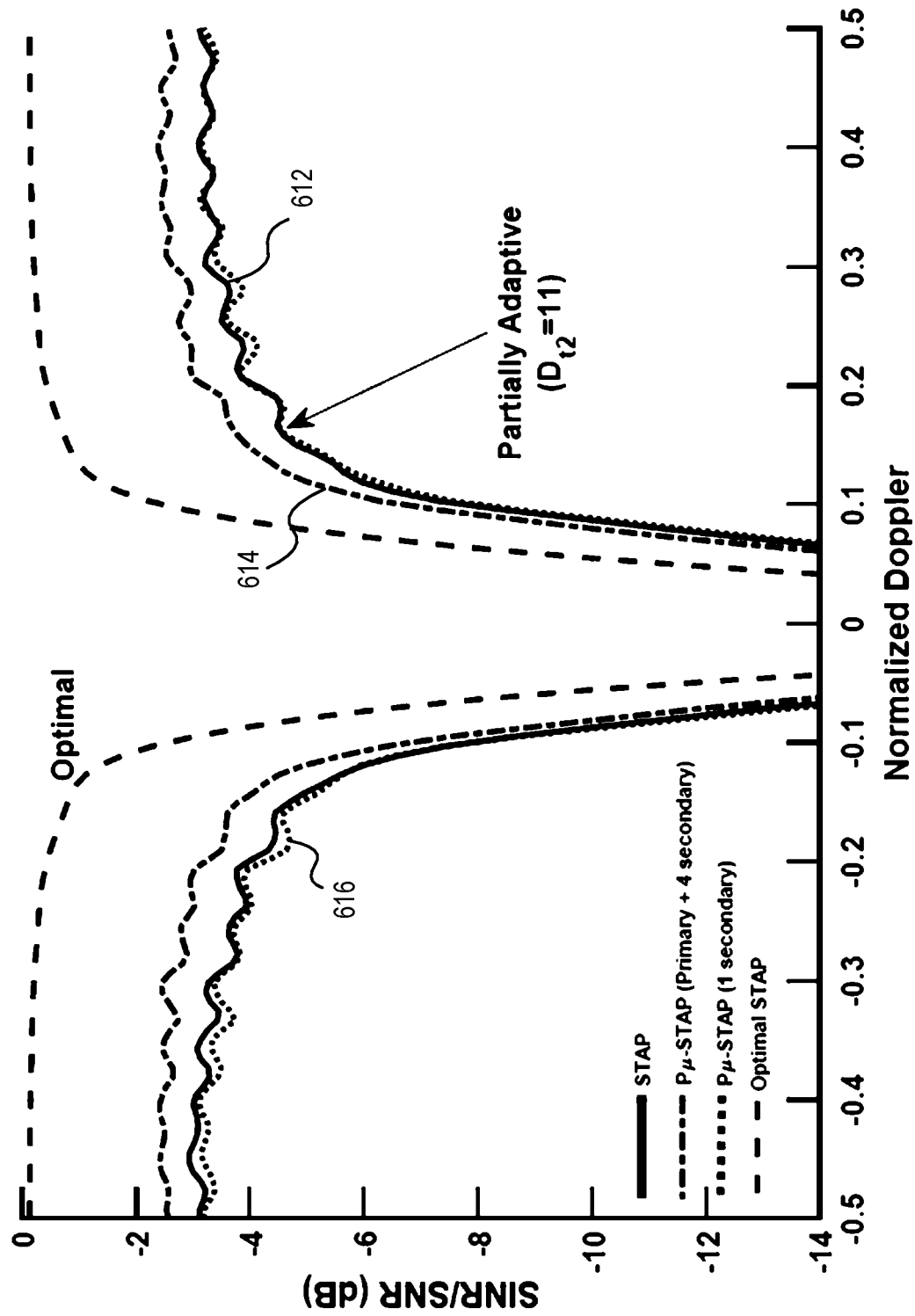
FIG. 7B is a plot illustrating the SINR-normalized SNR versus normalized Doppler.
Figure 7C:
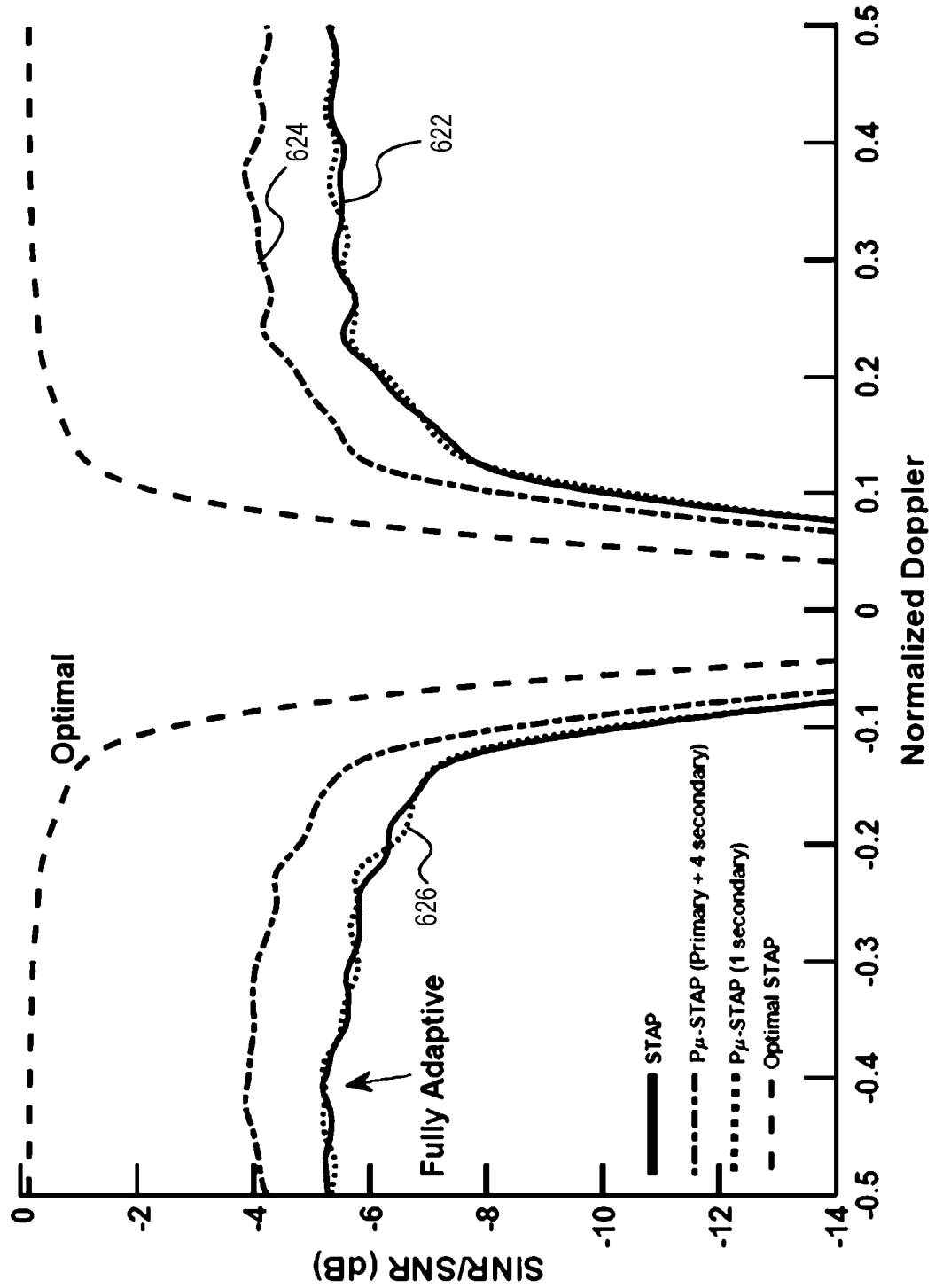
FIG. 7C is a plot illustrating the SINR-normalized SNR versus normalized Doppler.
Figure 8A:
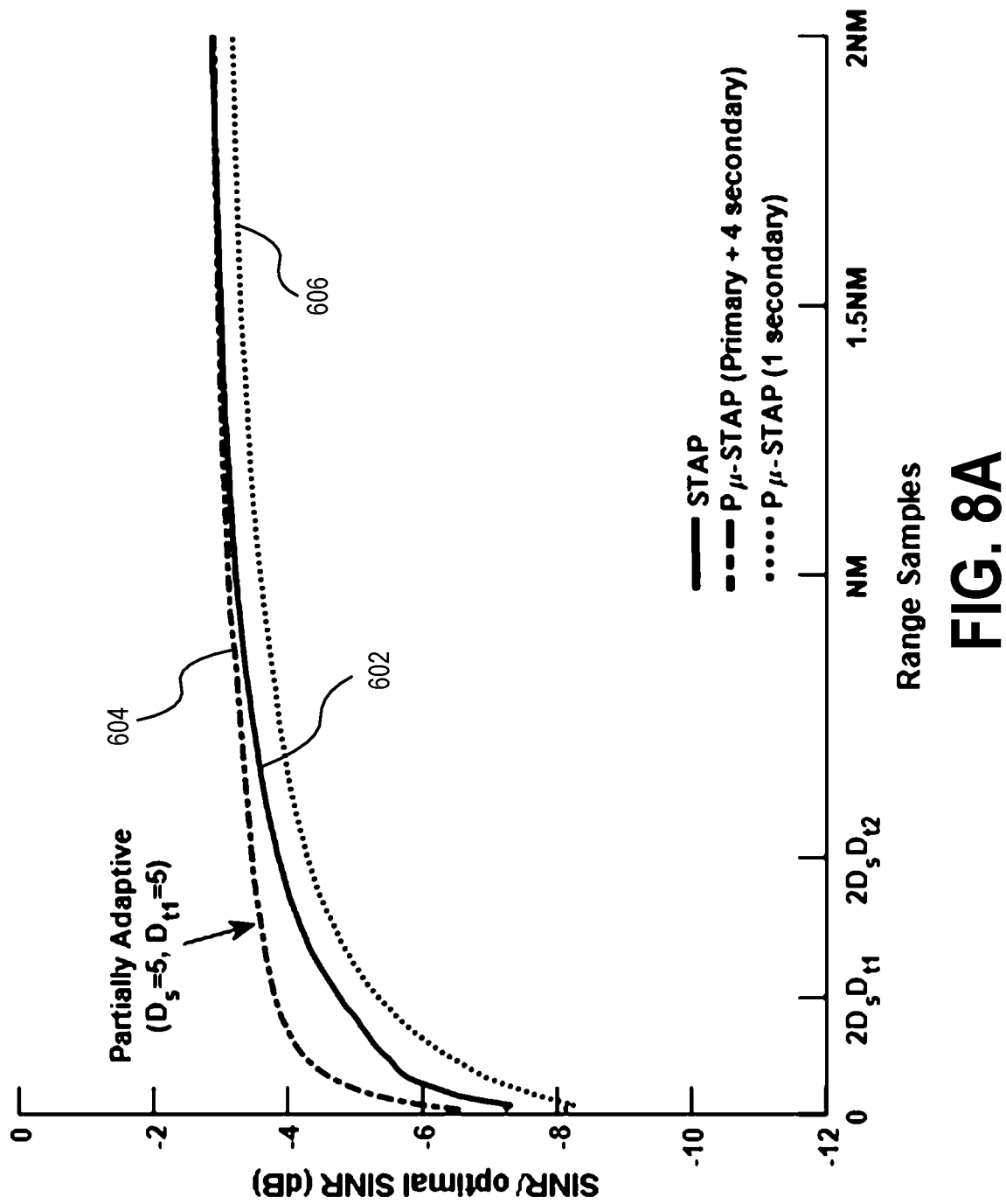
FIG. 8A is plot of mean SINR loss over Doppler (excluding the clutter notch) as a function of training sample support for an adjacent bin implementation of BSPrD.
Figure 8B:
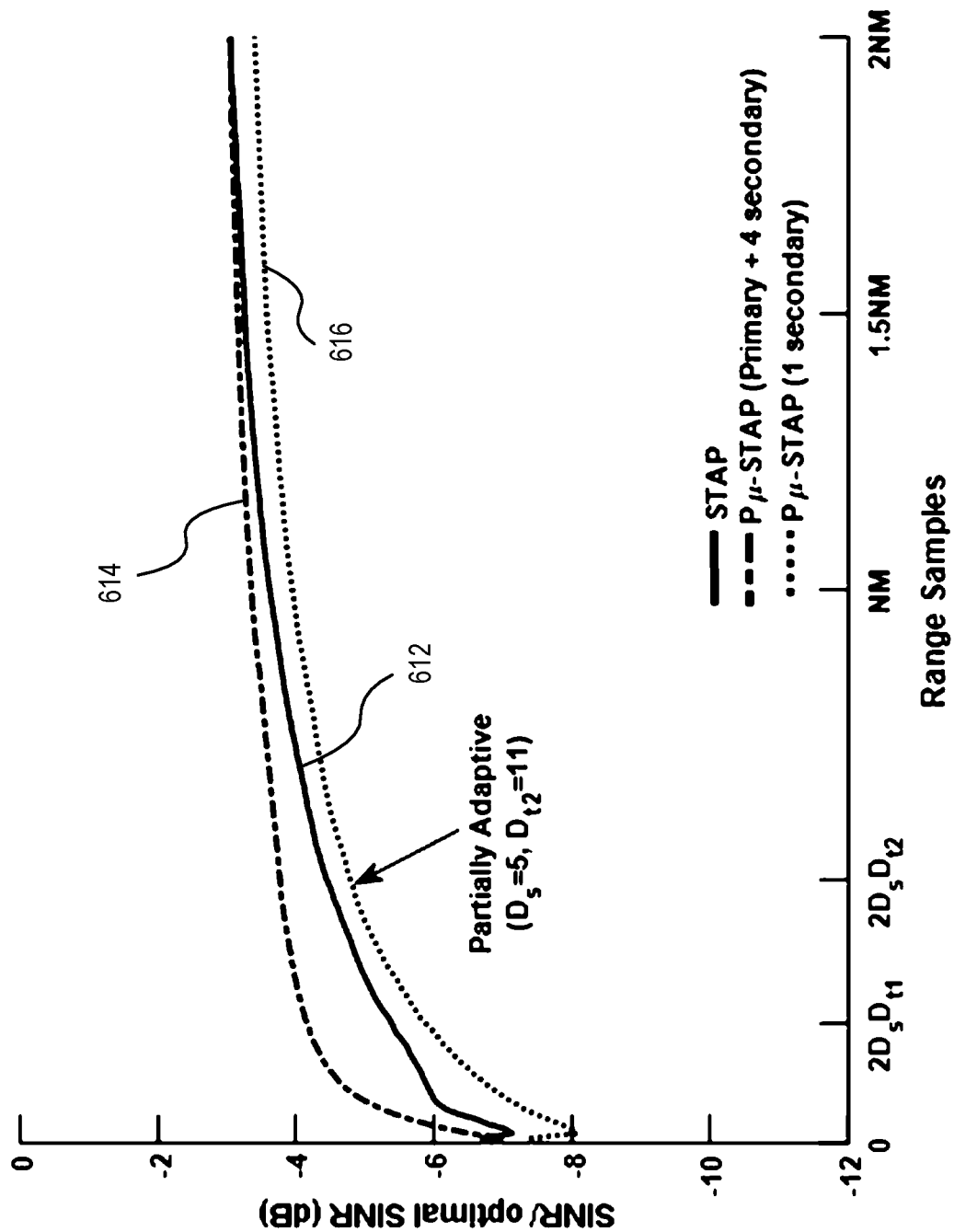
FIG. 8B is plot of mean SINR loss over Doppler (excluding the clutter notch) as a function of training sample support for an adjacent bin implementation of BSPrD.
Figure 8C:
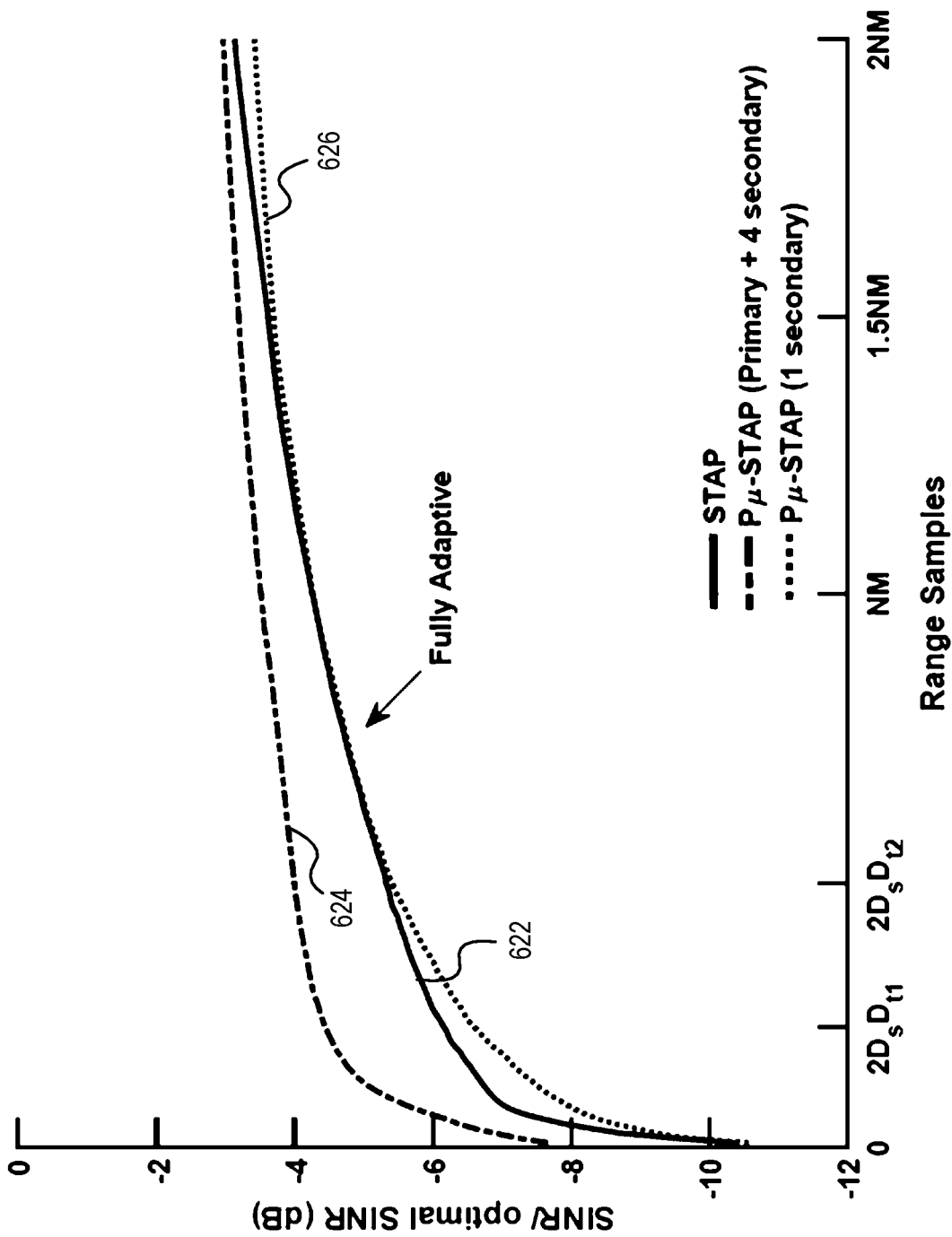
FIG. 8C is plot of mean SINR loss over Doppler (excluding the clutter notch) as a function of training sample support for an adjacent bin implementation of BSPrD.
Figure 9B:
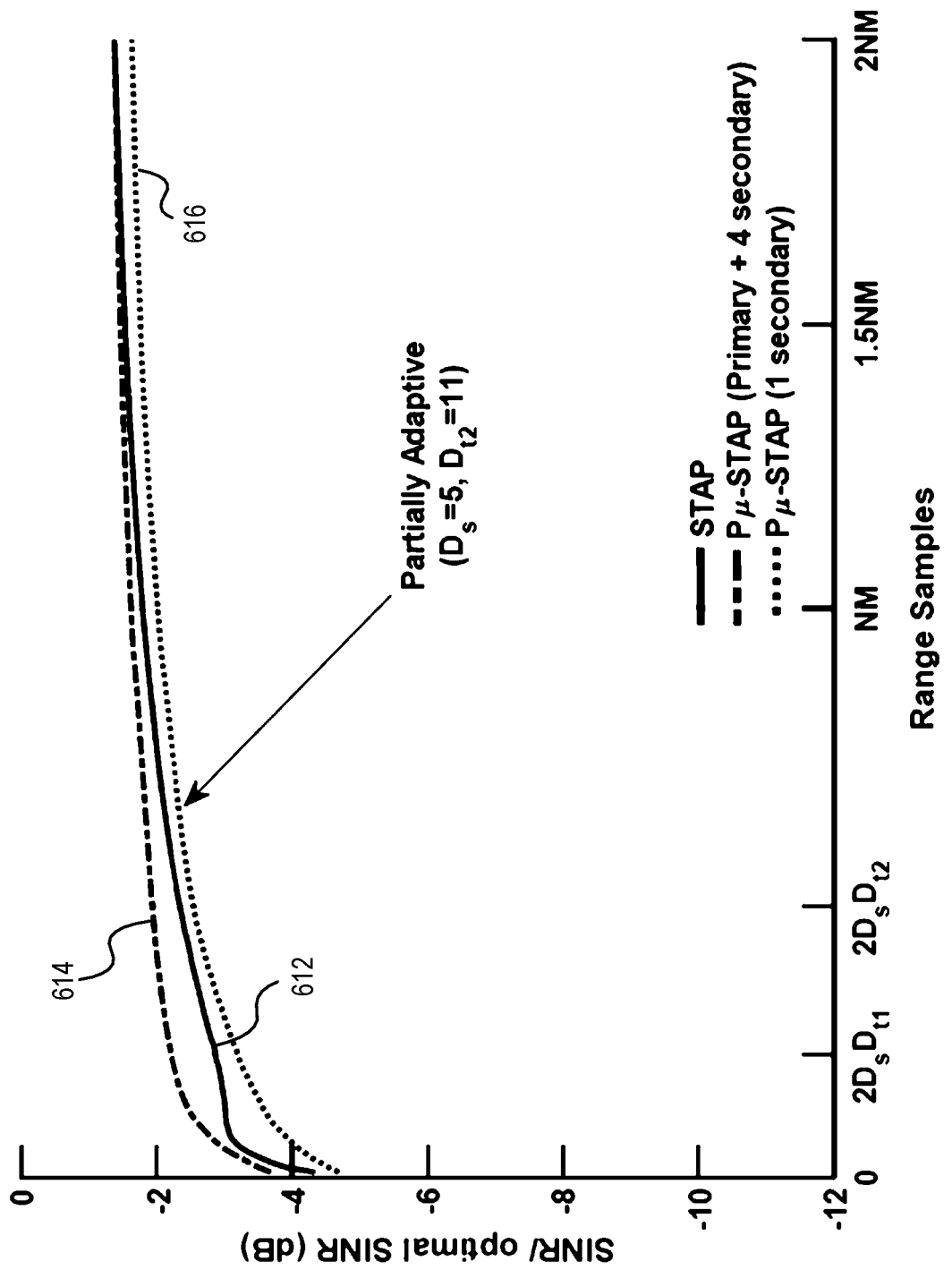
FIG. 9B is a plot illustrating mean convergence for BSPoD.
Figure 9C:
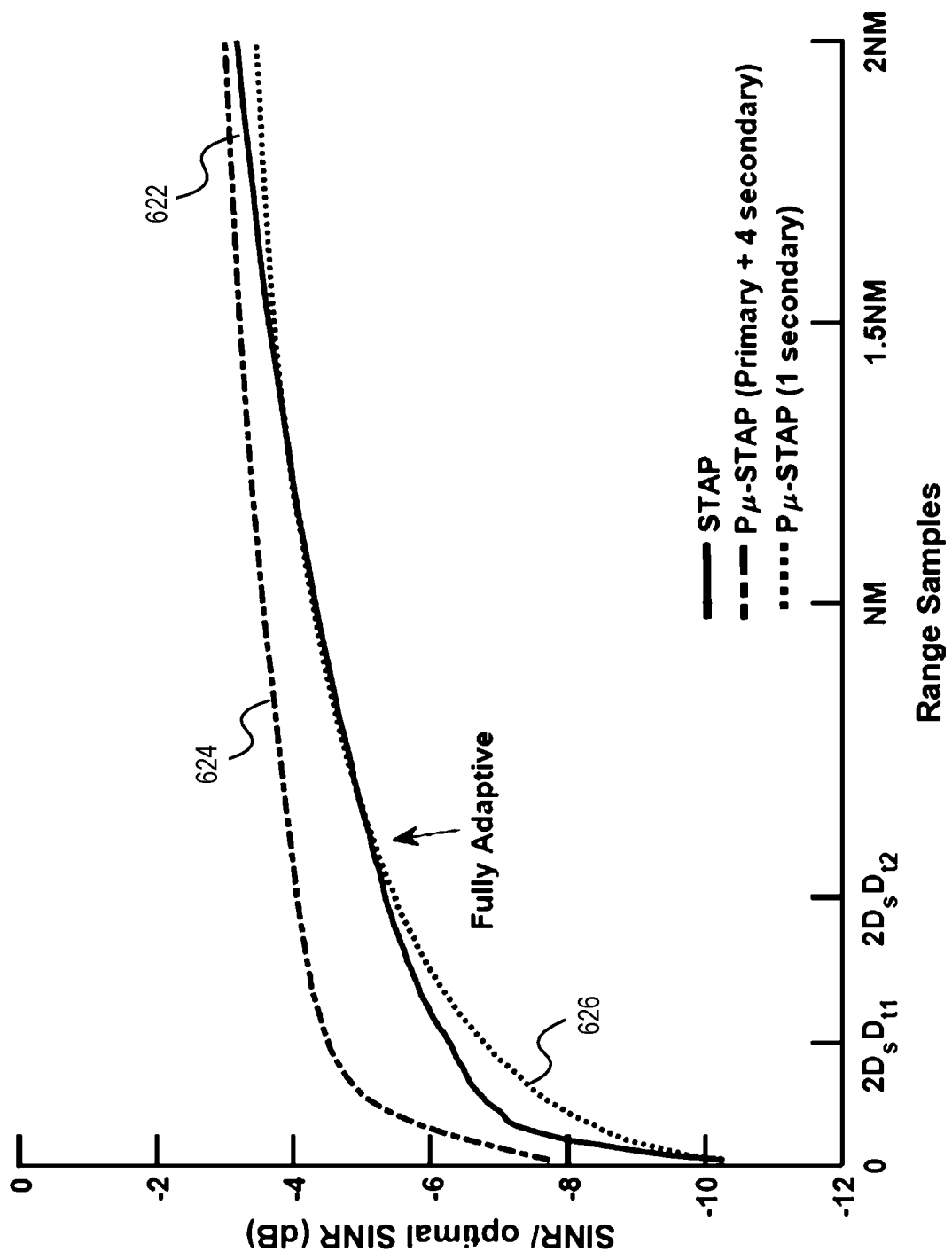
FIG. 9C is a plot illustrating mean convergence for BSPoD.
Figure 10A:
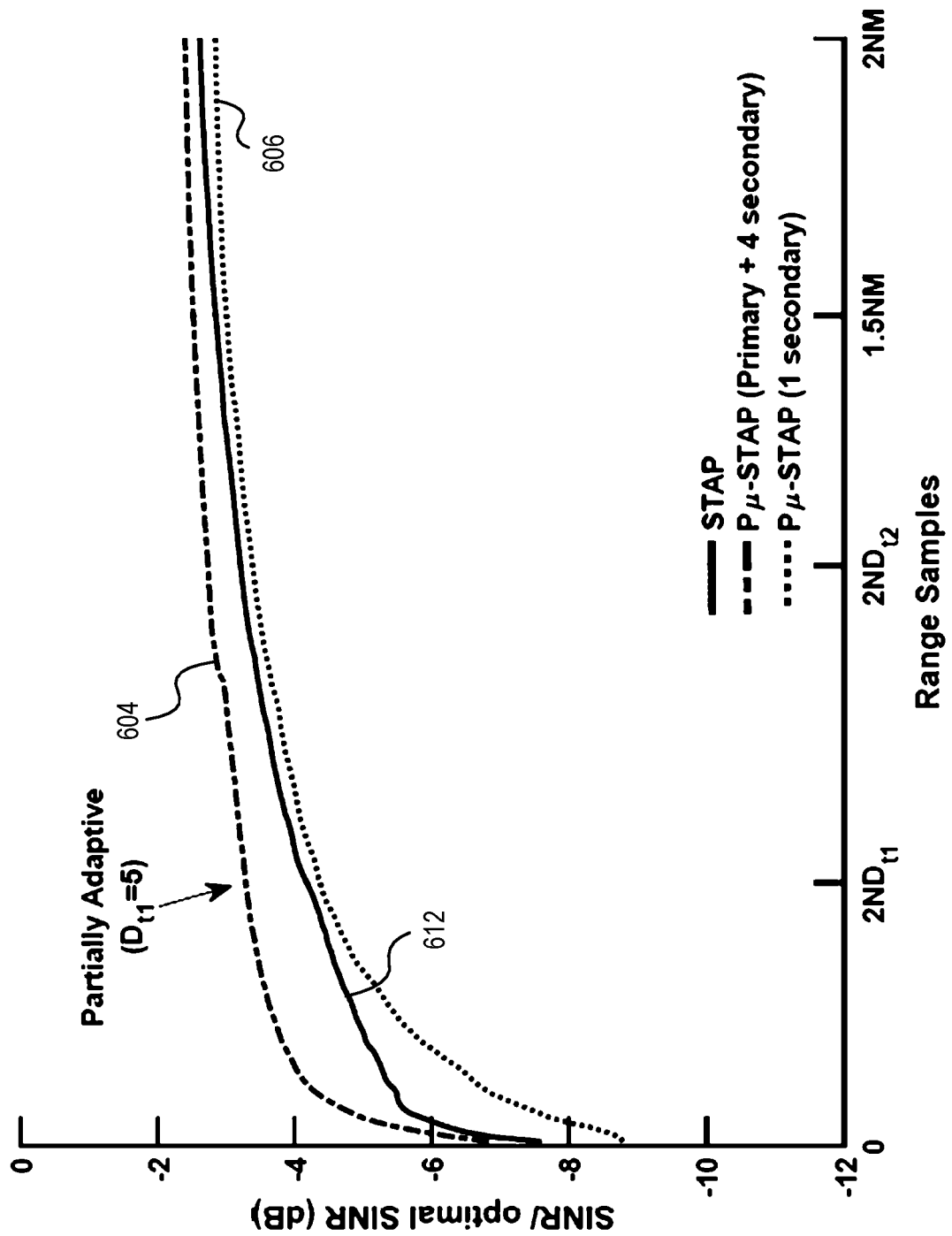
FIG. 10A is a plot illustrating a clutter discrete for an adjacent bin implementation of ESPoD.
Figure 10B:
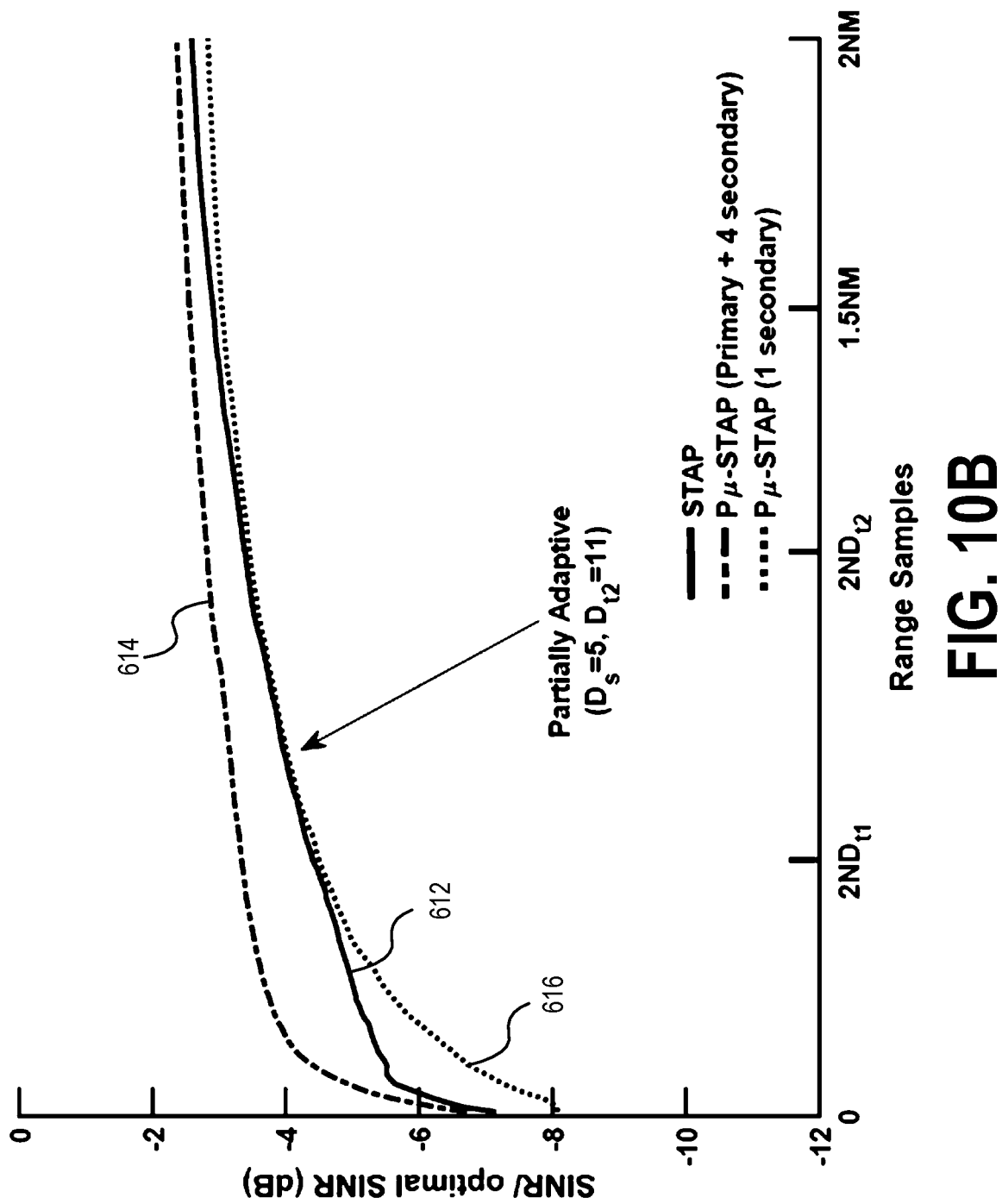
FIG. 10B is a plot illustrating a clutter discrete for an adjacent bin implementation of ESPoD.
Figure 10C:
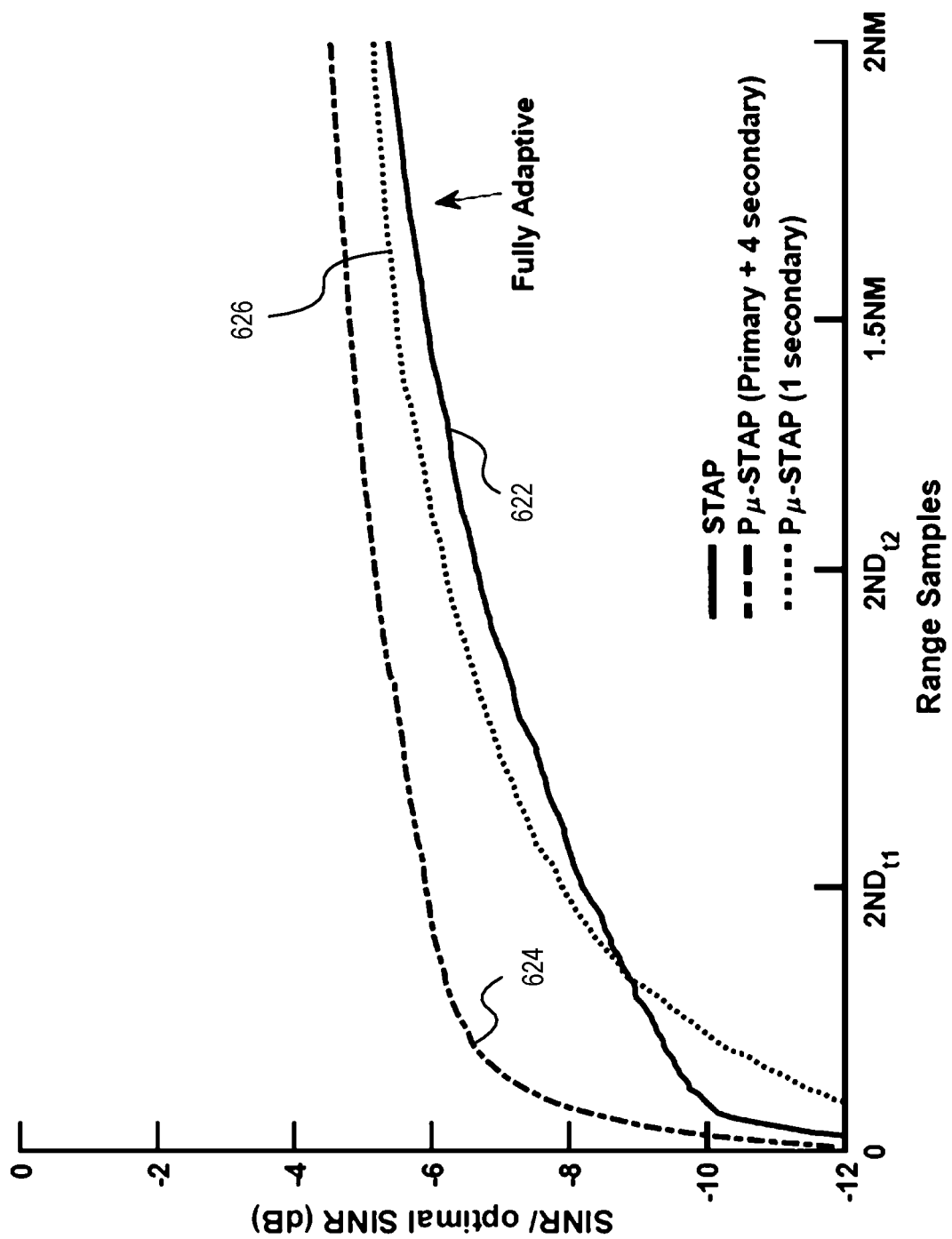
FIG. 10C is a plot illustrating a clutter discrete for an adjacent bin implementation of ESPoD.
Figure 11A:
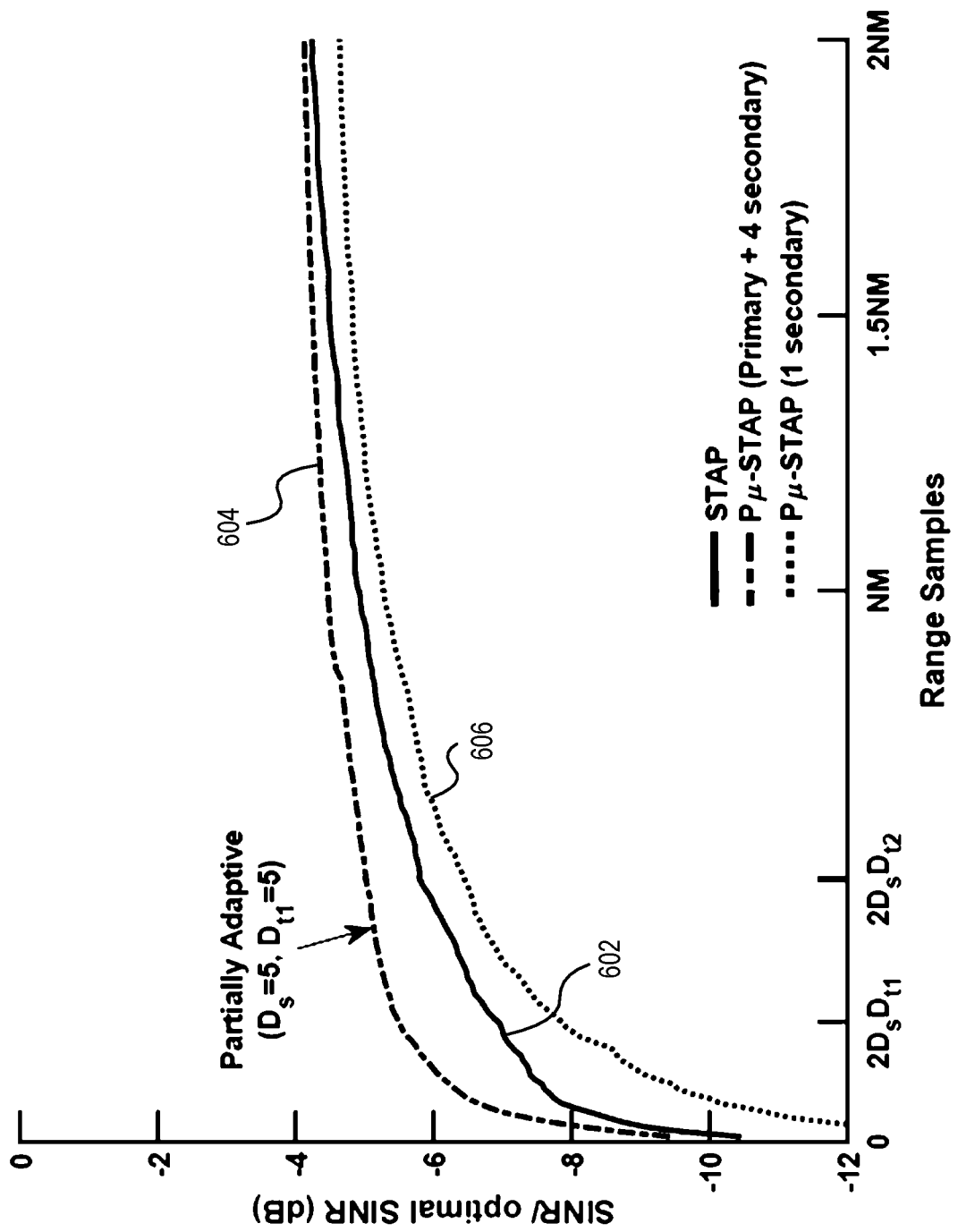
FIG. 11A is a plot illustrating a clutter discrete for an adjacent bin implementation of BSPrD.
Figure 11B:
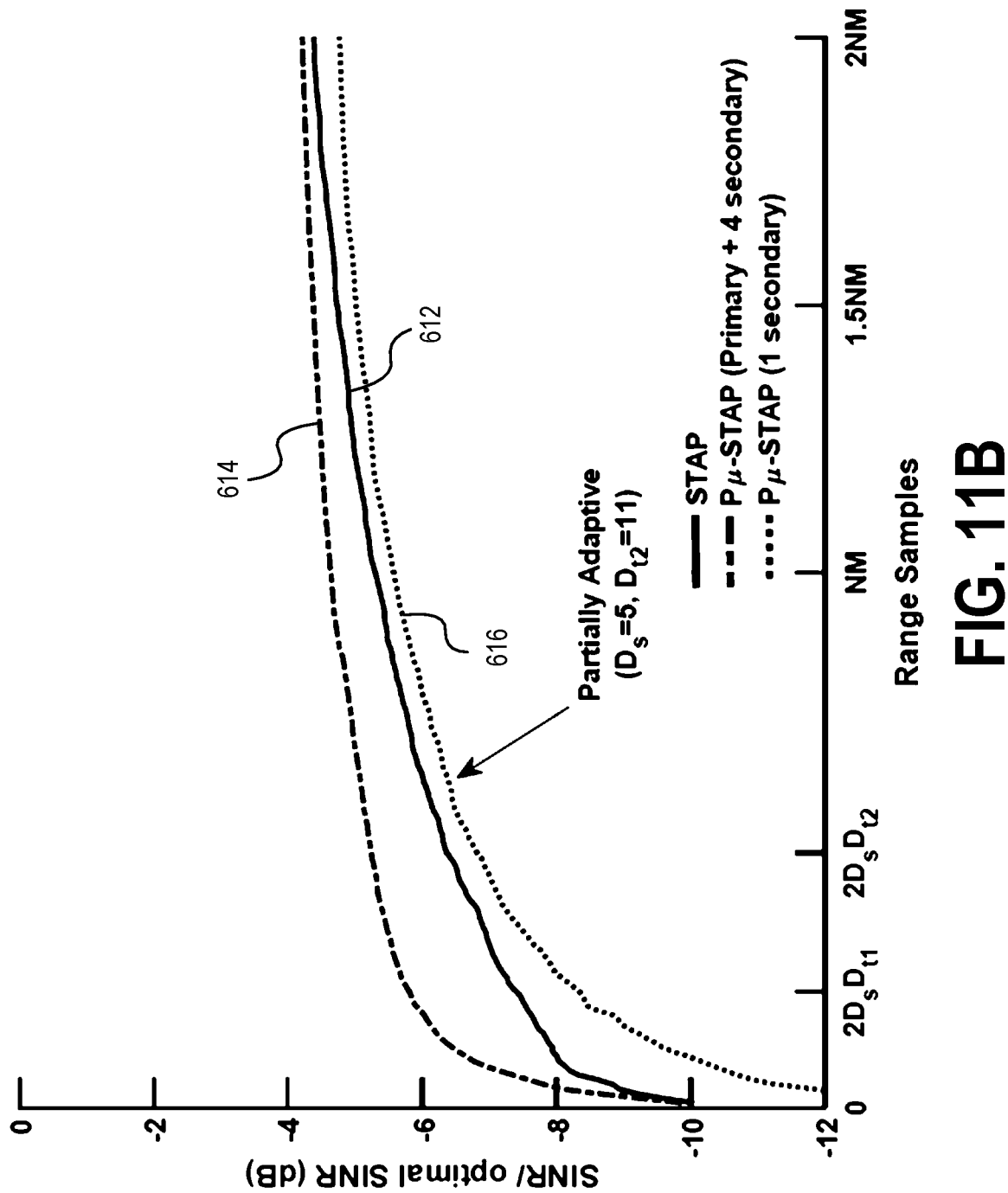
FIG. 11B is a plot illustrating a clutter discrete for an adjacent bin implementation of BSPrD.
Figure 11C:
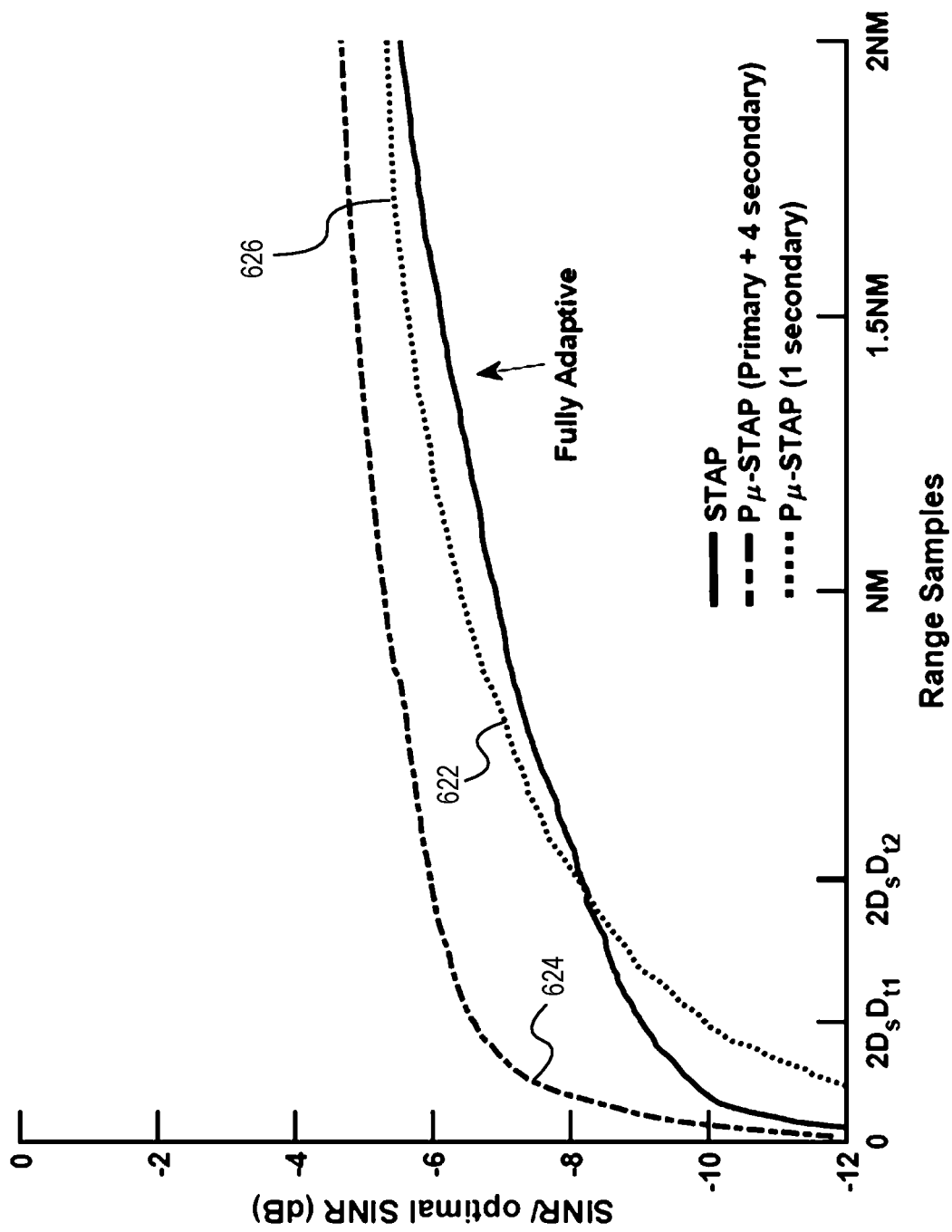
FIG. 11C is a plot illustrating a clutter discrete for an adjacent bin implementation of BSPrD.

Table 2 presents the values for improvement factor presented for ESPoD at the RMB rule of 2NM range sample intervals. As shown in Table 2, partially adaptive STAP provides an increase in SINR over fully adaptive. Additionally, Table 2 illustrates that when Pμ-STAP is utilized with a partially adaptive framework, an increase of SINR also occurs. In FIGS. 7A-7C, the SINR-normalized SNR versus normalized Doppler (e.g., from Equation (36)) at range sample intervals equal to 2ND$_{t1}$ (e.g., from Column 2 in Table 2) are presented, and the various plots are labeled similarly to FIG. 6A-6C. As illustrated, an improved MDV is realized for partially adaptive Pμ-STAP compared to partially adaptive STAP. In FIGS. 8A-8C, BSPrD is presented when reducing from N=11 elements to D$_s$=5 beams and M=21 pulses to D$_{t2}$=11 and D$_{t1}$=5 pulses in a sub-CPI. Similarly to Table 2 and FIGS. 7A-7C, FIGS. 8A-8C illustrates that Pμ-STAP outperforms STAP by providing an SINR benefit. Table 3 shows the mean convergence for BSPrD, and FIGS. 9A-9C shows mean convergence for BSPoD.

TABLE 3

Mean Convergence Comparison for Non-Homogeneous Clutter using Beam-Space Pre-Doppler (dB)

| Receive Processing | 2D$_s$D$_{t1}$ | 2D$_s$D$_{t2}$ |
|---|---|---|
| primary only, full (M = 21) | −6.17 | −5.33 |
| primary only, partial (D$_{t1}$ = 5) | −4.77 | −3.86 |
| primary only, partial (D$_{t2}$ = 11) | −5.39 | −4.45 |
| secondary only, full (M = 21) | −6.61 | −5.41 |
| secondary only, partial (D$_{t1}$ = 5) | −5.35 | −4.29 |
| secondary only, partial (D$_{t2}$ = 11) | −5.88 | −4.79 |
| primary + 4 sec., full (M = 21) | −4.45 | −4.00 |
| primary + 4 sec., partial (D$_{t1}$ = 5) | −3.81 | −3.47 |
| primary + 4 sec., partial (D$_{t2}$ = 11) | −4.16 | −3.77 |

The SINR-normalized SNR figures for BSPrD and BSPoD have been excluded since the results are similar. Overall, partially adaptive Pμ-STAP provides an increase in SINR performance over STAP. Therefore, μ-STAP is indeed applicable in partially adaptive techniques. Below, other more challenging non-homogeneous interference scenarios for which μ-STAP has been shown to provide a benefit relative to traditional STAP processing are considered.

Clutter discretes in a CUT are a form of non-homogeneous interference degradation to SINR since the distribution of the (SISO) training data differs from the CUT. In addition, clutter discretes can erroneously be detected as targets of interest. For the second non-homogenous clutter scenario, a large clutter discrete (e.g., 20 dB above the average clutter power) was considered as being present in the CUT. Partially adaptive techniques, ESPoD and BSPrD, are presented in FIGS. 10A-10C and 11A-11C, respectively. Table 4 and Table 5 present the observed mean convergence improvement factor for ESPoD and BSPrD, respectively.

TABLE 4

Mean Convergence Comparison for Clutter Discrete in CUT using Element-Space Post-Doppler (dB)

| Receive Processing | 2ND$_{t1}$ | 2ND$_{t2}$ |
|---|---|---|
| primary only, full (M = 21) | −6.65 | −8.18 |
| primary only, partial (D$_{t1}$ = 5) | −3.21 | −4.17 |
| primary only, partial (D$_{t2}$ = 11) | −3.39 | −4.41 |
| secondary only, full (M = 21) | −6.18 | −7.89 |
| secondary only, partial (D$_{t1}$ = 5) | −3.38 | −4.36 |
| secondary only, partial (D$_{t2}$ = 11) | −3.46 | −4.50 |
| primary + 4 sec., full (M = 21) | −5.17 | −5.90 |
| primary + 4 sec., partial (D$_{t1}$ = 5) | −2.73 | −3.28 |
| primary + 4 sec., partial (D$_{t2}$ = 11) | −2.83 | −3.34 |

TABLE 5

Mean Convergence Comparison for Clutter Discrete in CUT using Beam-Space Pre-Doppler (dB)

| Receive Processing | 2D$_s$D$_{t1}$ | 2D$_s$D$_{t2}$ |
|---|---|---|
| primary only, full (M = 21) | −9.02 | −8.16 |
| primary only, partial (D$_{t1}$ = 5) | −7.40 | −6.36 |
| primary only, partial (D$_{t2}$ = 11) | −6.95 | −5.80 |
| secondary only, full (M = 21) | −9.95 | −8.10 |
| secondary only, partial (D$_{t1}$ = 5) | −8.35 | −6.82 |
| secondary only, partial (D$_{t2}$ = 11) | −7.87 | −6.45 |
| primary + 4 sec., full (M = 21) | −6.60 | −5.97 |
| primary + 4 sec., partial (D$_{t1}$ = 5) | −5.81 | −5.24 |
| primary + 4 sec., partial (D$_{t2}$ = 11) | −5.51 | −5.02 |

Figure 12A:
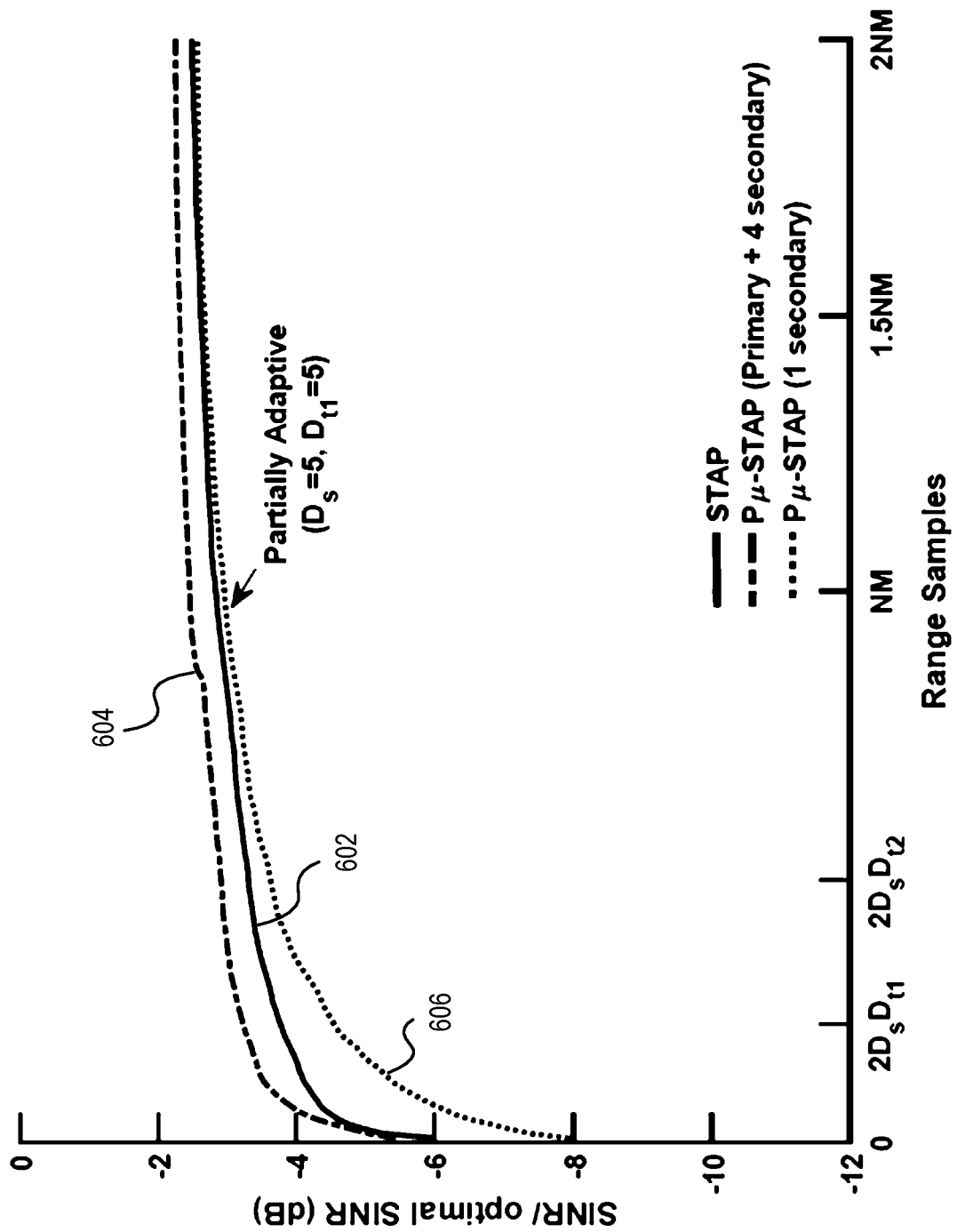
FIG. 12A is a plot illustrating a clutter discrete for an adjacent bin implementation of BSPoD.
Figure 12B:
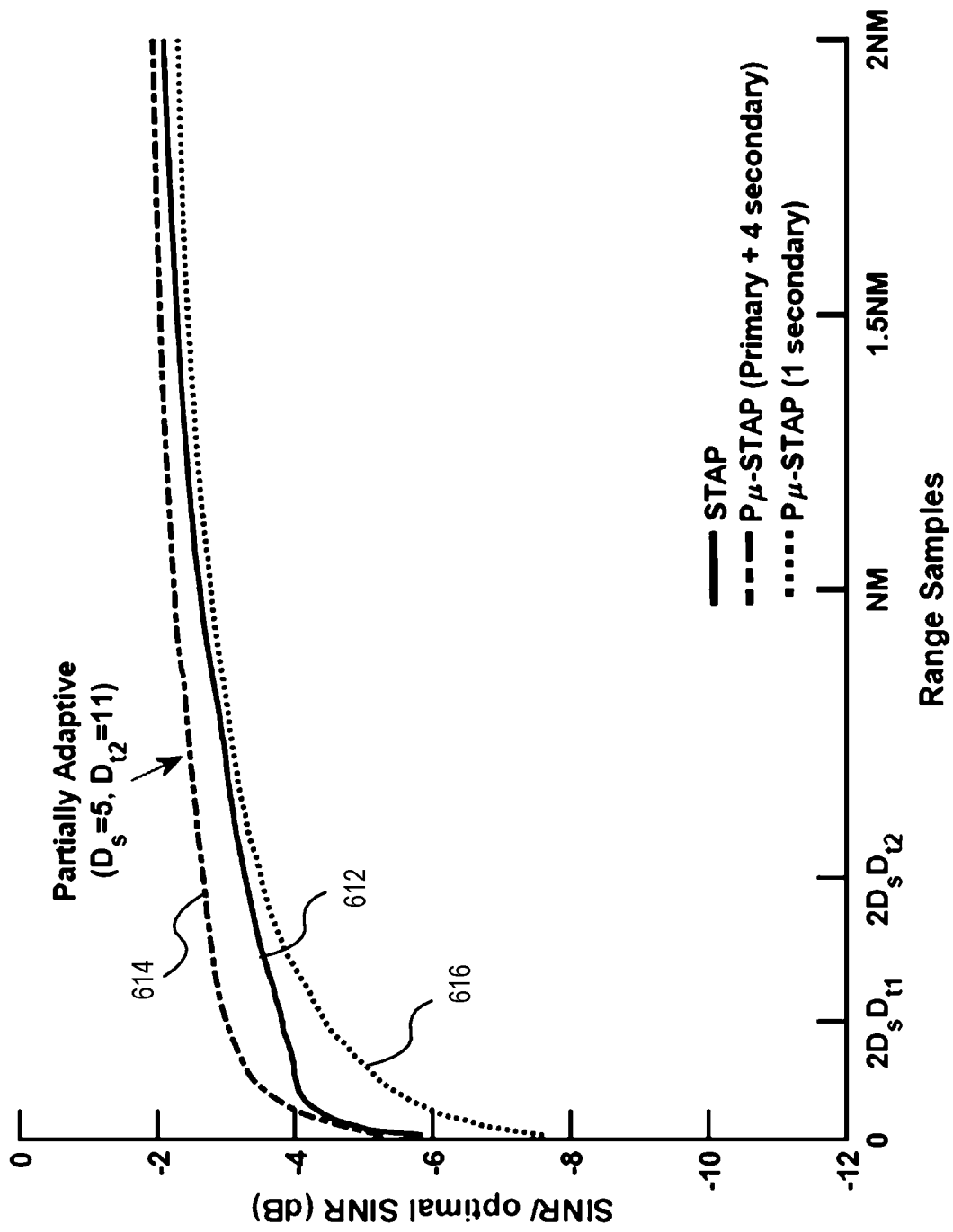
FIG. 12B is a plot illustrating a clutter discrete for an adjacent bin implementation of BSPoD.
Figure 12C:
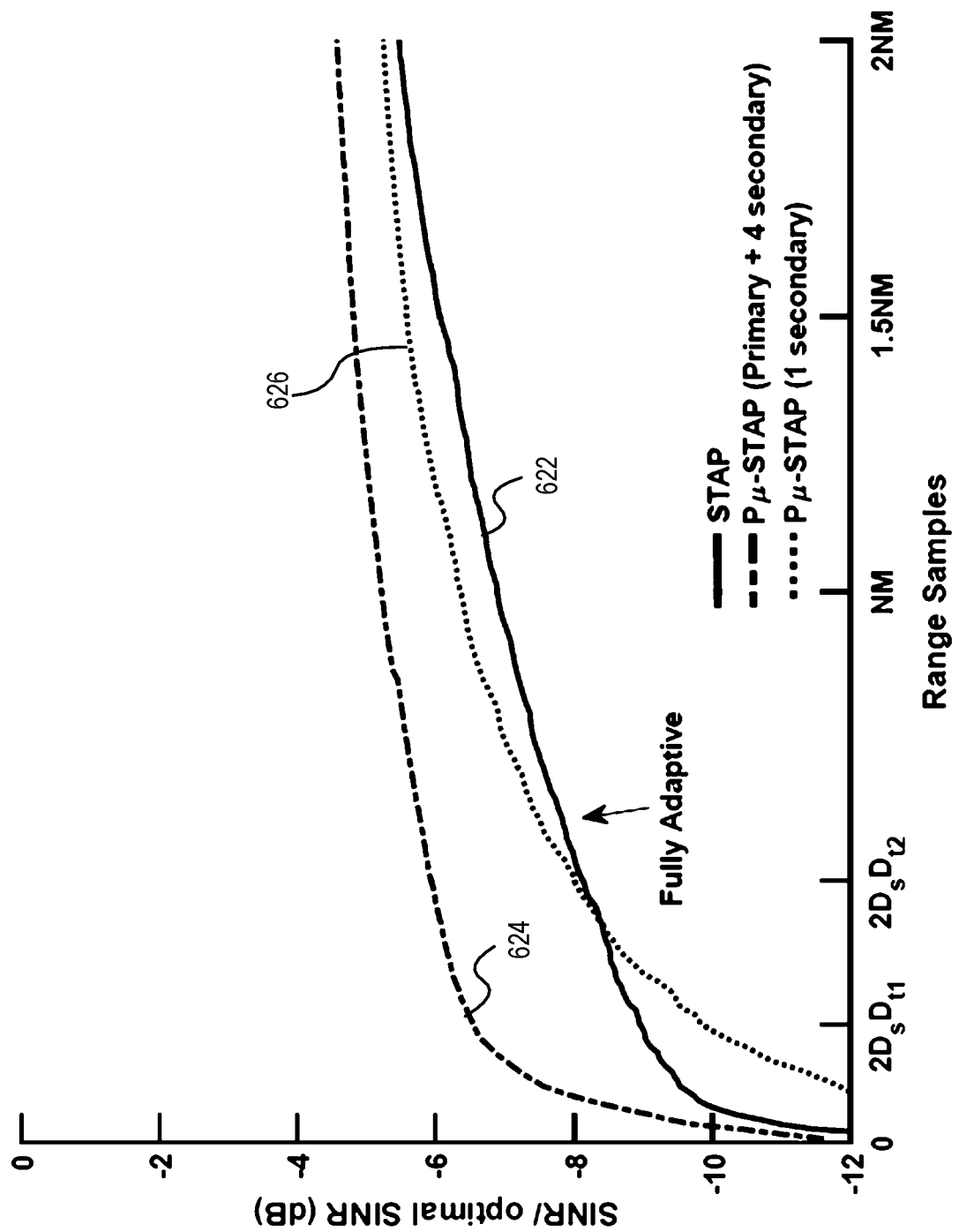
FIG. 12C is a plot illustrating a clutter discrete for an adjacent bin implementation of BSPoD.
Figure 13A:
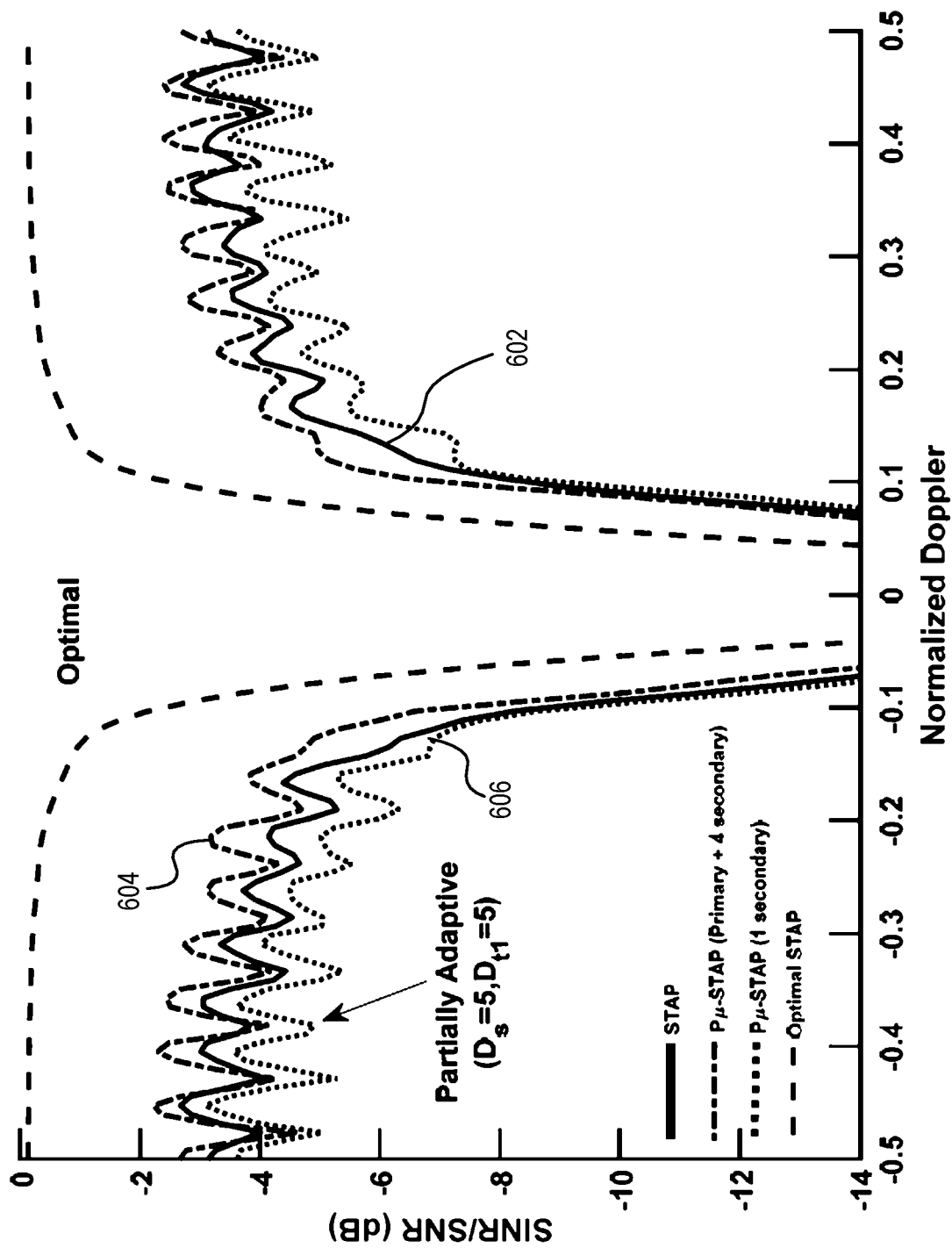
FIG. 13A is a plot illustrating a clutter discrete in the CUT for an adjacent bin implementation of BSPoD.
Figure 13B:
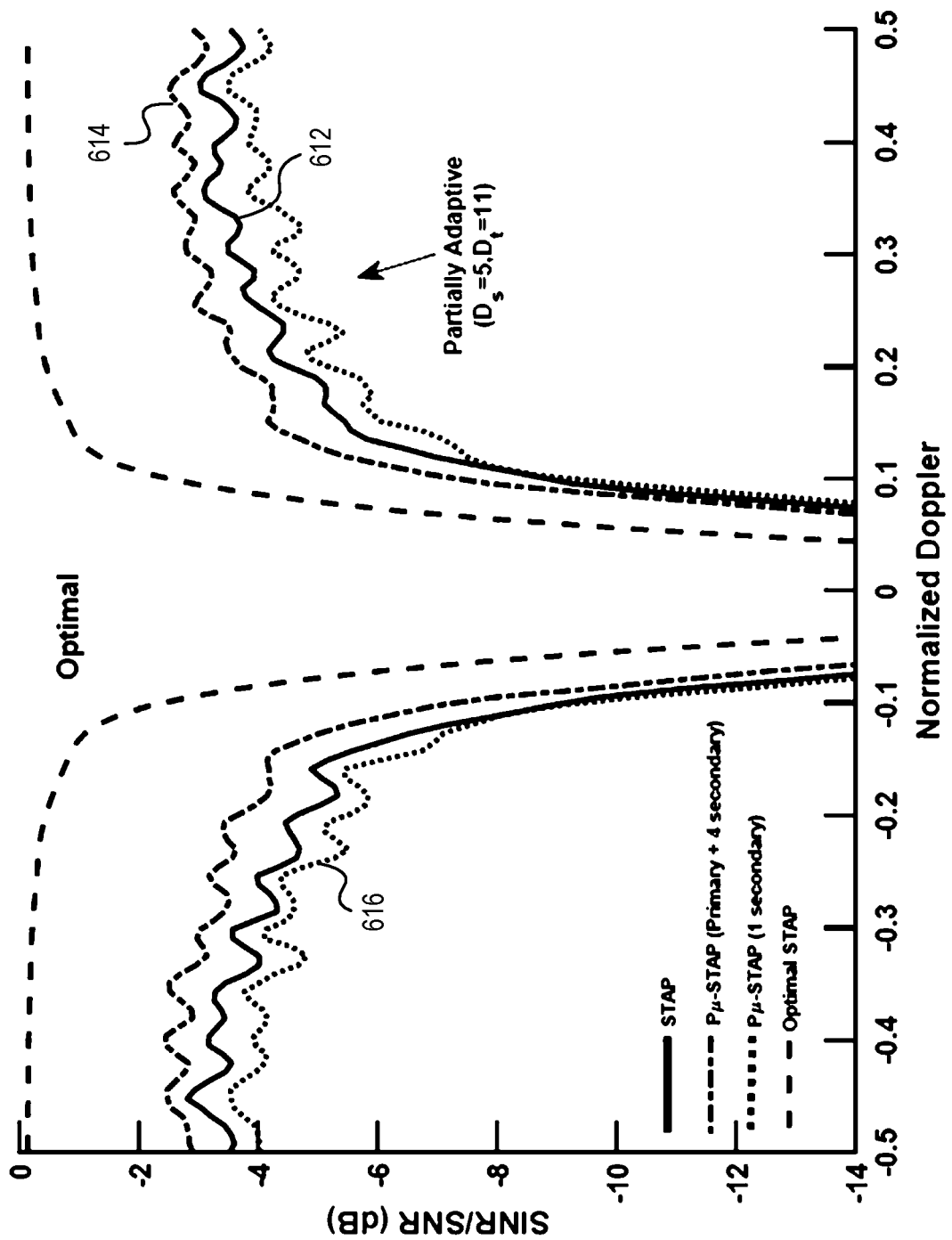
FIG. 13B is a plot illustrating a clutter discrete in the CUT for an adjacent bin implementation of BSPoD.
Figure 13C:
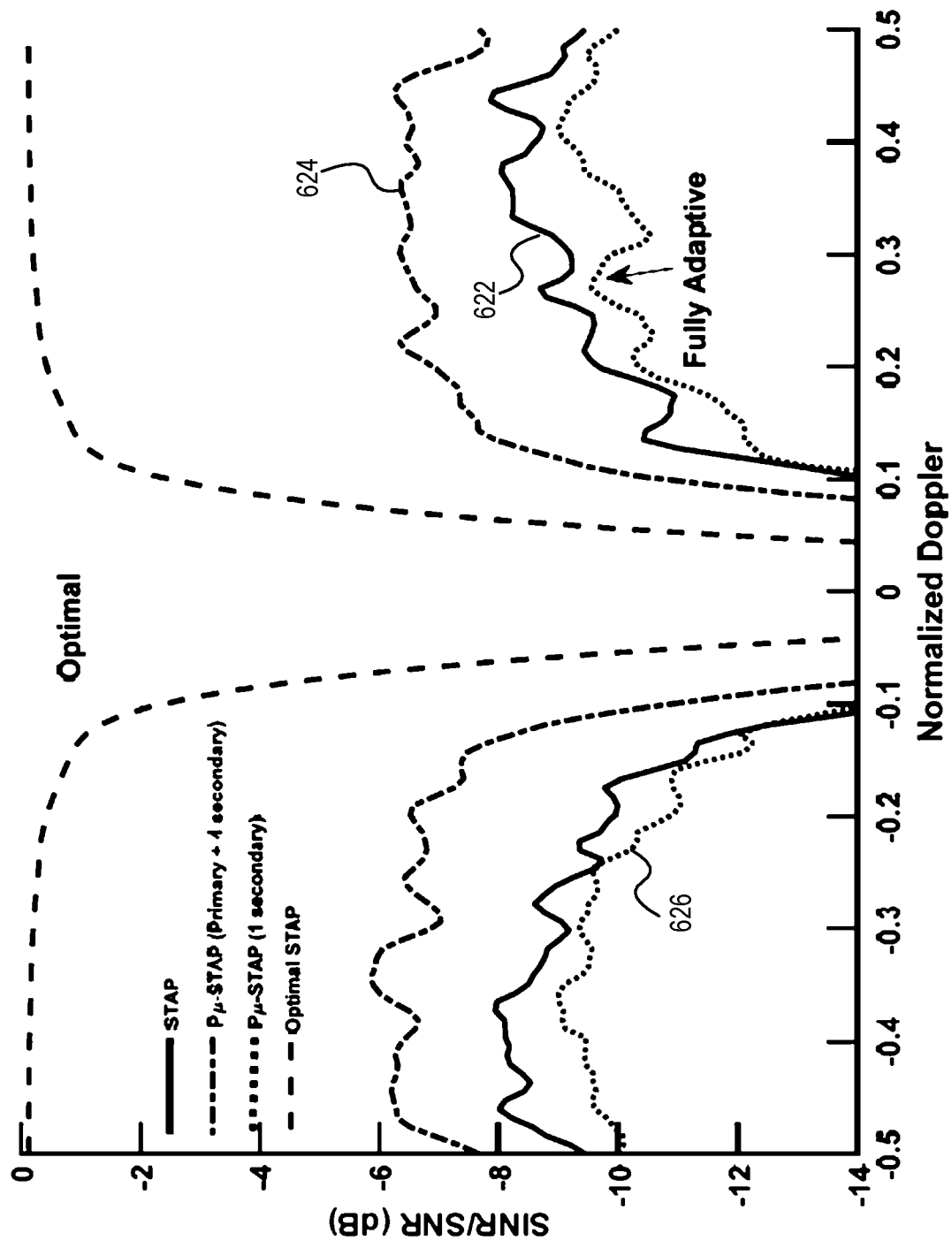
FIG. 13C is a plot illustrating a clutter discrete in the CUT for an adjacent bin implementation of BSPoD.
Figure 14A:
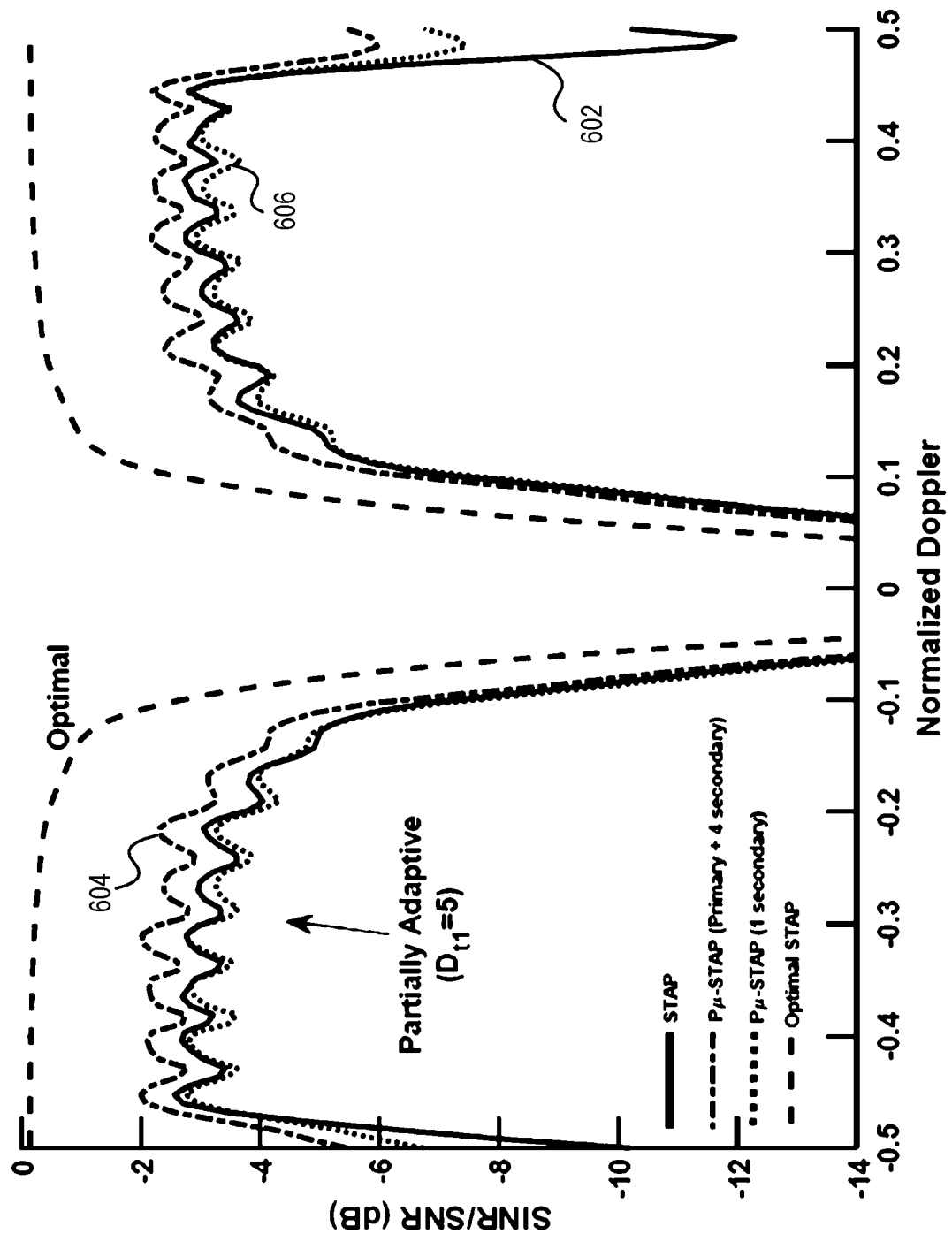
FIG. 14A is a plot illustrating targets in training data for an adjacent bin implementation of ESPoD.
Figure 14B:
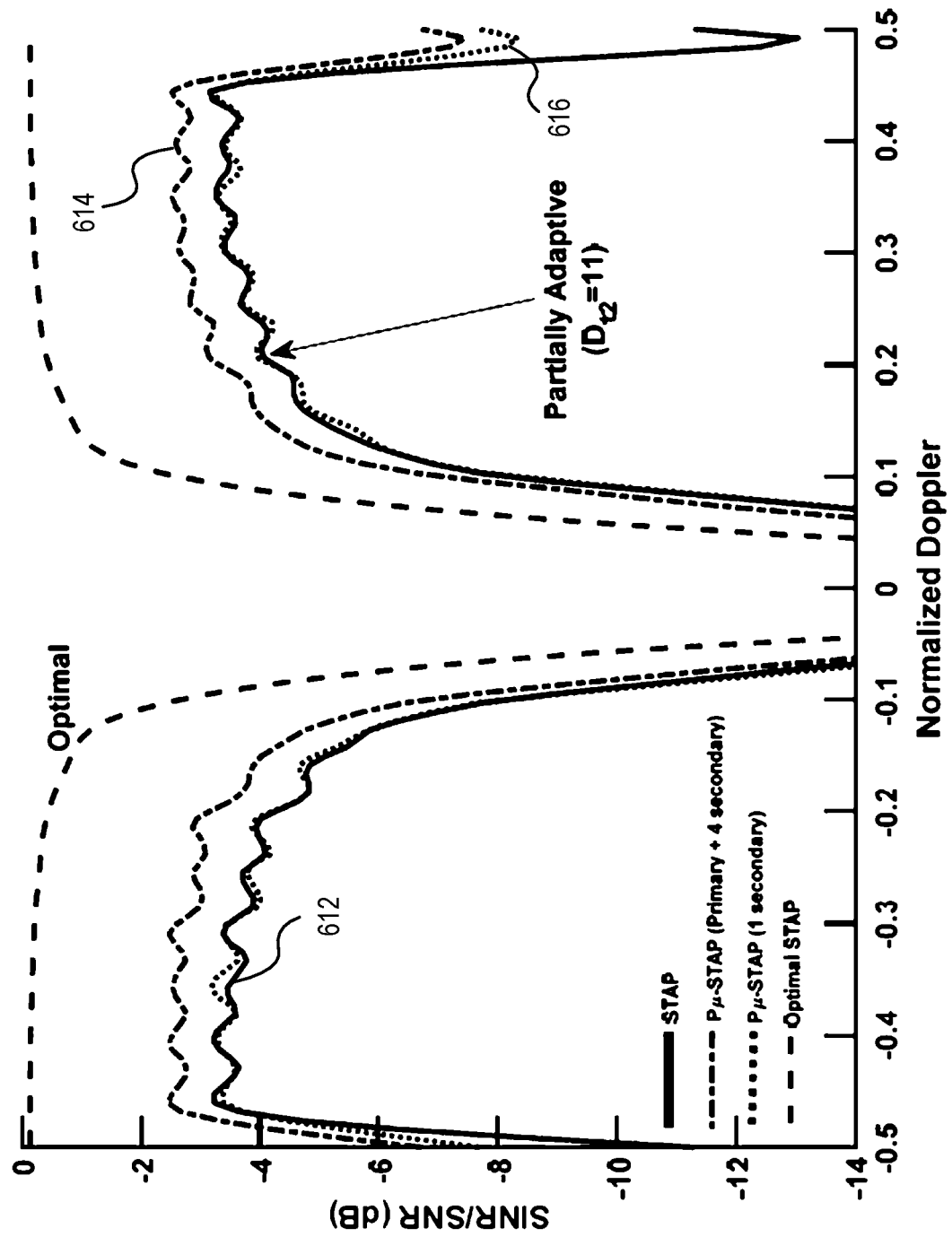
FIG. 14B is a plot illustrating targets in training data for an adjacent bin implementation of ESPoD.
Figure 14C:
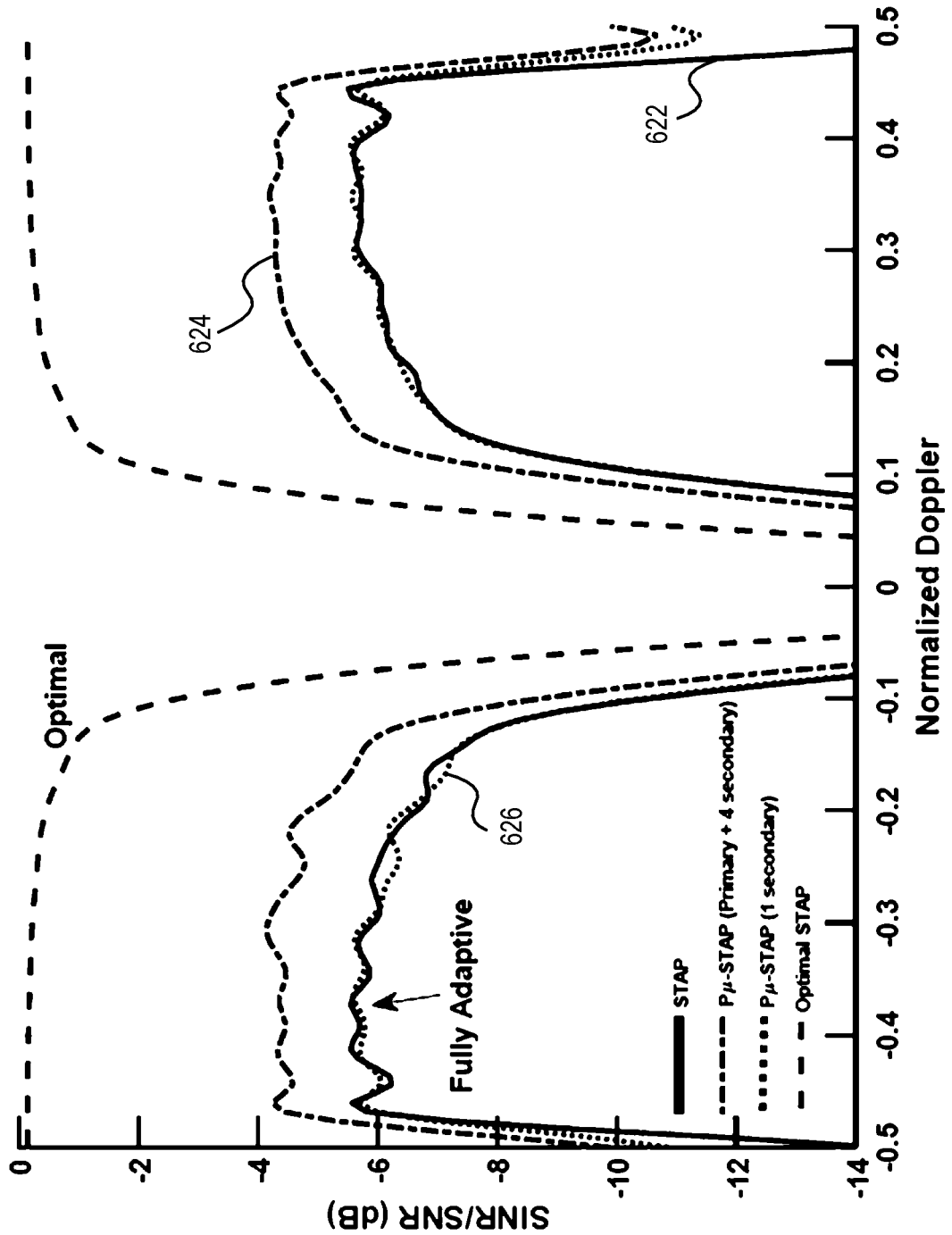
FIG. 14C is a plot illustrating targets in training data for an adjacent bin implementation of ESPoD.
Figure 15A:
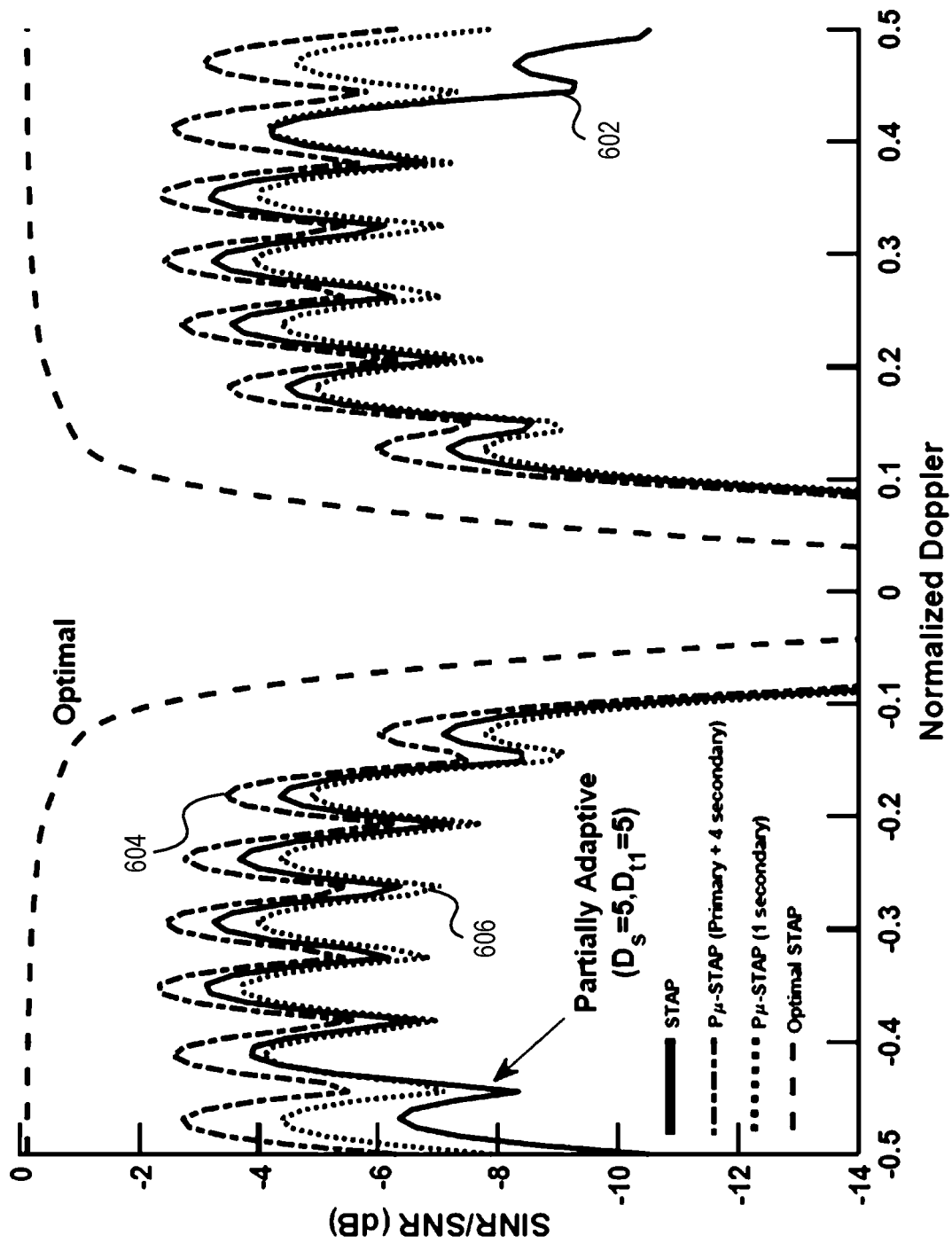
FIG. 15A is a plot illustrating targets in training data for an adjacent bin implementation of BSPrD.
Figure 15B:
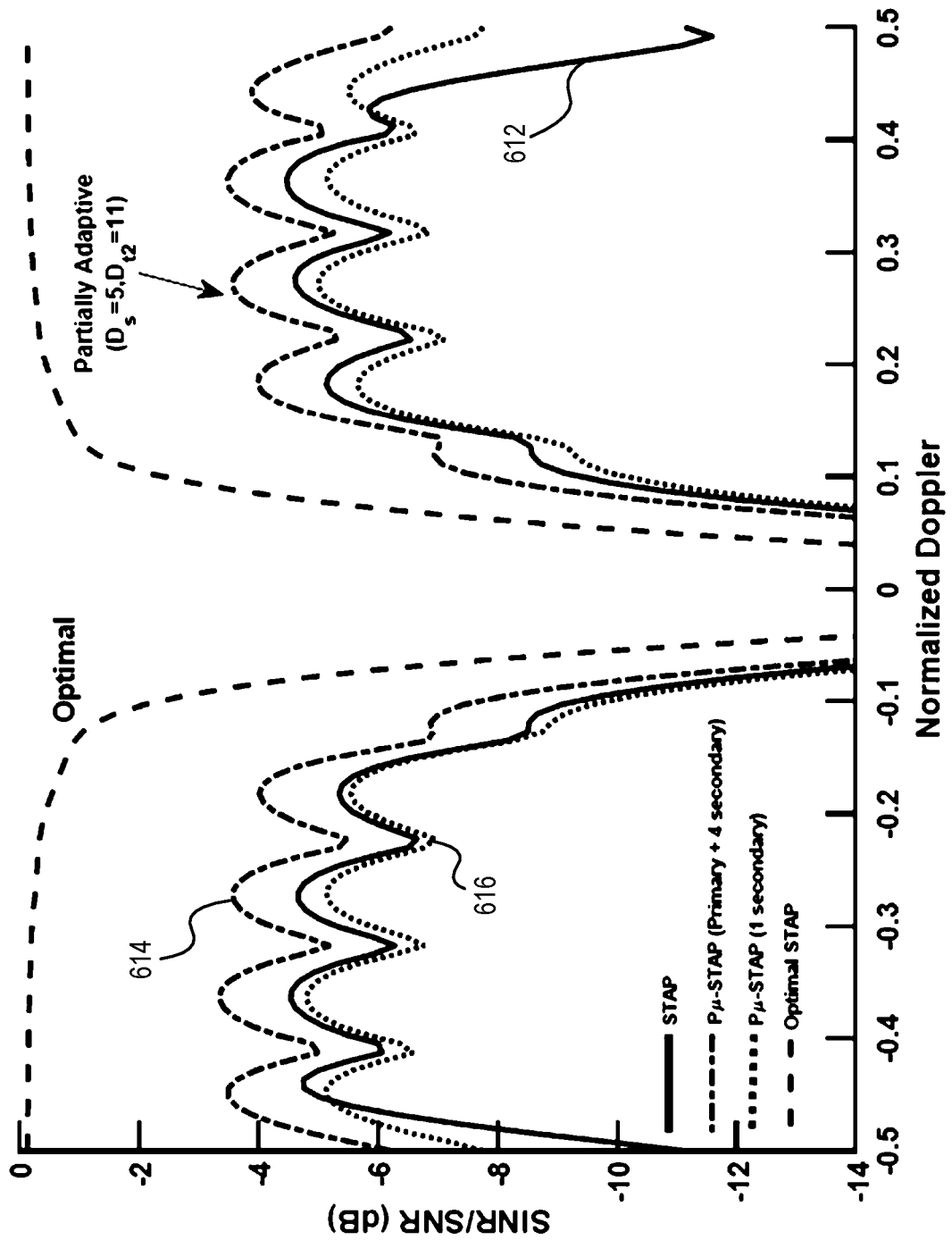
FIG. 15B is a plot illustrating targets in training data for an adjacent bin implementation of BSPrD.
Figure 15C:
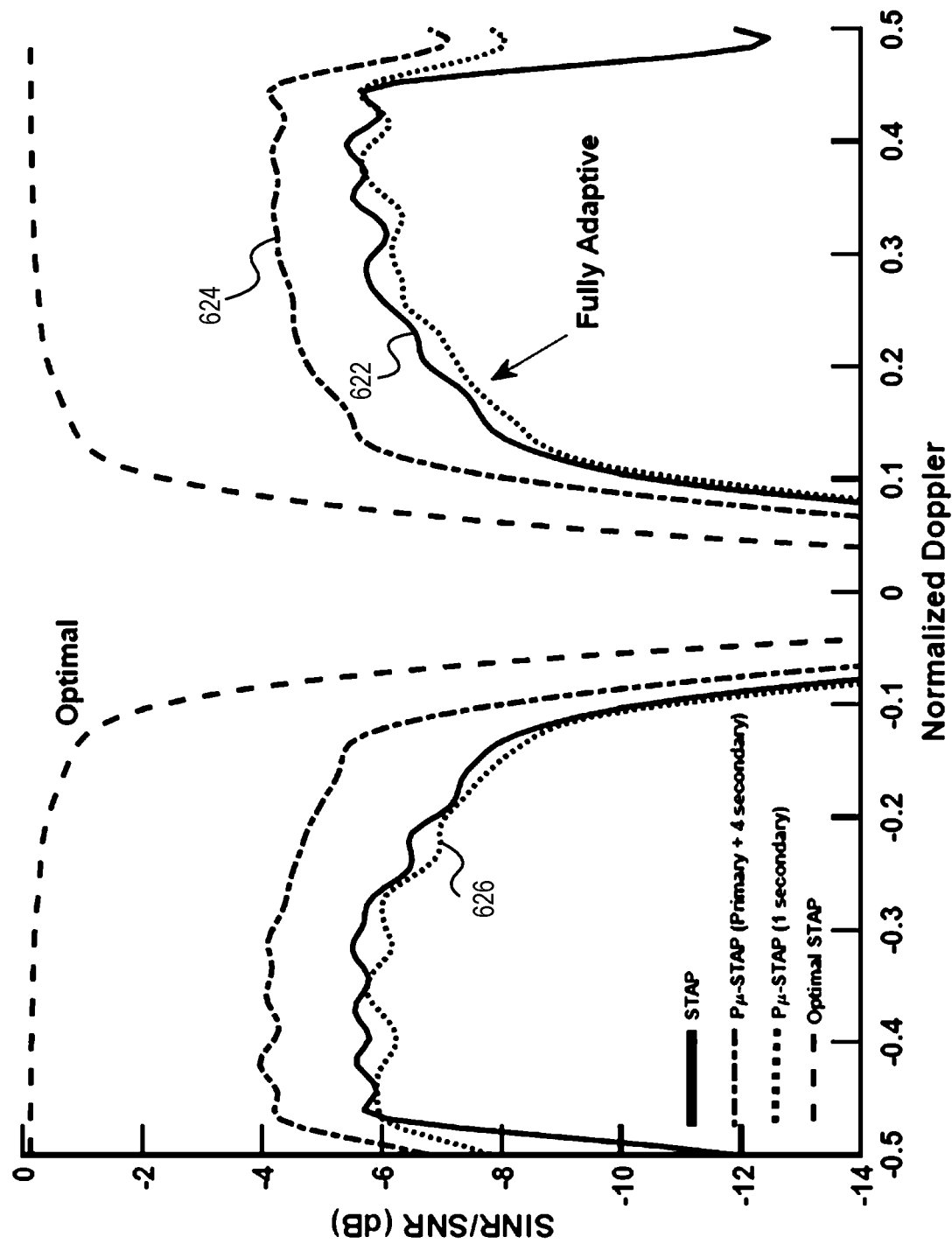
FIG. 15C is a plot illustrating targets in training data for an adjacent bin implementation of BSPrD.
Figure 16A:
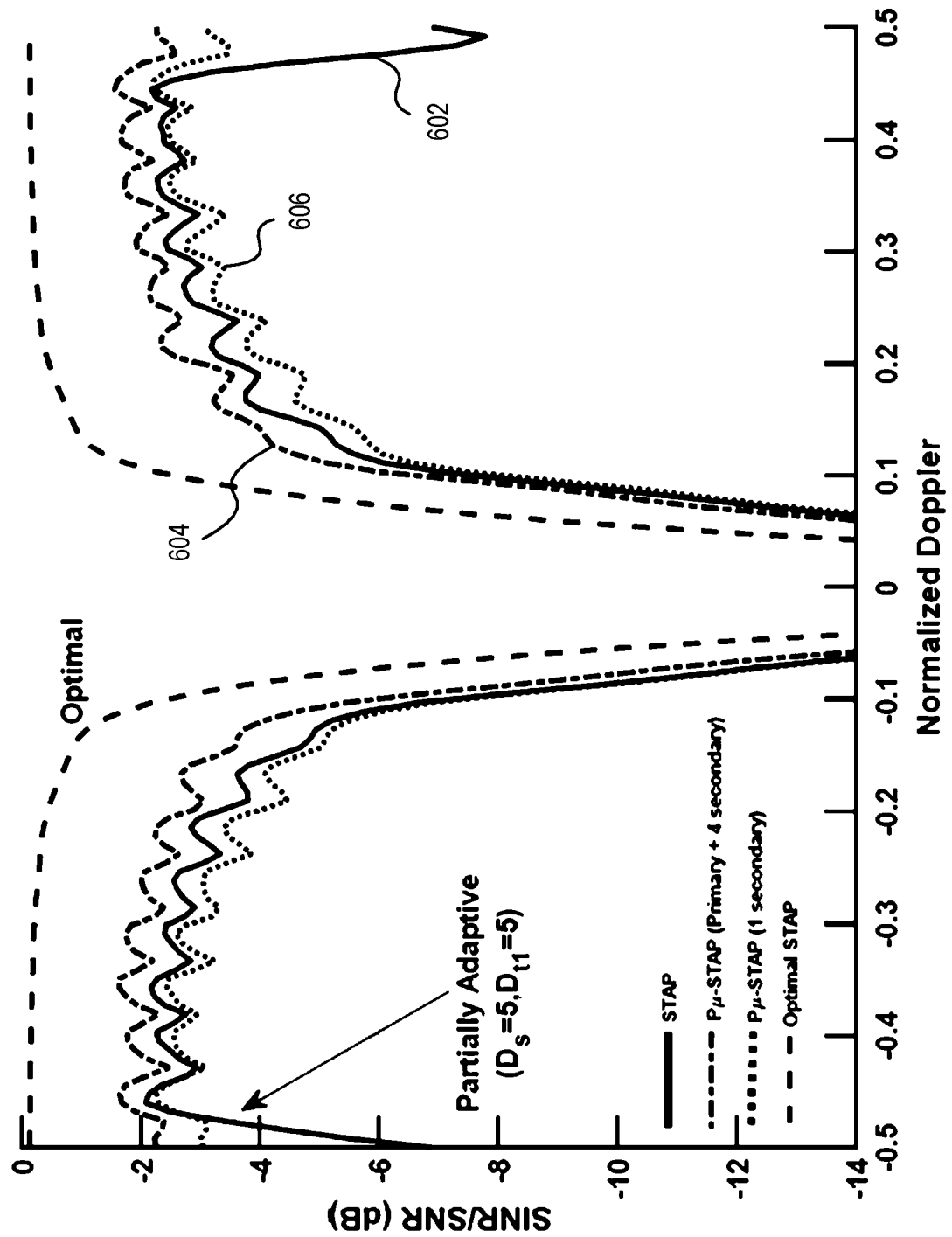
FIG. 16A is a plot illustrating targets in training data for an adjacent bin implementation of BSPoD.
Figure 16B:
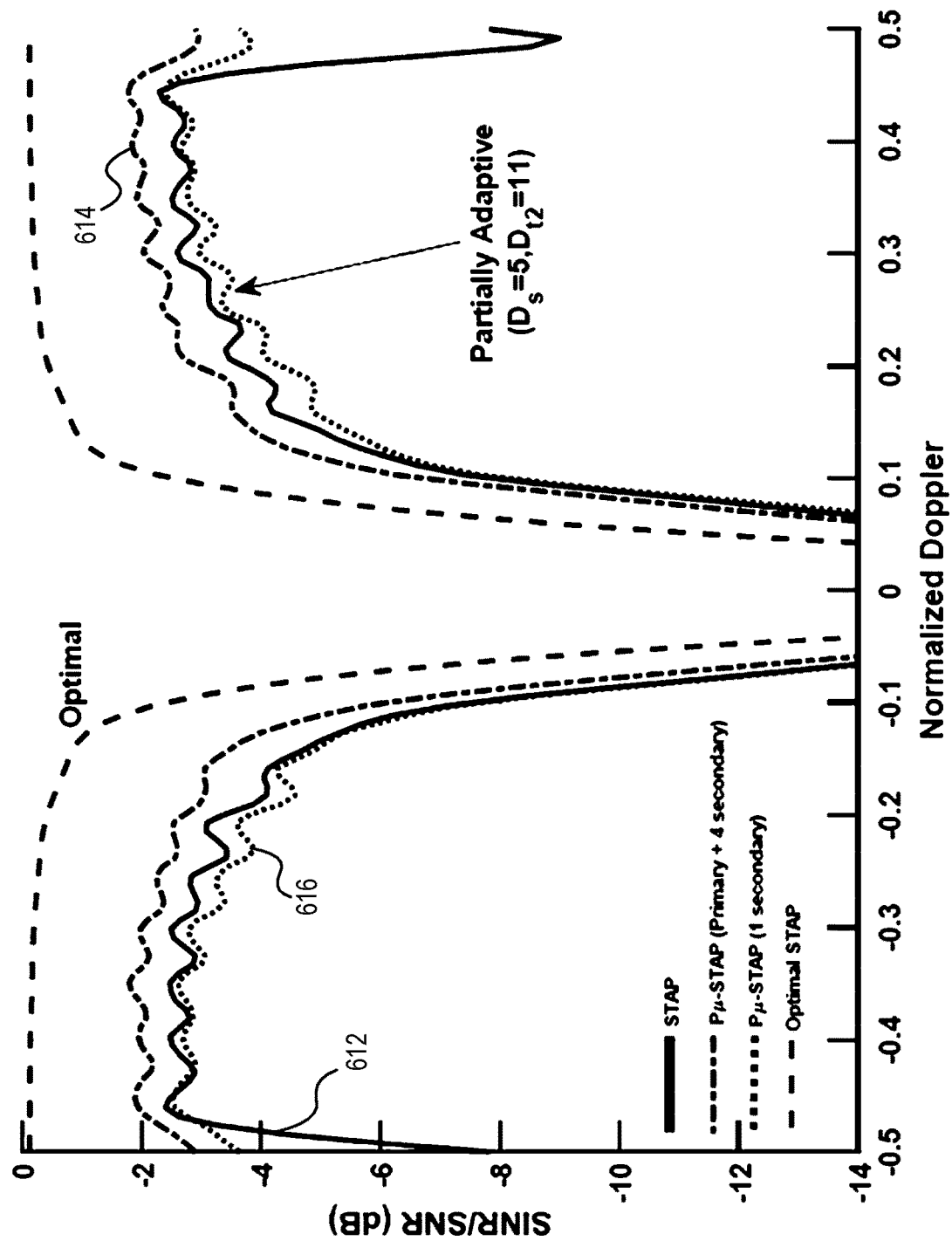
FIG. 16B is a plot illustrating targets in training data for an adjacent bin implementation of BSPoD.
Figure 16C:
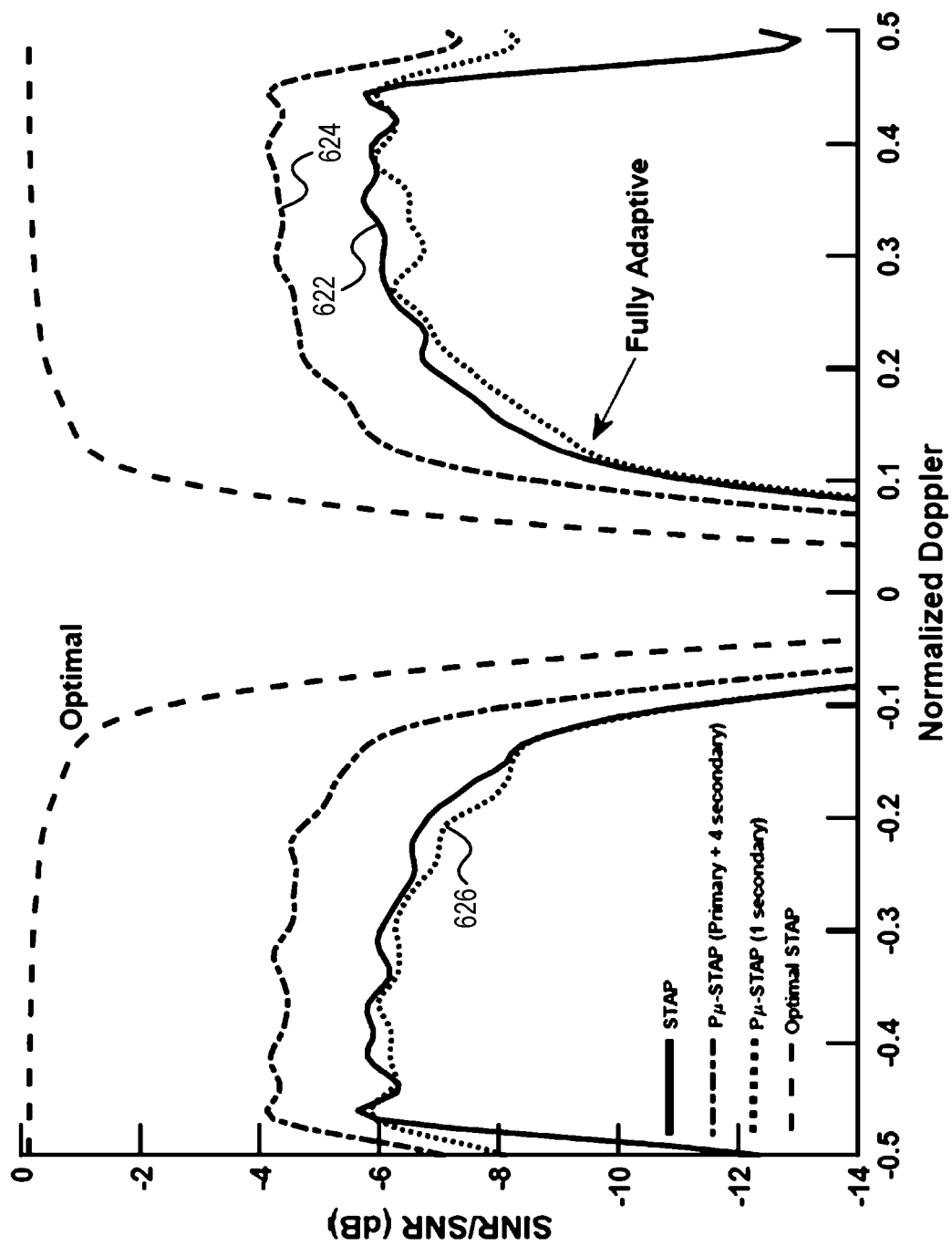
FIG. 16C is a plot illustrating targets in training data for an adjacent bin implementation of BSPoD.

In Table 5, an Pμ-STAP improvement of 1.44 dB when D$_{t1}$=5 and 0.79 dB when D$_{t1}$=11 at 2D$_s$D$_{t1}$ range sample intervals was observed over STAP. The observed improvement was roughly 1.59 dB when $D_{r1}=5$ and 1.12 dB when $D_{r1}=11$ at $2D_sD_{r2}$ range sample intervals. A common occurrence can be seen throughout these results. In particular, fully adaptive Pμ-STAP provided the greatest amount of performance improvement over STAP. As the degrees of freedom were decreased, performance over STAP also decreased at the benefit of reduced computational cost and complexity. However, since fully adaptive techniques provided the best SINR performance, the largest covariance matrix possible should be used since μ-STAP can boost SINR performance with low sample support. Therefore, in order to maximize Pμ-STAP performance, the covariance size should be maximized to the processing and hardware constraints instead of sample support requirements. This was further affirmed since a partially adaptive μ-STAP covariance reduced to $D_sD_{r2}\times$ with sample support $2D_sD_{r1}$ (μ-STAP, larger covariance, lower support) had a greater mean SINR than a partially adaptive traditional STAP with a covariance size $D_sD_{r1}\times$ and sample support of $2D_sD_{r2}$ (STAP, smaller covariance, higher sample support) as shown in FIGS. 12A-12C. In FIGS. 13A-13C, the mean convergence for BSPoD is shown. The SINRo-normalized SINR improvement factor at $2D_sD_{r1}$ range samples is shown in FIG. 12A-12C. Pμ-STAP MDV performance was similar and as can be seen in its mean convergence. Overall, the family of Pμ-STAP algorithms described herein were observed as providing a gain in performance over STAP. The last clutter environment considered herein consisted of a large target in the training data in a non-homogeneous clutter. This phenomenon inserts target statistics into STAP clutter/interference covariance matrix thereby causing cancellation of targets in the CUT. As explained above, Pp-STAP has been shown to smear target responses across range samples to homogenize the secondary training datacubes (e.g., the datacubes generated by the plurality of secondary homogenization filters of FIG. 2). These smeared response improved SINR when self-cancellation occurred. Partially adaptive techniques also provide a benefit as shown below. To understand whether Pμ-STAP can be a greater boost to performance, ten targets were placed in the first 5 range cells of the CUT (after guard cells) with 15 dB SNR and a normalized Doppler of 0.5.

In FIGS. 14A-16C, ESPoD, BSPrD, and BSPoD SINR-normalized SNR versus normalized Doppler frequency are presented, respectively. Each partially adaptive technique was observed to provide a reduction in self-cancellation, improving the resultant SINR. However, when combined with Pμ-STAP, a greater increase in SINR was observed, which was especially noticeable for BSPrD and BSPoD. Note that nulls for BSPrD occurred throughout the results described above.

As shown above, Pμ-STAP may be readily applied to existing partially adaptive STAP techniques, and Pμ-STAP outperforms STAP under several non-homogeneous clutter environments, including but not limited to environments where a clutter discrete is in the CUT or a large target is in the training data. Under these operating environments, Pμ-STAP performance thrives over STAP. In addition, Pμ-STAP performed very well when low training sample support was available to estimate the sample covariance matrix (e.g., at block 240 of FIG. 2). Partially adaptive techniques are applicable to all other MIMO and SIMO μ-STAP techniques. Overall, spatial, temporal, or space-time reduction of Pμ-STAP was observed to enhance target detection for Airborne GMTI radar.

In aspects, the radar detection system 100 of FIG. 1 may be implemented in accordance with one or more of the various Pμ-STAP techniques describes (e.g., fully adaptive techniques, partially adaptive techniques, and the like). As described above, irrespective of the particular manner in which the radar detection system 100 is configured, utilization of Pp-STAP techniques in accordance with the present disclosure may provide various benefits that improve the capabilities of the radar detection system 100 to detect targets of interest. In addition to improvements related to detection of targets of interest, another benefit provided by Pμ-STAP techniques in accordance with the present disclosure is the ability to easily incorporate those techniques into legacy radar systems. For example, because Pμ-STAP techniques operate on post-pulse compressed data, as opposed to pre-pulse compressed data as is required by existing μ-STAP techniques. For example, rather than reconfigure and/or upgrade these legacy systems via addition of costly new hardware capable of operating on pre-pulse compressed data, a legacy radar system may be upgraded to operate in accordance with one or more of the above described to implement Pμ-STAP techniques via a software upgrade, which significantly reduces the costs associated with implementing STAP-based techniques for detecting targets of interest.

Figure 17:
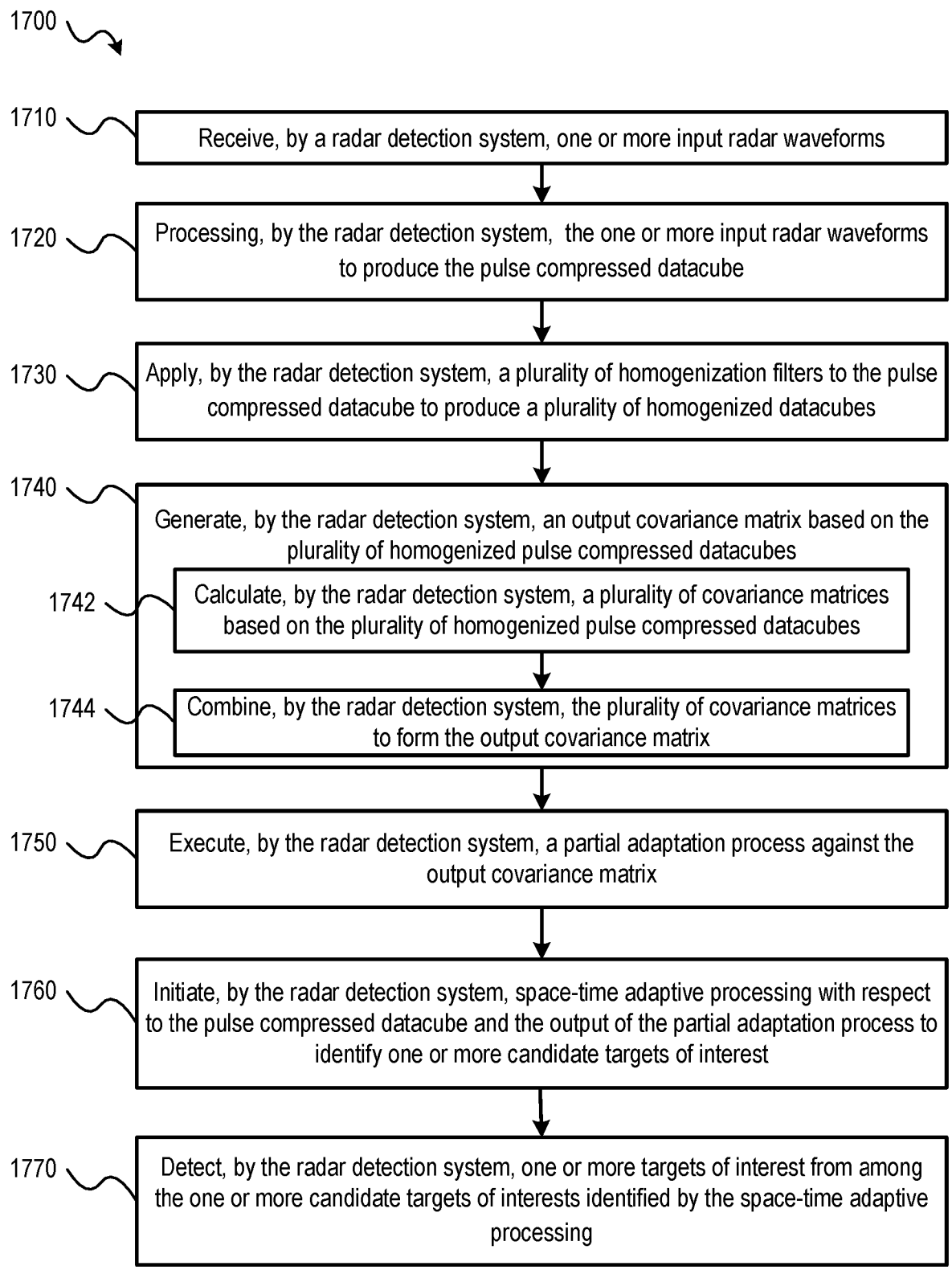
FIG. 17 is a flow diagram of an exemplary process for performing radar detection of ground moving targets in accordance with the present disclosure.

Referring to FIG. 17, a flow diagram of an exemplary process for performing radar detection of ground moving targets using Pμ-STAP techniques in accordance with the present disclosure is shown as a method 1700. In an aspect, the method 1700 may be executed by a radar detection system, such as the radar detection system 100 of FIG. 1. In aspects, the method 1700 may be at least partially implemented in software stored as instructions (e.g., the instructions 122 of FIG. 1) that, when executed by one or more processors, cause the one or more processors to perform the operations of the method 1700.

At 1710, the method includes receiving, by a radar detection system, one or more input radar waveforms. In an aspect, the input radar waveform(s) may be the input radar waveform 104 of FIGS. 1 and 2. At 1720, the one or more input radar waveforms may be processed by the radar system to produce a pulse compressed datacube. As illustrated in FIG. 2, processing the one or more input radar waveforms to produce the pulse compressed datacube may include pulse compressing the input radar waveform and performing A/D conversion of the input radar waveform. In an aspect, the input radar waveform may be pulse compressed by applying a match filter to the input radar waveform. In an additional or alternative aspect, a mismatch filter may be used.

At 1730, the method 1700 includes applying, by the radar detection system, a plurality of homogenization filters to the pulse compressed datacube to produce a plurality of homogenized datacubes. As described above, each of the plurality of homogenization filters may be configured to smooth out non-linearities within data of the pulse compressed datacube. Each of the homogenized datacubes may include information associated with velocity, spatial location, and distance and may provide additional training data in which range-domain smearing effects are present. As explained with reference to FIGS. 1 and 2, the plurality of homogenization filters may include a primary homogenization filter and one or more secondary homogenization filters. Each of the plurality of homogenization filters may be generated independent of a transmitted radar waveform.

At step 1740, the method 1700 includes generating, by the radar detection system, an output covariance matrix based on the plurality of homogenized pulse compressed datacubes. As described above, the output covariance matrix may be generated by calculating, by the radar detection system, a plurality of covariance matrices based on the plurality of homogenized pulse compressed datacubes, at step 1742. Each covariance matrix of the plurality of covariance matrices may be calculated based on a covariance estimation derived from a corresponding one of the plurality of homogenized pulse compressed datacubes. The plurality of covariance matrices may be combined to form the output covariance matrix, at step 1744. At step 1750 executing, by the radar detection system, a partial adaptation process against the output covariance matrix.

At step 1760 the method 1700 includes initiating, by the radar detection system, space-time adaptive processing with respect to the pulse compressed datacube and the output of the partial adaptation process to identify one or more candidate targets of interest. The space-time adaptive processing may be configured to identify one or more candidate targets of interest by filtering the pulse compressed datacube based on the output of the partial adaptation process. At 1770, the method 1700 includes detecting, by the radar detection system, one or more targets of interest from among the one or more candidate targets of interests identified by the space-time adaptive processing. As explained above, the Pµ-STAP techniques utilized by the method 1700 may improve the performance of radar systems with respect to detection of moving targets of interest. Additionally, because the method 1700 is configured to operate on pulse compressed data, the method 1700 may be utilized to upgrade legacy radar systems that are not capable of providing the pre-pulse compressed data inputs required by existing µ-STAP formulations.

Figure 18:
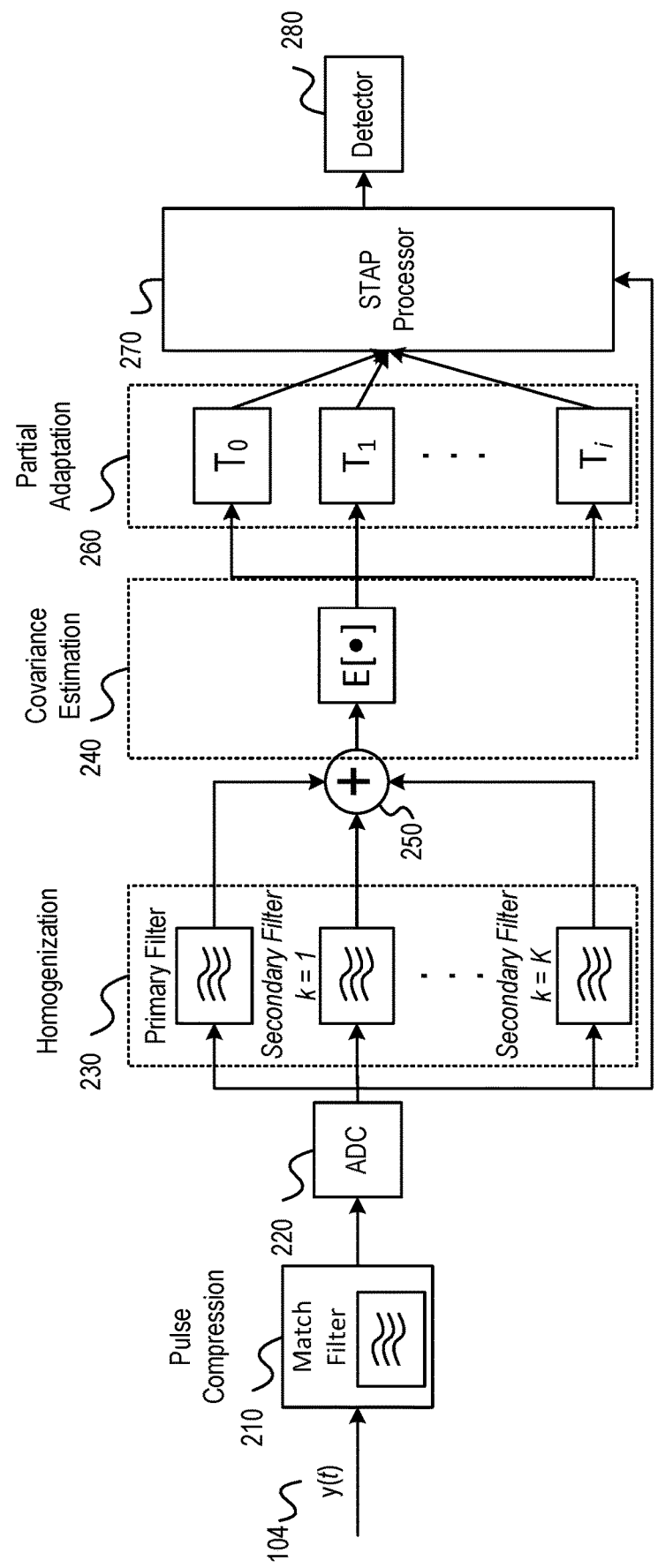
FIG. 18 is a block diagram illustrating an exemplary flow for processing an input radar waveform in accordance with the present disclosure.

Referring to FIG. 18, a block diagram illustrating another exemplary flow for processing an input radar waveform in accordance with the present disclosure is shown. The exemplary flow illustrated in FIG. 18 is similar to the flow illustrated in FIG. 2 except that FIG. 18 illustrates a flow in which the outputs of the homogenization filters 230 are combined prior to performing covariance estimation whereas FIG. 2 illustrates the combining (i.e., at block 250) taking place after covariance estimation. The configuration illustrated in FIG. 18 may reduce the computational complexities associated with covariance estimation. However, such an arrangement may result in a degradation of performance due to the lack of preservation of the primary covariance matrix, which plays an important role in the statistical characterization of clutter. It is also noted that other possible modifications to the arrangement of the processing flows disclosed herein are possible, such as performing pulse compression after performing analog-to-digital conversion (e.g., at ADC 220). It is noted that implementing Pµ-STAP processing techniques involving performing pulse compression after analog-to-digital conversion may provide similar performance and require similar computational resources. However, such an implementation may not be applied to legacy systems that do not have the ability to generate the digital pre-pulse compressed data, thereby limiting such a technique to new radar systems and increasing the cost to deploy such systems. In such instances, it may be more appropriate to consider an alternative technique, such as SIMO µ-STAP, rather than the Pµ-STAP techniques disclosed herein.

Although the embodiments of the present disclosure and their advantages have been described in detail, it should be understood that various changes, substitutions and alterations can be made herein without departing from the spirit and scope of the disclosure as defined by the appended claims. Further, although the drawings may illustrate some of the concepts disclosed herein as logical or functional blocks, it is to be understood that each of those blocks may be implemented in hardware, software, or a combination of hardware and software. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for improving detection ground moving targets via post-pulse compressed data space time adaptive processing (Pµ-STAP) processing, the method comprising:
   receiving, by a radar detection system, one or more input radar waveforms;
   processing, by the radar detection system, the one or more input radar waveforms to produce a pulse compressed datacube;
   applying, by the radar detection system, a plurality of homogenization filters to the pulse compressed datacube to produce a plurality of homogenized pulse compressed datacubes;
   generating, by the radar detection system, an output covariance matrix based on the plurality of homogenized pulse compressed datacubes;
   executing, by the radar detection system, a partial adaptation process against the output covariance matrix;
   initiating, by the radar detection system, space-time adaptive processing with respect to the pulse compressed datacube and an output of the partial adaptation process to identify one or more candidate targets of interest, wherein the space-time adaptive processing is configured to identify one or more candidate targets of interest by filtering the pulse compressed datacube based on the output of the partial adaptation process; and
   detecting, by the radar detection system, one or more targets of interest from among the one or more candidate targets of interests identified by the space-time adaptive processing.

2. The method of claim 1, wherein generating the output covariance matrix comprises:
   calculating, by the radar detection system, a plurality of covariance matrices based on the plurality of homogenized pulse compressed datacubes, wherein each covariance matrix of the plurality of covariance matrices is calculated from a corresponding one of the plurality of homogenized pulse compressed datacubes; and
   combining, by the radar detection system, the plurality of covariance matrices to form an output covariance matrix.

3. The method of claim 2, wherein each covariance matrix of the plurality of covariance matrices is calculated based on a covariance estimation derived from the corresponding one of the plurality of homogenized pulse compressed datacubes.

4. The method of claim 1, wherein each of the plurality of homogenization filters is configured to smooth out non-homogeneities within data of the pulse compressed datacube.

5. The method of claim 1, wherein each homogenized pulse compressed datacube comprises information associated with velocity, spatial location, and distance.

6. The method of claim 1, wherein each of the plurality of homogenized pulse compressed datacubes provide additional training data in which range-domain smearing effects are present.

7. The method of claim 1, wherein the plurality of homogenization filters includes a primary homogenization filter and one or more secondary homogenization filters.

8. The method of claim 7, wherein each of the plurality of homogenization filters is independent of a transmitted radar waveform.

9. The method of claim 1, wherein processing the one or more input radar waveforms to produce the pulse compressed datacube comprises:
   pulse compressing the one or more input radar waveforms; and
   performing analog to digital conversion of the one or more input radar waveforms.

10. The method of claim 9, wherein pulse compressing the one or more input radar waveforms comprises applying a match filter to the one or more input radar waveforms.

11. A non-transitory computer-readable storage medium storing instructions that, when executed by one or more processors, cause the one or more processors to perform operations for improving detection ground moving targets using a post-pulse compressed data space time adaptive processing (Pµ-STAP) technique, the operations comprising:
   receiving one or more input radar waveforms at a radar detection system;
   processing the one or more input radar waveforms to produce a pulse compressed datacube;
   applying a plurality of homogenization filters to the pulse compressed datacube to produce a plurality of homogenized pulse compressed datacubes;
   generating, by the radar detection system, an output covariance matrix based on the plurality of homogenized pulse compressed datacubes;
   executing a partial adaptation process against the output covariance matrix;
   initiating space-time adaptive processing with respect to the pulse compressed datacube and an output of the partial adaptation process to identify one or more candidate targets of interest, wherein the space-time adaptive processing is configured to identify one or more candidate targets of interest by filtering the pulse compressed datacube based on the output of the partial adaptation process; and
   detecting one or more targets of interest from among the one or more candidate targets of interests identified by the space-time adaptive processing.

12. The non-transitory computer-readable storage medium of claim 11, wherein generating the output covariance matrix comprises:
   calculating, by the radar detection system, a plurality of covariance matrices based on the plurality of homogenized pulse compressed datacubes, wherein each covariance matrix of the plurality of covariance matrices is calculated from a corresponding one of the plurality of homogenized pulse compressed datacubes; and
   combining, by the radar detection system, the plurality of covariance matrices to form an output covariance matrix.

13. The non-transitory computer-readable storage medium of claim 12, wherein each covariance matrix of the plurality of covariance matrices is calculated based on a covariance estimation derived from the corresponding one of the plurality of homogenized pulse compressed datacubes.

14. The non-transitory computer-readable storage medium of claim 11, wherein each of the plurality of homogenization filters is configured to smooth out non-homogeneities within data of the pulse compressed datacube.

15. The non-transitory computer-readable storage medium of claim 11, wherein each homogenized pulse compressed datacube comprises information associated with velocity, spatial location, and distance.

16. The non-transitory computer-readable storage medium of claim 11, wherein each of the plurality of homogenized pulse compressed datacubes provide additional training data in which range-domain smearing effects are present.

17. The non-transitory computer-readable storage medium of claim 11, wherein the plurality of homogenization filters includes a primary homogenization filter and one or more secondary homogenization filters.

18. The non-transitory computer-readable storage medium of claim 17, wherein each of the plurality of homogenization filters is independent of a transmitted radar waveform.

19. The non-transitory computer-readable storage medium of claim 11, wherein processing the one or more input radar waveforms to produce the pulse compressed datacube comprises:
   pulse compressing the one or more input radar waveforms; and
   performing analog to digital conversion of the one or more input radar waveforms.

20. The non-transitory computer-readable storage medium of claim 19, wherein pulse compressing the one or more input radar waveforms comprises applying a match filter to the one or more input radar waveforms.

21. A radar detection system for detecting ground moving targets using a post-pulse compressed data space time adaptive processing (Pµ-STAP) technique, the radar detection system comprising:
   one or more processors configured to:
      processing one or more received input radar waveforms to produce a pulse compressed datacube;
      apply a plurality of homogenization filters to the pulse compressed datacube to produce a plurality of homogenized pulse compressed datacubes;
      non-transitory computer-readable storage medium
      execute a partial adaptation process against an output covariance matrix;
      initiate space-time adaptive processing with respect to the pulse compressed datacube and an output of the partial adaptation process to identify one or more candidate targets of interest, wherein the space-time adaptive processing is configured to identify one or more candidate targets of interest by filtering the pulse compressed datacube based on the output of the partial adaptation process; and detect one or more targets of interest from among the one or more candidate targets of interests identified by the space-time adaptive processing; and a memory communicatively coupled to the one or more processors.

22. The radar detection system of claim 21, wherein the one or more processors are configured to generate the output covariance matrix by:

calculating a plurality of covariance matrices based on the plurality of homogenized pulse compressed datacubes, wherein each covariance matrix of the plurality of covariance matrices is calculated from a corresponding one of the plurality of homogenized pulse compressed datacubes; and combining the plurality of covariance matrices to form the output covariance matrix.

23. The radar detection system of claim 22, wherein each covariance matrix of the plurality of covariance matrices is calculated based on a covariance estimation derived from the corresponding one of the plurality of homogenized pulse compressed datacubes.

24. The radar detection system of claim 21, wherein each of the plurality of homogenization filters is configured to smooth out non-homogeneities within data of the pulse compressed datacube.

25. The radar detection system of claim 21, wherein each homogenized pulse compressed datacube comprises information associated with velocity, spatial location, and distance.

26. The radar detection system of claim 21, wherein each of the plurality of homogenized pulse compressed datacubes provide additional training data in which range-domain smearing effects are present.

* * * * *

UNITED STATES PATENT AND TRADEMARK OFFICE
CERTIFICATE OF CORRECTION

PATENT NO. : 11,885,870 B2
APPLICATION NO. : 17/260078
DATED : January 30, 2024
INVENTOR(S) : Lumumba Harnett et al.

It is certified that error appears in the above-identified patent and that said Letters Patent is hereby corrected as shown below:

In the Specification

At Column 8, Line number 38, delete "Book" and replace with --$\theta_{look}$--.
At Column 11, Line number 53, delete "where r" and replace with --where $\tau$--.
At Column 13, Line number 3, delete "by -P" and replace with --by m – P--.
At Column 14, Line number 28, delete "un" and replace with --$u_n$--.
At Column 14, Line number 31, delete "D spatial" and replace with --$D_s$ spatial--.
At Column 19, Line number 3, delete the portion of the equation reading "$D_{r2}$" and replace with --$D_{t2}$--.
At Column 20, Line number 7, delete "Pp-STAP" and replace with --P$\mu$-STAP--.

Signed and Sealed this
Nineteenth Day of March, 2024

Katherine Kelly Vidal
*Director of the United States Patent and Trademark Office*